(12) United States Patent
Emigholz et al.

(10) Patent No.: US 8,005,645 B2
(45) Date of Patent: Aug. 23, 2011

(54) APPLICATION OF ABNORMAL EVENT DETECTION TECHNOLOGY TO HYDROCRACKING UNITS

(75) Inventors: Kenneth F. Emigholz, Chevy Chase, MD (US); Thomas A. Kendi, Rotterdam (NL); Stephen S. Woo, Markham (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 11/710,654

(22) Filed: Feb. 23, 2007

(65) Prior Publication Data
US 2007/0233428 A1    Oct. 4, 2007

(51) Int. Cl.
*G06F 15/00*    (2006.01)
(52) U.S. Cl. ........................................... 702/185
(58) Field of Classification Search .............. 702/23, 702/30, 34, 84, 185–186; 703/13; 709/103; 700/28, 32, 45, 108, 266; 714/20, 26; 423/210, 423/239.1
See application file for complete search history.

(56) References Cited

U.S. PATENT DOCUMENTS

| | | | |
|---|---|---|---|
| 3,175,968 A | 3/1965 | Berger | |
| 4,549,934 A | 10/1985 | Graf et al. | |
| 4,764,318 A | 8/1988 | Morgenstern et al. | |
| 5,023,045 A | 6/1991 | Watanabe et al. | |
| 5,333,240 A | 7/1994 | Matsumoto et al. | |
| 5,351,247 A | 9/1994 | Dow et al. | |
| 5,457,625 A | 10/1995 | Lim et al. | |
| 5,465,321 A | 11/1995 | Smyth | |
| 5,539,877 A | 7/1996 | Winokur et al. | |
| 5,817,958 A | 10/1998 | Uchida et al. | |
| 5,859,964 A | 1/1999 | Wang et al. | |
| 5,949,677 A | 9/1999 | Ho | |
| 5,949,678 A | 9/1999 | Wold et al. | |
| 5,950,147 A | 9/1999 | Sarangapani et al. | |
| 6,115,656 A | 9/2000 | Sudolsky | |
| 6,133,132 A * | 10/2000 | Toprac et al. | 438/595 |
| 6,207,043 B1 | 3/2001 | Vicari et al. | |
| 6,368,975 B1 | 4/2002 | Balasubramhanya et al. | |
| 6,466,877 B1 | 10/2002 | Chen et al. | |
| 6,485,631 B1 | 11/2002 | Ellingsen | |
| 6,505,145 B1 * | 1/2003 | Bjornson | 702/185 |

(Continued)

FOREIGN PATENT DOCUMENTS

EP    0 428 135 A2    5/1991

(Continued)

OTHER PUBLICATIONS

Bell, Michael, Errington, Jamie, NOVA Chemicals Corporation; Reising, Dal Vernon, Mylaraswamy, Dinkar, Honeywell Laboratories; "Early Event Detection—A Prototype Implementation".

(Continued)

*Primary Examiner* — Bryan Bui
(74) *Attorney, Agent, or Firm* — Ron Hartman; Bruce M. Bordelon; Paul E. Purwin

(57) ABSTRACT

The present invention is a method for detecting an abnormal event for process units of a hydrocracking unit. The method compares the operation of the process units to a model developed by principle components analysis of normal operation for these units. If the difference between the operation of a process unit and the normal operation indicates an abnormal condition, then the cause of the abnormal condition is determined and corrected.

36 Claims, 30 Drawing Sheets

U.S. PATENT DOCUMENTS

| | | | |
|---|---|---|---|
| 6,521,080 B2 | 2/2003 | Balasubramhanya et al. | |
| 6,522,978 B1 | 2/2003 | Chen et al. | |
| 6,564,119 B1 | 5/2003 | Vaculik et al. | |
| 6,606,580 B1 | 8/2003 | Zedda et al. | |
| 6,625,569 B2 | 9/2003 | James et al. | |
| 6,636,842 B1 | 10/2003 | Zambrano et al. | |
| 6,681,344 B1 | 1/2004 | Andrew | |
| 6,735,541 B2 * | 5/2004 | Kern et al. | 702/84 |
| 6,760,639 B2 * | 7/2004 | Kallela et al. | 700/111 |
| 6,809,837 B1 * | 10/2004 | Mestha et al. | 358/1.9 |
| 6,813,532 B2 * | 11/2004 | Eryurek et al. | 700/108 |
| 6,904,386 B2 | 6/2005 | Mylaraswamy | |
| 6,907,383 B2 | 6/2005 | Eryurek et al. | |
| 6,917,839 B2 | 7/2005 | Bickford | |
| 6,925,338 B2 * | 8/2005 | Eryurek et al. | 700/30 |
| 6,952,657 B2 * | 10/2005 | Jahns et al. | 702/182 |
| 6,954,713 B2 | 10/2005 | Eryurek | |
| 6,973,396 B1 | 12/2005 | Shah et al. | |
| 6,978,210 B1 * | 12/2005 | Suter et al. | 702/13 |
| 6,980,938 B2 | 12/2005 | Cutler | |
| 7,079,984 B2 | 7/2006 | Eryurek | |
| 7,085,610 B2 | 8/2006 | Eryurek et al. | |
| 7,096,074 B2 | 8/2006 | Yulevitch et al. | |
| 7,181,654 B2 | 2/2007 | Ford, Jr. et al. | |
| 7,243,048 B2 | 7/2007 | Foslien et al. | |
| 7,349,746 B2 | 3/2008 | Emigholz et al. | |
| 7,424,395 B2 | 9/2008 | Emigholz et al. | |
| 2002/0077792 A1 | 6/2002 | Qiu | |
| 2003/0083756 A1 | 5/2003 | Hsiung et al. | |
| 2004/0033617 A1 | 2/2004 | Sonbul | |
| 2004/0078171 A1 | 4/2004 | Wegerich et al. | |
| 2004/0078683 A1 | 4/2004 | Buia et al. | |
| 2004/0172229 A1 | 9/2004 | Aragones et al. | |
| 2005/0067816 A1 | 3/2005 | Buckman | |
| 2005/0141782 A1 | 6/2005 | Guralnik et al. | |
| 2005/0149297 A1 | 7/2005 | Guralnik et al. | |
| 2005/0197805 A1 | 9/2005 | Eryurek et al. | |
| 2005/0267702 A1 | 12/2005 | Shah et al. | |
| 2005/0267710 A1 | 12/2005 | Heavner, III et al. | |
| 2006/0020423 A1 | 1/2006 | Sharpe, Jr. | |
| 2006/0036403 A1 | 2/2006 | Wegerich et al. | |
| 2006/0073013 A1 | 4/2006 | Emigholz et al. | |
| 2007/0005266 A1 | 1/2007 | Blevins et al. | |
| 2007/0088448 A1 | 4/2007 | Mylaraswamy et al. | |
| 2007/0088528 A1 | 4/2007 | Miller | |
| 2007/0088534 A1 | 4/2007 | MacArthur et al. | |
| 2007/0124113 A1 | 5/2007 | Foslien et al. | |

FOREIGN PATENT DOCUMENTS

| | | |
|---|---|---|
| EP | 0 626 697 A1 | 11/1994 |
| JP | 02-2408 A | 1/1990 |
| JP | 10-143343 A | 5/1998 |

OTHER PUBLICATIONS

Bell, Michael B., NOVA Chemicals; Foslien, Wendy K., Honeywell; "Early Event Detection—Results From A Prototype Implementation", 2005 Spring National Meeting Atlanta GA, Apr. 10-14, 17$^{th}$ Annual Ethylene Producers' Conference Session TA006—Ethylene Plant Process Control.

Mylaraswamy, Dinkar, Bullemer, Peter, Honeywell Laboratories; Emigholz, Ken, EMRE, ExxonMobil, "Fielding a Multiple State Estimator Platform", NPRA Computer Conference, Chicago, IL, Nov. 2000.

* cited by examiner

Abnormal Event Detection On-Line Information Flow

Valve to Flow Model

Three Dimensional Redundancy Expressed as a PCA Model

Figure 4
Fuzzy Network Setup
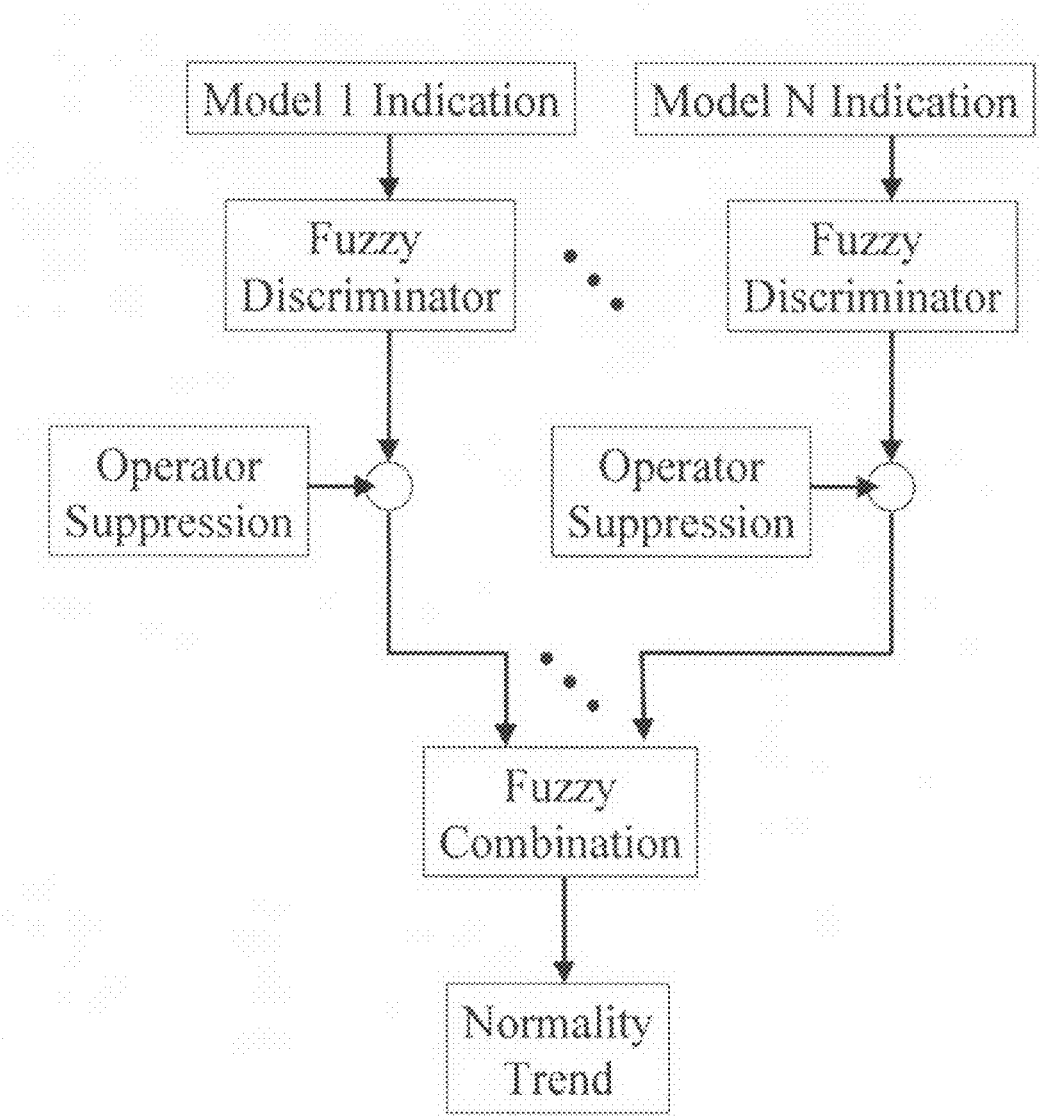
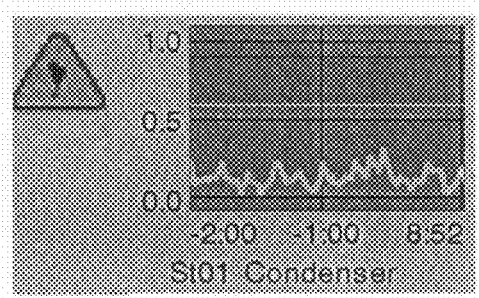

Anatomy of a Process Control Cascade

Anatomy of a Multivariable Constraint Controller, MVCC

On-Line Inferential Estimate of Current Quality

Probability Distribution of Process Data Combined Continuous and Disturbed Operations An Illustration of the Press Statistic Figure 16
Fuzzy Discriminators
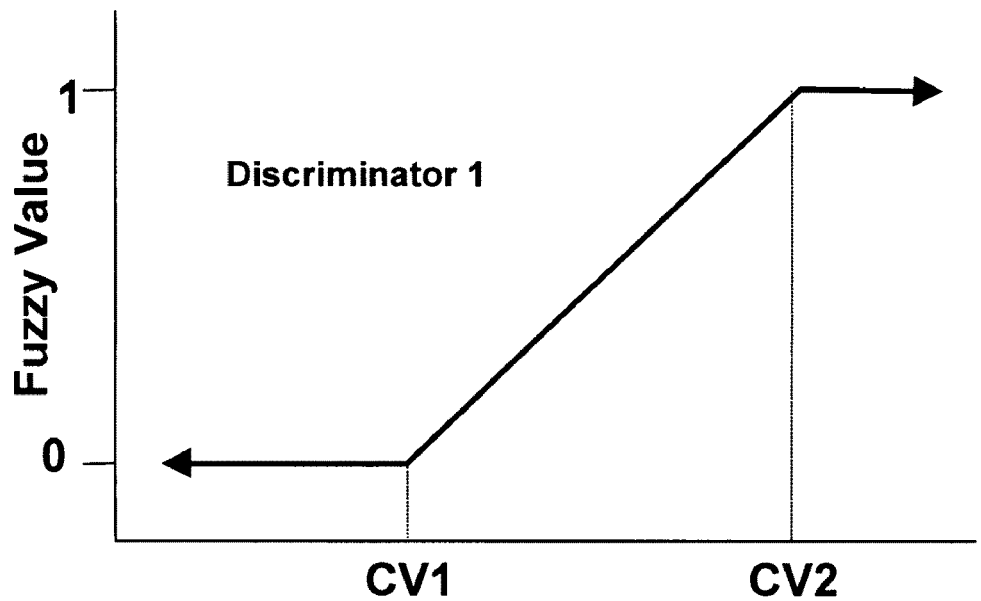
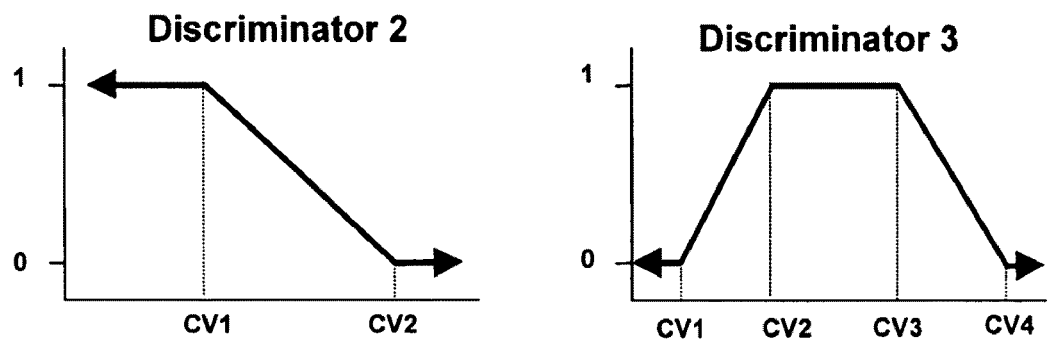
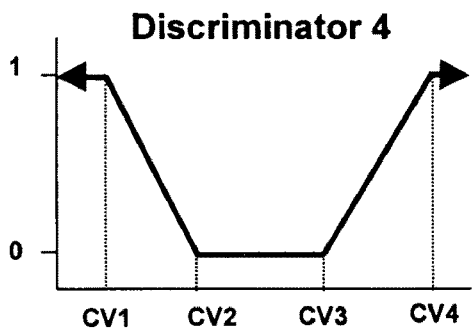

Flow versus Valve Paraeto Chart

Operator Suppression Logic

Event Suppression Logic

Setting the Duration of Event Suppression

PCA Model Suppression

APPLICATION OF ABNORMAL EVENT DETECTION TECHNOLOGY TO HYDROCRACKING UNITS

This application claims the benefit of U.S. Provisional application 60/609,161 filed Sep. 10, 2004.

BACKGROUND OF THE INVENTION

The Hydro Desulfurization and Cracking unit (HDC) is an important process unit within a petroleum refinery. The HDC converts heavy aromatic compounds, typically a combination of cycle oil and coker naptha feeds, into lighter products which can be blended into gasoline and jet fuels. The primary processing equipment for an HDC are multiple sequential fixed bed reactors (for hydrocracking and hydrotreating) and product fractionation columns. Due to the fast dynamics of the process, the highly exothermic kinetics of the reactions, and the large degree of interaction between the process equipment of the HDC, abnormal process operations can arise which cause the HDC to deviate from the normal operating state. Abnormal operations of the HDC can have significant safety and economic consequences. These situations can cause catalyst or equipment damage, lost production, environmental emissions, injuries or fatalities. A primary responsibility of the console operator is to identify the root cause of an abnormal situation and to perform corrective actions within sufficient time to avoid potentially severe consequences.

The current industry practice is to use a combination of base and advanced process control applications to automatically mitigate minor process disturbances. The current industry practice also relies on human intervention for moderate abnormal operations and automated emergency shutdown systems for severe abnormal operations. At present, the console operator is notified of the onset of an abnormal condition through process alarms. These alarms are triggered when key process measurements (temperatures, pressures, flows, levels and compositions) violate static operating ranges. This notification technology is challenged to provide timely alarms while sustaining an acceptable rate of false notifications when the key measurements are correlated for complicated processes such as an HDC.

For the typical HDC unit, there are in excess of 550 critical process measurements. Under the conventional Distributed Control System ("DCS") system, the operator must survey the critical sensors presented in both tabular and trend format, validate the behavior against expected normal operating values, and discover potential problem(s).

Due to the large number of sensors in an HDC, the onset of abnormality can easily be overlooked. With the current DCS based monitoring technology, the only automated detection assistance an operator has is the DCS alarm system which is based on the alarming of individual sensors upon violation of predetermined limits. Due to the complexity and the fast dynamics of an HDC, this type of notification is often delivered too late to enable the console operator to have sufficient time to identify and take preventive action to mitigate the problem. The present invention provides a more effective notification to the operator of the HDC.

SUMMARY OF THE INVENTION

The invention is a method for detecting an abnormal event for several process units of an HDC. The method compares the operations of several of the process units to a model of normal operation for those units. If the difference between the sensor values and the model for normal operation exceed defined tolerances, the system alerts the operator of a probable abnormal condition in a process unit. The system also provides the operator with a hierarchical display of the sensor values which most deviated from the model for normal operation. The console operator utilizes this information to diagnose the underlying cause of the abnormal operation and take corrective action. Multivariate statistical models and engineering models, such as material and energy balances, are used to identify abnormal operations.

BRIEF DESCRIPTION OF THE DRAWINGS

FIG. 4 shows a schematic diagram of a fuzzy network setup.

FIG. 16 shows a type 4 fuzzy discriminator.

DETAILED DESCRIPTION OF THE PREFERRED EMBODIMENTS

The present invention is a method to provide abnormal event detection (AED) to the operator indicating that sections of a petroleum refinery hydrocracker unit are not functioning properly.

The method uses fuzzy logic (described below) to inspect multiple supportive evidence of abnormal situations that contribute to an operational problem and estimates its probability in realtime. The probability is presented in a continuous format to alert the operator. This method includes a set of tools which enable the operator to derive the root cause of a problem for focused action. This approach has been demonstrated to provide the operator with an advanced warning of the onset of abnormal operation that can be minutes to hours sooner than the alarm system. With additional time, the operator is able to take action sooner preventing escalation of the event. This method has been successfully applied to the HDC.

The HDC application uses specific operational knowledge of the process in combination with indications from Principal Component Analysis models, engineering models, and relevant sensor readings. A fuzzy logic network aggregates the evidence and indicates the confidence level of a potential problem. Therefore, the network can detect a problem with higher confidence at its early stage and provide valuable time for the operator to make compensatory or corrective actions to avoid an operational incident on the HDC. For a more detailed description of fuzzy networks, see Appendix 1.

The HDC unit is divided into equipment groups (referred to as key functional sections, or operational sections). These equipment groups may be different for different HDC units depending on its design. The procedure for choosing equipment groups which include specific process units of the hydrocracking unit is described in Appendix 1.

Figure 30:
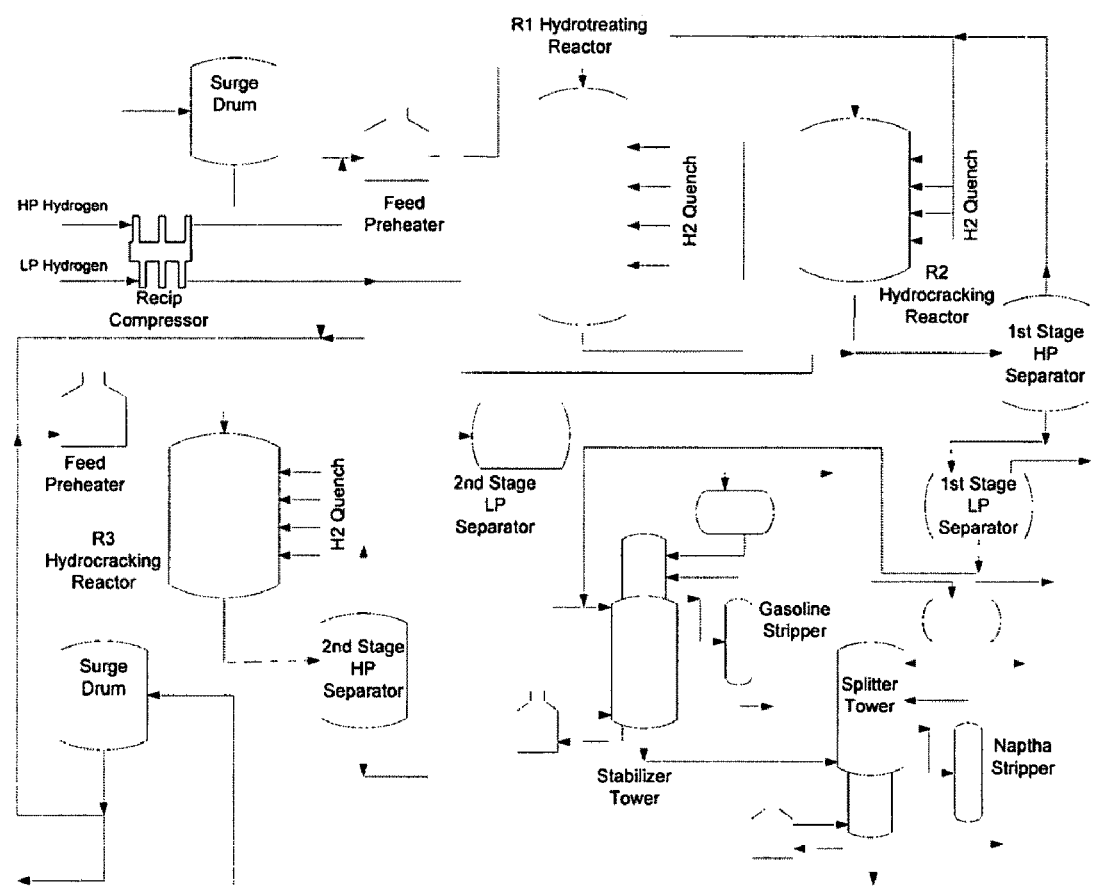
FIG. 30 shows a schematic diagram of a hydrocracker unit.

FIG. 30 shows a schematic diagram of a typical HDC unit. In the preferred embodiment for this HDC unit, the present invention divides the HDC operation into key functional sections. A typical HDC unit can be divided as follows:

1. 1st & 2nd Stage Reactors (R1 & R2)
2. 3rd Stage Reactor (R3)
3. Fractionation Section (stabilizer and splitter)

Besides monitoring these functional areas, this invention also checks for consistency between the following:

1. Flow measurements and valve position for key control valves
2. Redundant level sensors in the high & low pressure hydrogen recovery units
3. Fractionation purity analyzers and engineering models
4. Product quality lab data and engineering models The invention also enables the operator to selectively remove sensors from the models in the event that the sensor is out of service and also provides suppression of model calculations to eliminate false positives on special cause operations.

A. Operator Interface

The display is intended to give the operator a view of the probability that there is an abnormal event affecting the process unit.

Figure 23:
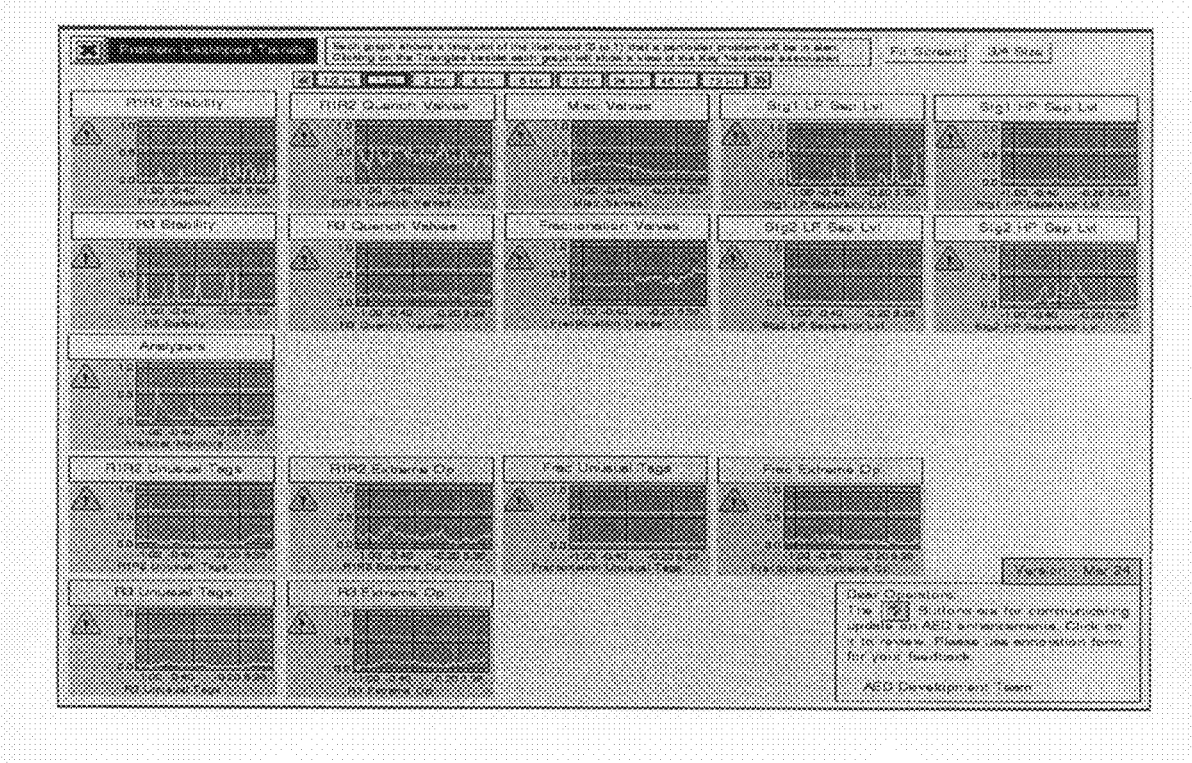
FIG. 23 shows the operator overview of the HDC operation decomposed into 15 individual monitors.

FIG. 23 shows the operator overview display of the HDC unit. The overview display is comprised of fifteen time-series plots (or monitors). For each monitor there is at least one underlying model, either multivariable statistical models or engineering models. Each monitor contains a list of abnormal indications for the operational area and uses a fuzzy network (described below) to aggregate abnormal indications. Based upon specific knowledge about the normal operation the focus areas and functional areas, a fuzzy network was developed to take the input from sensors and model residuals to evaluate the probability of an abnormal event. The estimated probability of an abnormal condition is displayed to the console operator on a continuous time series plot to indicate the condition's evolution over time, as illustrated in FIG. 23. When the aggregate probability reaches a prescribed trigger (e.g. 0.6), the problem indicator turns yellow (warning) and the indicator turns red (alert) when the probability reaches a second trigger (e.g. 0.9).

This invention contains three Principle Component Analysis (PCA) models and numerous engineering models (described in more detail below) to characterize normal operation of the HDC. The boundaries for each of the PCA models was derived to account for heat and energy integration between units rather than functional boundaries. To illustrate this point, the three sequential fixed bed reactors, R1 (hydrotreating), R2 (hydrocracking) and R3 (hydrocracking), were modeled using 2 PCA models. The first PCA model encompasses R1 and R2 (and associated units). The second PCA model contains R3 (and associated units). R1 & R2 were lumped into a single PCA model due to the recycle of recovered hydrogen between the units. Similarly, the fractionation section (stabilizer and splitter towers) was modeled using a single PCA model due to tight energy integration (i.e. direct contact heat exchangers) between units rather than separate PCA models for each tower. In the preliminary design, separate PCA models for each tower were developed but were discarded in favor of a single PCA model for the entire fractionation section. Model validation studies indicated that the single PCA model for the fractionation section was more robust and better captured normal operation of the process. For a more detailed description of the model partitioning methodology, see Subsection I.A under the heading "Developing PCA models for Abnormal Event Detection" of Appendix 1.

Figure 29:
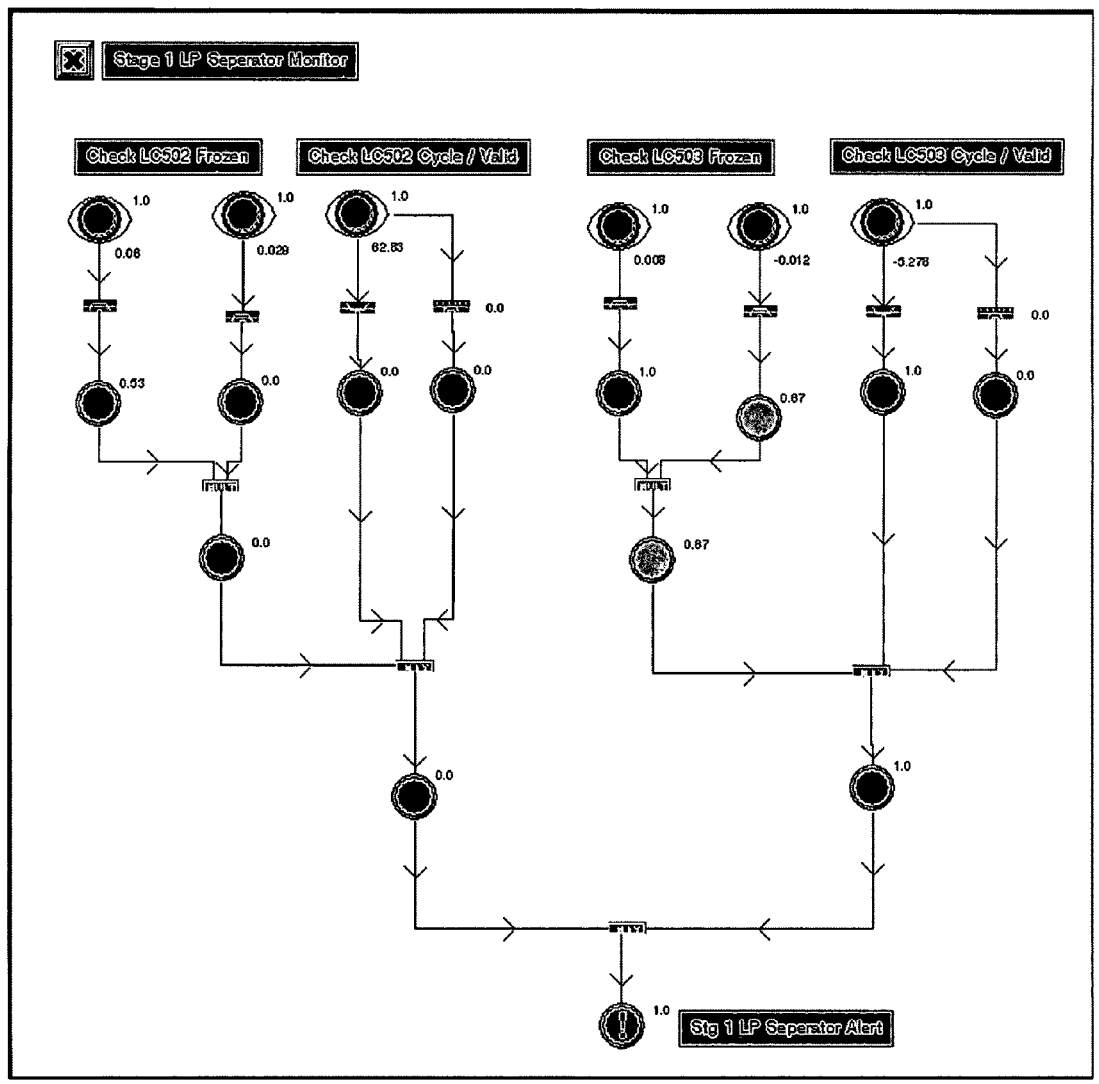
FIG. 29 shows the Fuzzy Logic network for the Stg1 LP Separator Level engineering model.

During normal operation of the HDC the console operator performs a number of special cause operations, such as feed rate changes and recip compressor LP discharge pressure changes, to balance inventories or to steer the HDC to a preferred state. These special cause operations will produce high residuals to some sensors in affected PCA models. Since special cause operations are console operator initiated, this invention contains suppression methodologies to detect the onset of special cause operations and to prevent notification of the operator. FIG. 29 shows the fuzzy logic network for the first stage low pressure separator monitor. For a more detailed description of PCA model implementation, see Subsection I under the heading "Deploying PCA models and Simple Engineering Models for Abnormal Event Detection" of Appendix 1.

Figure 24:
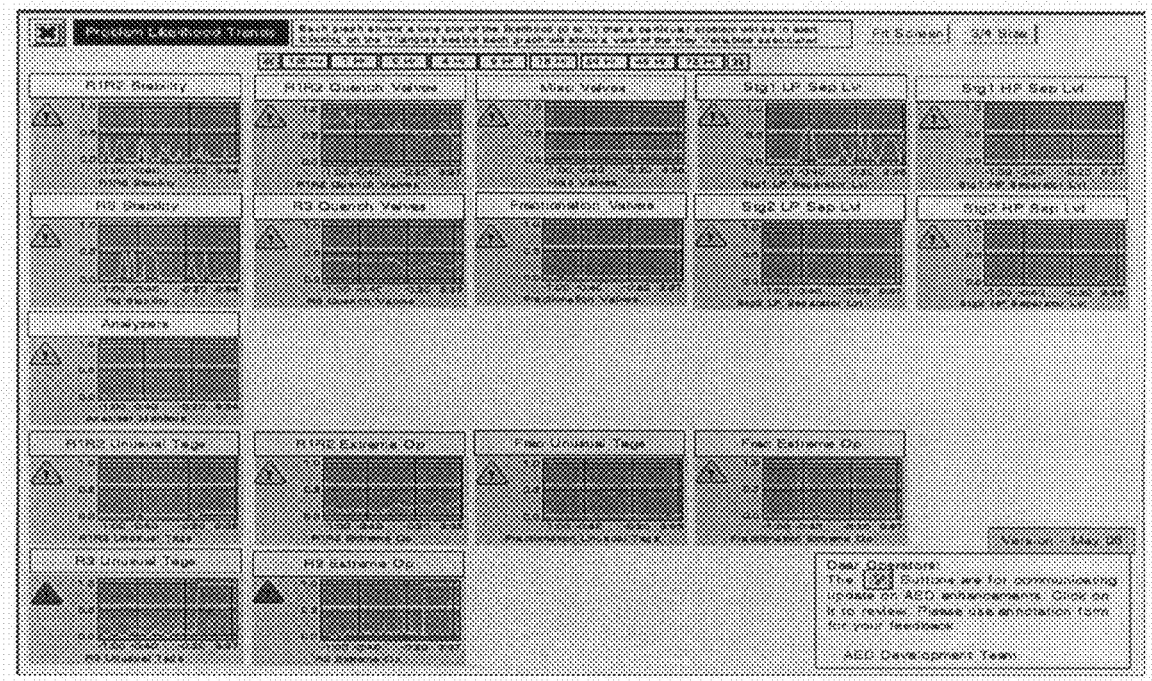
FIG. 24 shows that the R3 Unusual Tags and R3 Extreme Op have a warning alert.
Figure 25:
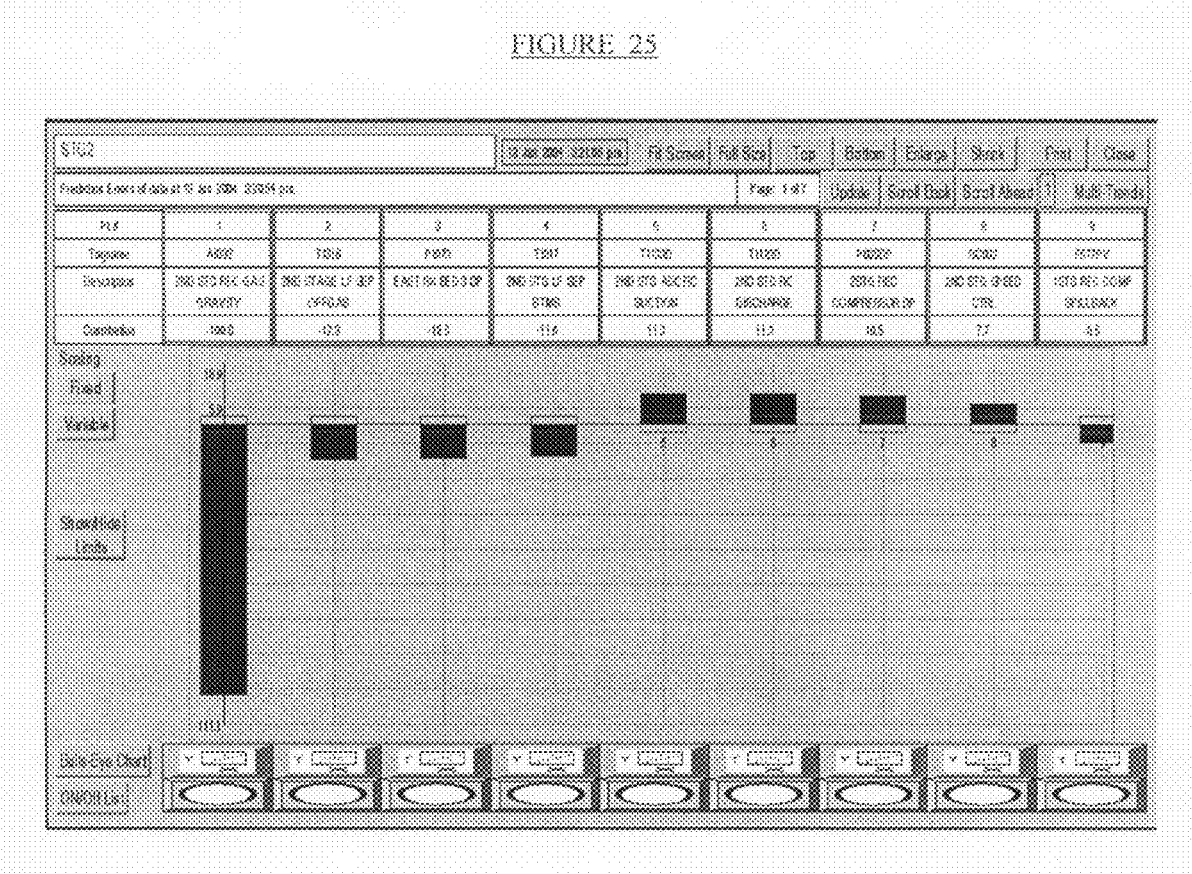
FIG. 25 shows that clicking on the red triangle on the R3 Unusual Tags display of FIG. 24 brings up this pareto chart indicating that the residual of sensor AI092 is outside of its tolerance limit.

The console operator receives notification of the onset of an abnormal condition when the triangle icon for a monitor turns yellow or red (from green), as shown in FIG. 24. The application provides the operator with the ability to further investigate the problem by viewing a prioritized list of the associated subproblems. Once the operator receives an indication of an abnormal condition, such as the warning alert indicated by the yellow triangle in FIG. 2, this novel method provides the operator with ability to investigate each subproblem to determine root cause of the abnormality detected by the application. This functionality is illustrated by FIG. 25. FIG. 25 demonstrates the presentation of a list of sensors organized in the form of a Pareto chart for presentation to the console operator.

Figure 26:
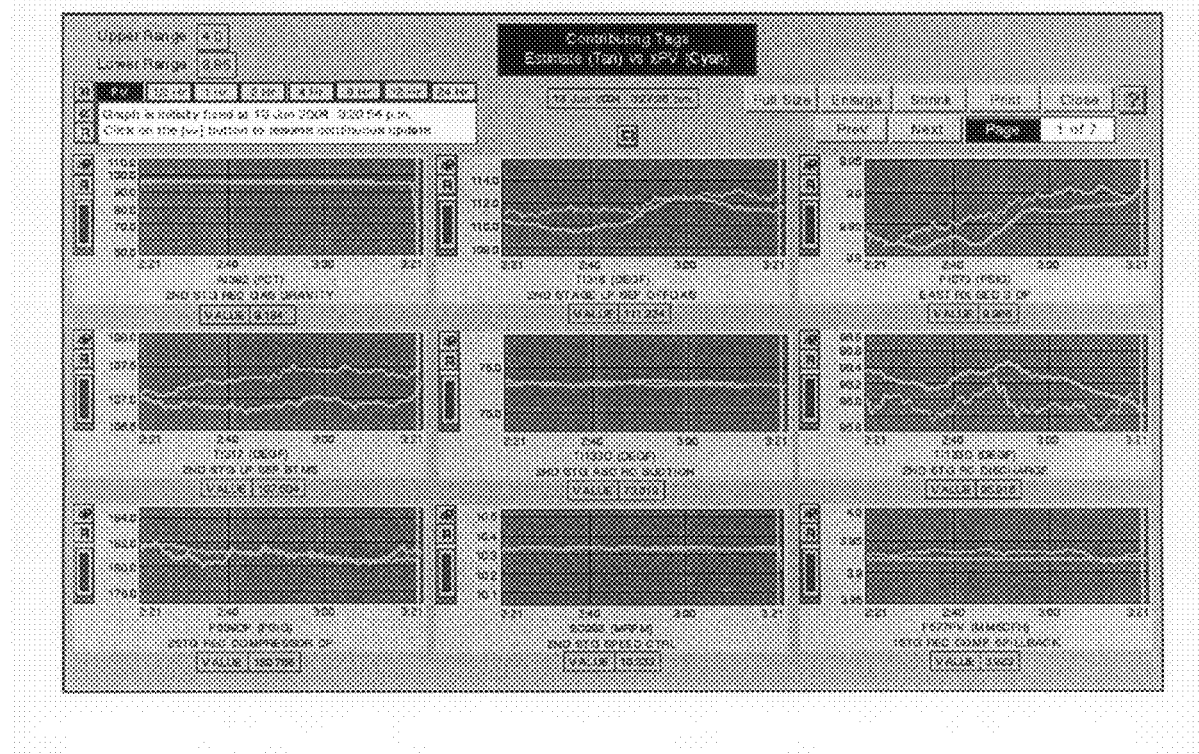
FIG. 26 shows the trends of the process measurement and the model predictions of the sensors for the Pareto chart of FIG. 25.
Figure 27:
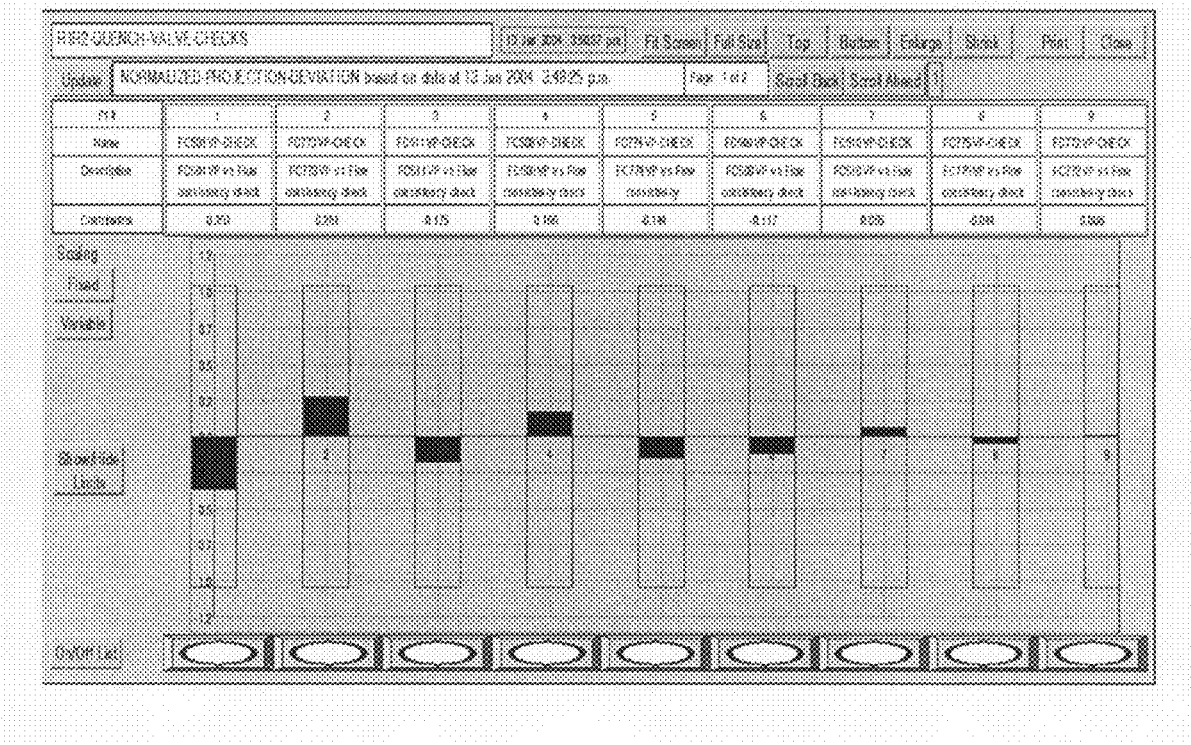
FIG. 27 shows a Pareto ranking of the valve-flow models sorted by the normalized deviation error.
Figure 28:
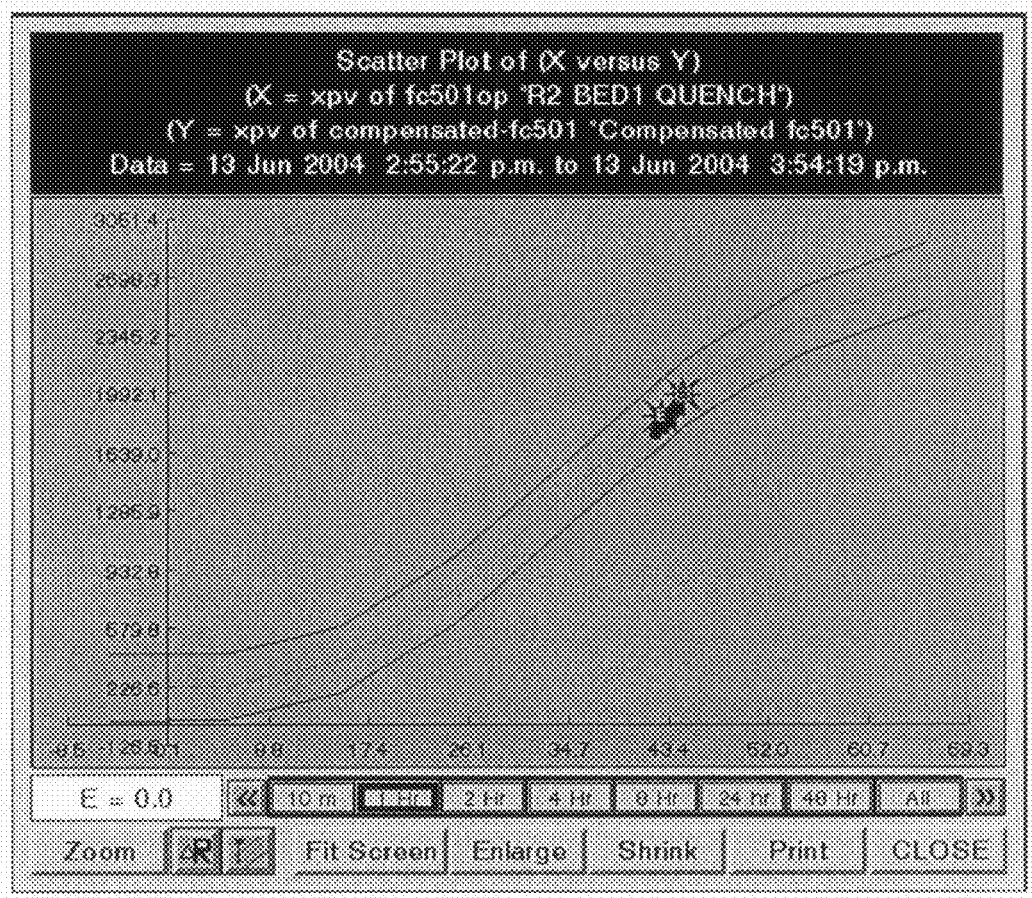
FIG. 28 shows the details of the valve-flow model obtained from the bar chart of FIG. 27.

This application frequently uses Pareto charts to organize information for presentation to the operator. As an example, FIG. 27 demonstrates a Pareto ranking of the valve-flow models based on normalized-projection-deviation error. By convention, the variable, measurement or sensor which most deviates from normal operation is placed in the left-most position. When the root cause of an event cannot be determined from the pareto chart, the operator can elect to further investigate by clicking on an individual bar from the chart. This operation will typically generate either a custom display containing multiple time series plots of the critical sensors of a functional area of the HDC, shown in FIG. 26, or an x-y plot, shown in FIG. 28.

In summary, the advantages of this invention include:
1. The decomposition of the entire HDC operation into several (e.g. 15) monitors for operator surveillance
2. Operator notification of abnormal operation of the entire HDC through several (e.g. 15) monitors
3. The PCA models provide predictions of a large number of sensors (greater than 300) in the HDC
4. The abnormal deviations of these large number of sensors are summarized by the alerts derived from the Sum of Square Error of the PCA models.
5. Events resulting from special cause operation are suppressed to eliminate false positives. The high false positive rate of a single sensor alarm is resolved by the PCA modeling.

B. Development of AED Models for a Hydrocracker

This application employs both PCA models and engineering models (and heuristics) to detect abnormal operation in an HDC. The overall development methodology of these models is generally described in Appendix 1. The development of models for hydrocracking unit is described below.

Engineering Model Design

The engineering model requirements for the HDC application were determined by: performing an engineering evaluation of historical process data from the HDC and interviews with console operators and equipment specialists. The engineering evaluation also included an evaluation of worst case scenarios for HDC operation. This process generated the following general conclusions:

The reactor quench system has a significant effect on safe and reliable operation of the HDC
Detection of the onset of both stable and unstable sustained temperature and pressure oscillations in the reactor beds is required
Changes in feed quality (e.g. the percentage of coker naptha in the feed) are significant upstream disturbances which impact the hydrogen consumption and the reactor temperature profile
Focus areas for instrumentation and base control system:
Quench and hydrogen flow measurement integrity
HP/LP separator operation
Product quality analyzers
Monitoring compressors desirable but better accomplished with higher frequency diagnostic systems To address the conclusions from the engineering assessment, the following engineering models were developed for the example HDC AED application:
Flow/valve position consistency monitors
Quench demand estimation
Inferential estimates of product quality analyzers
  nC4 in stabilizer gasoline draw
  iC5 in stabilizer overhead
  90% point (T90) kerosene draw
Inferential estimates of kerosene product quality lab measurements
  Kero flash point temperature
  Kero freeze point temperature
HP/LP separator monitors
  Redundant level measurement cross check comparisons
  Level measurement range check
  Level measurement cycling detection
  Frozen level measurement detection
Reactor stability monitor
  Quench flow cycle detection
  Bed temperature cycle detection
  Total quench flow cycle detection
  Reactor offgas oscillation detection The flow/valve position consistency monitor was derived from a comparison of the measured flow (compensated for the pressure drop across the valve) with a model estimate of the flow. The model estimate of the flow is obtained from historical data by fitting coefficients to the valve curve equation (assumed to be either linear or parabolic). In the initial application, 37 flow/valve position consistency models were developed. This type of model was developed for individual quench flow control loops, all feed and product flow control loops, hydrogen recovery flow control loops, fractionation reflux control loops, and fractionation bottoms flow control loops. Several models were also developed for control loops which historically exhibited unreliable performance. A more detailed development of flow/valve consistency monitors, see Subsection I.A of the "Simple Engineering Models for Abnormal Event Detection" section of Appendix 1.

A time-varying drift term was added to the model estimate to compensate for long term sensor drift. The operator can also request a reset of the drift term after a sensor recalibration or when a manual bypass valve has been changed. This modification to the flow estimator significantly improved the robustness for implementation within an online detection algorithm. The flow/valve consistency monitors also notify the operator in the event that a control valve is fully opened or closed. For a more detailed description of compensation for non-stationary operations, see Subsection IV.F of the "Developing PCA models for Abnormal Event Detection" section included in Appendix 1.

The inferential models for the product analyzers and lab measurements are simple linear models fitted using partial least squares (PLS) regression. To improve the fit of the models, a number of well known heuristics were employed including: log transformation of composition analyzers and tower overhead pressures, dynamic compensation of the model inputs, conversion of flows to dimensionless ratios, and applying pressure compensation to tray temperatures under VLE. The motivation for using these types of transformations is summarized in Subsection IV.D in the "Developing PCA models for Abnormal Event Detection" section of Appendix 1.

Loss of level in the HP/LP separators would cause a number of significant issues for the example HDC unit, including trigger of the safety systems. As a result, a fuzzy network was developed to monitor liquid level in the separator drums. For the example HDC unit, the following four conditions are monitored: level measurement within range, level measurement active (not frozen), significant oscillation in the level measurement, and the primary level measurement agrees with back-up measurements (when available). The first two conditions can be detected using conventional signal validation algorithms in the DCS. This application incorporates additional criteria, including oscillation detection, to provide the operator with more robust detection of abnormal operation of the HP/LP separators. A summary of a representative configuration strategy for HP/LP monitoring is shown in Table 6.

Due to the highly exothermic nature of the hydrocracking reactions, stable operation of the fixed bed reactors is a significant concern for the process operator. Cooling to the reactor beds is provided by quench hydrogen. Since the quench hydrogen is typically provided to by a common header, a pressure oscillation in a single bed can trigger temperature oscillations in several beds or reactors. The amplitude of the oscillation can be amplified downstream due to product transport effects. For the example HDC unit, effective diagnosis of temperature and pressure oscillations at the onset can provide the operator with an opportunity to intervene before the upset propogates to multiple beds (in which case more aggressive actions may be required of the operator to mitigate the upset). This application uses a novel application of fuzzy networks to monitor multiple temperature and flow indicators for oscillations to assess reactor stability. Within the reactor stability monitor, instrumentation is inspected to determine if the amplitude exceeds a certain threshold or the amplitude is increasing monotonically over a specified time horizon. R1 and R2 are monitored jointly due to common supply of recycled hydrogen. R3 is treated independently. This is consistent with the partitioned treatment of the reactors in the PCA models. The amplitude triggers for each substituent measurement were obtained by offline analysis of historical data. A summary of a representative set of reactor stability monitors is shown in Table 4 for R1R2 and Table 5 for R3.

PCA Model Design

PCA transforms the actual process variables into a set of independent variables called Principal Components (PC) which are linear combinations of the original variables. The PCA model structure is shown in Equation 1. It has been observed that the underlying process has a number of degrees of freedom which represent the specific independent effects that influence the process. These different independent effects show up in the process data as process variation. Process variation can be due to intentional changes, such as feed rate changes, or unintentional disturbances, such as ambient temperature variation.

$$PC_i = \Sigma A_{i,1}*X_1 + A_{i,2}*X_2 + A_{i,3}*X_3 + \quad \text{Equation 1}$$

Each principal component captures a unique portion of the process variability caused by these different independent influences on the process. The principal components are extracted in the order of decreasing process variation. Each subsequent principal component captures a smaller portion of the total process variability. The major principal components should represent significant underlying sources of process variation. As an example, the first is principal component often represents the effect of feed rate changes since this is usually the largest single source of process changes.

For an individual principle component, the coefficients with the largest magnitude are indicative of the measurements with the greatest contribution to a particular PC. Engineering judgment can be utilized to view each group of variables which are the major contributors to a PC and assign a name indicating cause (e.g. feed rate effect) to that PC. For a further discussion of PCA models, see Subsections I-V of the "Developing PCA models for Abnormal Event Detection" section of Appendix 1.

HDC Model Development

The initial application design involves two significant decisions: how to partition the example HDC unit for PCA model development and determination of engineering model requirements. Failure to correctly partition the plant for PCA model development can have a significant impact on the data requirements and the ability to adequately represent normal operation of the plant. The rationale for partitioning the example HDC operation into 3 PCA models (lumped R1 & R2 reactors, R3 reactor, and fractionation) has been discussed previously.

The PCA model developer makes two critical decisions to arrive at the initial model: 1) measurement selection and 2) data pre-processing (to remove outliers and "bad" values from the data set). The following methodology, condensed from Subsection II of the "Developing PCA models for Abnormal Event Detection" Section of Appendix 1, was employed to select the initial measurement set for this application:

Select all controller PV's, SP's and Outputs for streams which cross the boundaries of the major processing units (e.g. quench flow controllers, stabilizer bottoms flow rate, . . . )

Incorporate controller PV's, SP's and Outputs for internal streams used by to position the unit (e.g. tower pumparounds, reflux flows, . . . ) or monitor the process Incorporate additional measurements used by contact engineers to monitor process operation Incorporate additional measurements regarded by process experts as essential to monitor process operation When available, incorporate:
Any upstream measurements of feedrate, feed temperature, or indicators of feed quality changes
Any redundant measurements of critical instrumentation
Any external measurements of a measured disturbance (e.g. ambient temperature)
Select additional measurements that may be required to perform nonlinear transformations Any measurements that were known to be unreliable or exhibit erratic behavior were also removed from the list. Application of this selection methodology typically results in the elimination of approximately 60% of the total measurements from the plant for PCA model development. Additional measurement reduction is performed using an iterative procedure once the initial PCA model is obtained.

Data Pre-Processing

Development of a PCA model is an iterative procedure. The approach utilized to develop PCA models for AED initially produces a very rough model using all candidate measurements defined above. It is difficult to initially remove all outliers since the initial training set to contain 100,000+ data points. The initial model was used to evaluate the training data to eliminate additional outliers using the subsequent procedure.

Using the operating logs, data contained within windows with known unit shutdowns or abnormal operation were removed. Each candidate measurement was scrutinized to determine appropriateness for inclusion in the training data set. Measurements which were excluded exhibited the following characteristics (described in Subsection III.A of the "Developing PCA models for Abnormal Event Detection" section of Appendix 1):

Long periods of time which the historian has labeled the data as "BAD PV"
Occupy excessive periods of time at either the EUHigh or EULow value Show unusually low variability (except measurements which are tightly controlled to a setpoint)

Excessive noise or high variability relative to their operating range

Measurements which exhibited low signal to noise ratio or poor correlation with other related measurements were omitted using engineering judgment.

Before building the initial rough PCA model, a final inspection of the data set was performed to eliminate brief time periods where the measurements contained "BAD PV" or were pegged to their respective EUHigh or EULow limits.

For a number of reasons (summarized in Subsection IV.D in the "Developing PCA models for Abnormal Event Detection" section of Appendix 1), well known transformations were applied to individual measurements. Since one of the assumptions of PCA is that the variables in the model are linearly correlated, significant process or equipment nonlinearities break down this correlation structure and show up as a deviation from the model. Based upon an engineering assessment of the specific process equipment and process chemistry, known nonlinearities in the process were transformed and included in the model. Examples of well known nonlinear transforms include:

Reflux to feed ratio in distillation columns

Reactor bed differential temperatures and pressures

Log of composition in high purity distillation columns

Pressure compensated temperature measurements

Reaction rate to exponential temperature

The raw data from the data historian was nonstationary. The data contained operating point changes performed by the console operator. To prevent these changes from appearing as abnormal events, the data was converted to deviation variables by subtracting the exponentially filtered value of a measurement from its raw value and using this difference in the model. The time constant for the exponential filter should be large (on the order of the dominant process time constant). For the example HDC unit, a 60 minute time constant was utilized. For a more detailed description of AED applications for nonstationary processes, see Subsection IV.F of the "Developing PCA models for Abnormal Event Detection" section of Appendix 1.

Ideally, the training data set should characterize all normal excitation and disturbances that the process experiences. This can be frequently accomplished by gathering data over a sufficiently long period of time (several months or a year). If a single type of disturbance dominates the training data, other modes of process operation will be underrepresented and the resultant models will not achieve the desired performance. It may be necessary to remove data from the training set to prevent this situation from occurring.

Building an Initial Model

Once the specific measurements have been selected and the training data set has been built, the model can be built quickly using standard tools. An implicit assumption is that each measurement will be scaled to unit variance prior to obtaining the model coefficients. Many of the standard tools scale the variables automatically.

It is not important for the developer to scrutinize the number of principle components in the initial model. Typically the model developer can specify a default number of principle components (e.g. 1 principle component for every 20 measurements in the data set) and attempt to identify a model that produces the minimal residual error from the training data set.

The initial model is used by the developer for two purposes: 1) to identify problematic regions in the training data set, and 2) to eliminate unnecessary measurements from the training data set.

Since the training data sets are typically large (1 minute data samples for up to 1 year), it is unlikely that all outliers will be eliminated from the training data in the data preprocessing step. Regions with large model mismatch between the training data and the prediction from the initial model should be identified and compared with operating logs to determine if an abnormal operation was occurring in the process at that time. The training data set should be modified to exclude regions in which the developer believes an abnormal event was occurring. Discretion must be used by the developer to ensure that the validity of the training data set is preserved. Additional discussion is provided in Subsection II.A of the "Developing PCA models for Abnormal Event Detection" section of Appendix 1.

The measurement selection process typically produces a comprehensive set of sensors. Analysis of the scaled model coefficients was used to eliminate approximately 20% of the measurements from the training set. Engineering judgment should be used to determine which measurements to eliminate from the training data set.

Refining the Model

The objective is to identify a PCA model which suitably represents the training data with the minimal number of coefficients. It has been demonstrated in the literature that "overfitting" the training data (using more principle components or sensors than required) can produce a model that is not suitable for application in an online system such as AED. An iterative procedure was used to produce models with a suitable number of principle components. The iterative procedure considered the amount of variation modeled by successive principle components (calculated by a standard statistical software package) and the model residual.

C. Model Implementation

Successful deployment of AED on a process unit requires a combination of accurate models, a well designed user interface and proper trigger points.

Engineering Model Deployment

The procedure for implementing the engineering models within AED is fairly straightforward. For the models which identify specific known types of behavior within the unit (e.g. sustained oscillation of reactor bed temperature & pressure, LP/HP separator operation), the trigger points for notification were determined from the analysis of historical data in combination with console operator input. For the computational models (e.g. flow/valve position models, inferred analyzer comparison), the trigger points for notification were initially derived from the standard deviation of the model residual. For the first several months of operation, known AED indications were reviewed with the operator to ensure that the trigger points were appropriate and modified as necessary.

Under certain circumstances, the valve/flow diagnostics could provide the operator with redundant notification. Model suppression was applied to the valve/flow diagnostics to provide the operator with a single alert to a problem with a valve/flow pair.

PCA Model Deployment

Variation in the process data does not typically have a normal or gaussian distribution. As a result, the trigger for detecting an abnormal event cannot be derived from the variability of the residual error. Some rules of thumb have been developed for AED to obtain initial values for the triggers from the $SPE_x$ statistic for the training data set (also referred to as the Q statistic or the $DMOD_x$ statistic). This guideline was developed to provide reasonable confidence that the console operator will be alerted to true abnormal events without being overwhelmed by false alarms. For additional details, refer to Subsection VI of the "Developing PCA models for Abnormal Event Detection" section of Appendix 1.

Over time, the developer or site engineer may determine that it is necessary to improve one of the models. Either the process conditions have changed or the model is providing a false indication. In this event, the training data set could be augmented with additional process data and improved model coefficients could be obtained. The trigger points can be recalculated using the same rules of thumb mentioned previously.

Old data that no longer adequately represents process operations should be removed from the training data set. If a particular type of operation is no longer being done, all data from that operation should be removed. After a major process modification, the training data and AED model may need to be rebuilt from scratch.

Appendix 1

Events and disturbances of various magnitudes are constantly affecting process operations. Most of the time these events and disturbances are handled by the process control system. However, the operator is required to make an unplanned intervention in the process operations whenever the process control system cannot adequately handle the process event. We define this situation as an abnormal operation and the cause defined as an abnormal event.

A methodology and system has been developed to create and to deploy on-line, sets of models, which are used to detect abnormal operations and help the operator isolate the location of the root cause. In a preferred embodiment, the models employ principle component analysis (PCA). These sets of models are composed of both simple models that represent known engineering relationships and principal component analysis (PCA) models that represent normal data patterns that exist within historical databases. The results from these many model calculations are combined into a small number of summary time trends that allow the process operator to easily monitor whether the process is entering an abnormal operation.

Figure 1:
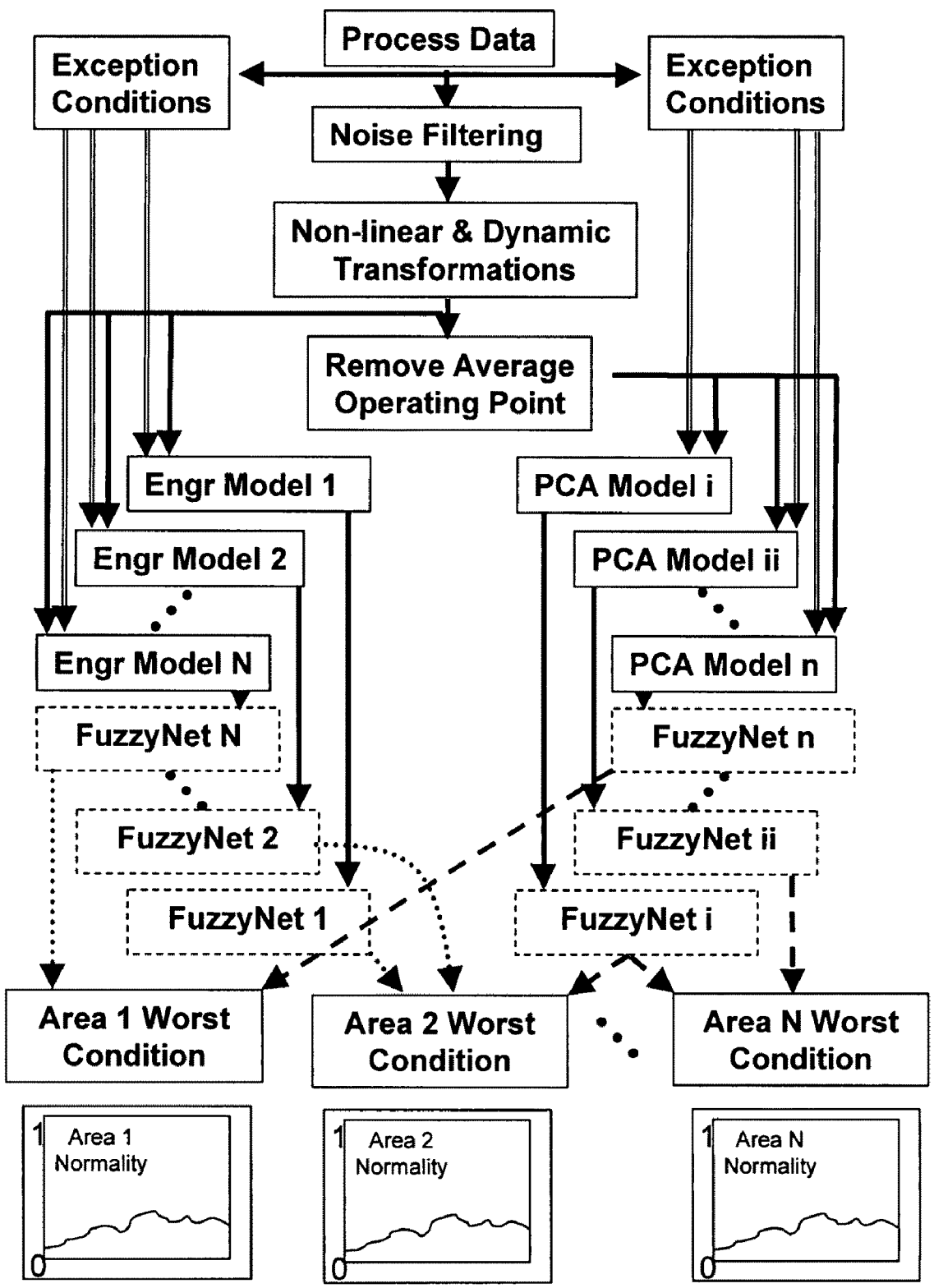
FIG. 1 shows how the information in the online system flows through the various transformations, model calculations, fuzzy Petri nets and consolidation to arrive at a summary trend which indicates the normality/abnormality of the process areas.

FIG. 1 shows how the information in the online system flows through the various transformations, model calculations, fuzzy Petri nets and consolidations to arrive at a summary trend which indicates the normality/abnormality of the process areas. The heart of this system is the various models used to monitor the normality of the process operations.

The PCA models described in this invention are intended to broadly monitor continuous refining and chemical processes and to rapidly detect developing equipment and process problems. The intent is to provide blanket monitoring of all the process equipment and process operations under the span of responsibility of a particular console operator post. This can involve many major refining or chemical process operating units (e.g. distillation towers, reactors, compressors, heat exchange trains, etc.) which have hundreds to thousands of process measurements. The monitoring is designed to detect problems which develop on a minutes to hours timescale, as opposed to long term performance degradation. The process and equipment problems do not need to be specified beforehand. This is in contrast to the use of PCA models cited in the literature which are structured to detect a specific important process problem and to cover a much smaller portion of the process operations.

To accomplish this objective, the method for PCA model development and deployment includes a number of novel extensions required for their application to continuous refining and chemical processes including:

criteria for establishing the equipment scope of the PCA models criteria and methods for selecting, analyzing, and transforming measurement inputs developing of multivariate statistical models based on a variation of principle component models, PCA developing models based on simple engineering relationships restructuring the associated statistical indices preprocessing the on-line data to provide exception calculations and continuous on-line model updating using fuzzy Petri nets to interpret model indices as normal or abnormal using fuzzy Petri nets to combine multiple model outputs into a single continuous summary indication of normality/abnormality for a process area design of operator interactions with the models and fuzzy Petri nets to reflect operations and maintenance activities These extensions are necessary to handle the characteristics of continuous refining and chemical plant operations and the corresponding data characteristics so that PCA and simple engineering models can be used effectively. These extensions provide the advantage of preventing many of the Type I and Type II errors and quicker indications of abnormal events.

This section will not provide a general background to PCA. For that, readers should refer to a standard textbook on PCA, see e.g. E. Jackson's "*A User's Guide to Principal Component Analysis*", John Wiley & Sons, 1991.

The classical PCA technique makes the following statistical assumptions all of which are violated to some degree by the data generated from normal continuous refining and chemical plant process operations:

1. The process is stationary—its mean and variance are constant over time.
2. The cross correlation among variables is linear over the range of normal process operations
3. Process noise random variables are mutually independent.
4. The covariance matrix of the process variables is not degenerate (i.e. positive semi-definite).
5. The data are scaled "appropriately" (the standard statistical approach being to scale to unit variance).
6. There are no (uncompensated) process dynamics (a standard partial compensation for this being the inclusion of lag variables in the model)
7. All variables have some degree of cross correlation.
8. The data have a multivariate normal distribution Consequently, in the selection, analysis and transformation of inputs and the subsequent in building the PCA model, various adjustments are made to evaluate and compensate for the degree of violation.

Once these PCA models are deployed on-line the model calculations require specific exception processing to remove the effect of known operation and maintenance activities, to disable failed or "bad acting" inputs, to allow the operator observe and acknowledge the propagation of an event through the process and to automatically restore the calculations once the process has returned to normal.

Use of PCA models is supplemented by simple redundancy checks that are based on known engineering relationships that must be true during normal operations. These can be as simple as checking physically redundant measurements, or as complex as material and engineering balances.

The simplest form of redundancy checks are simple 2×2 checks, e.g.

temperature 1=temperature 2
flow 1=valve characteristic curve 1 (valve 1 position)
material flow into process unit 1=material flow out of process unit 1

Figure 2:
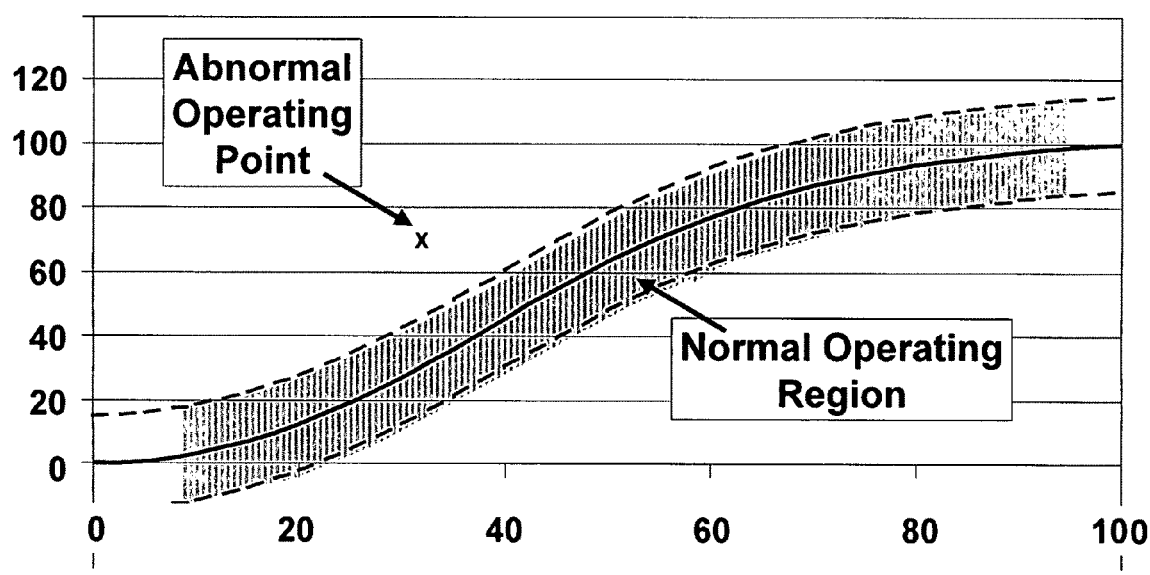
FIG. 2 shows a valve flow plot to the operator as a simple x-y plot.

These are shown to the operator as simple x-y plots, such as the valve flow plot in FIG. 2. Each plot has an area of normal operations, shown on this plot by the gray area. Operations outside this area are signaled as abnormal.

Multiple redundancy can also be checked through a single multidimensional model. Examples of multidimensional redundancy are:

pressure 1=pressure 2= . . . =pressure n
material flow into process unit 1=material flow out of process unit 1= . . . =material flow into process unit 2

Figure 3:
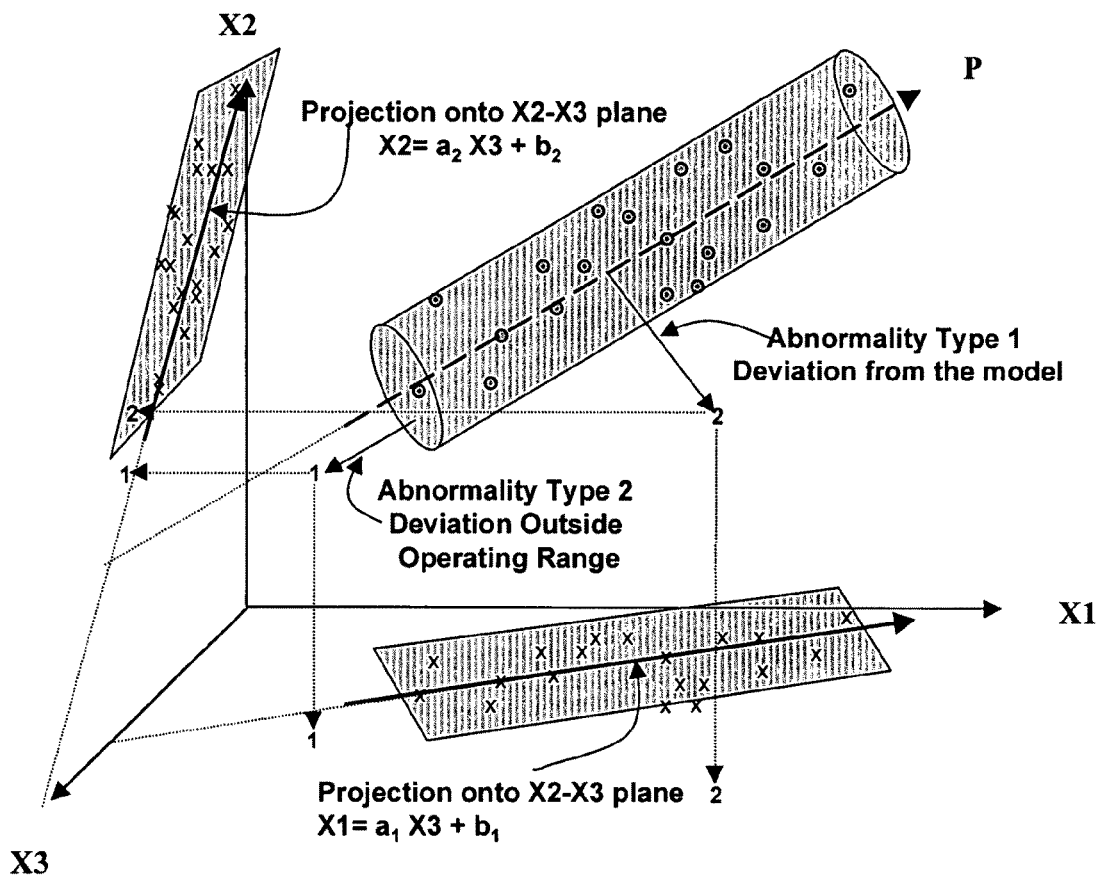
FIG. 3 shows three dimensional redundancy expressed as a PCA model.

Multidimensional checks are represented with "PCA like" models. In FIG. 3, there are three independent and redundant measures, X1, X2, and X3. Whenever X3 changes by one, X1 changes by $a_{13}$ and X2 changes by $a_{23}$. This set of relationships is expressed as a PCA model with a single principle component direction, P. This type of model is presented to the operator in a manner similar to the broad PCA models. As with the two dimensional redundancy checks the gray area shows the area of normal operations. The principle component loadings of P are directly calculated from the engineering equations, not in the traditional manner of determining P from the direction of greatest variability.

The characteristics of the process operation require exception operations to keep these relationships accurate over the normal range of process operations and normal field equipment changes and maintenance activities. Examples of exception operations are:

opening of bypass valves around flow meters
compensating for upstream/downstream pressure changes
recalibration of field measurements
redirecting process flows based on operating modes The PCA models and the engineering redundancy checks are combined using fuzzy Petri nets to provide the process operator with a continuous summary indication of the normality of the process operations under his control (FIG. 4).

Multiple statistical indices are created from each PCA model so that the indices correspond to the configuration and hierarchy of the process equipment that the process operator handles. The sensitivity of the traditional sum of Squared Prediction Error, SPE, index is improved by creating subset indices, which only contain the contribution to the SPE index for the inputs which come from designated portions of the complete process area covered by the PCA model. Each statistical index from the PCA models is fed into a fuzzy Petri net to convert the index into a zero to one scale, which continuously indicates the range from normal operation (value of zero) to abnormal operation (value of one).

Each redundancy check is also converted to a continuous normal-abnormal indication using fuzzy nets. There are two different indices used for these models to indicate abnormality; deviation from the model and deviation outside the operating range (shown on FIG. 3). These deviations are equivalent to the sum of the square of the error and the Hotelling T square indices for PCA models. For checks with dimension greater than two, it is possible to identify which input has a problem. In FIG. 3, since the X3-X2 relationship is still within the normal envelope, the problem is with input X1. Each deviation measure is converted by the fuzzy Petri net into a zero to one scale that will continuously indicate the range from normal operation (value of zero) to abnormal operation (value of one).

For each process area under the authority of the operator, the applicable set of normal-abnormal indicators is combined into a single normal-abnormal indicator. This is done by using fuzzy Petri logic to select the worst case indication of abnormal operation. In this way the operator has a high level summary of all the checks within the process area. This section will not provide a general background to fuzzy Petri nets. For that, readers should refer to a standard reference on fuzzy Petri nets, see e.g. Cardoso, et al, *Fuzzy Petri Nets: An Overview*, 13$^{th}$ Word Congress of IFAC, Vol. 1: Identification II, Discrete Event Systems, San Francisco, Calif., USA Jun. 30-Jul. 5, 1996, pp 443-448.

Figure 5:
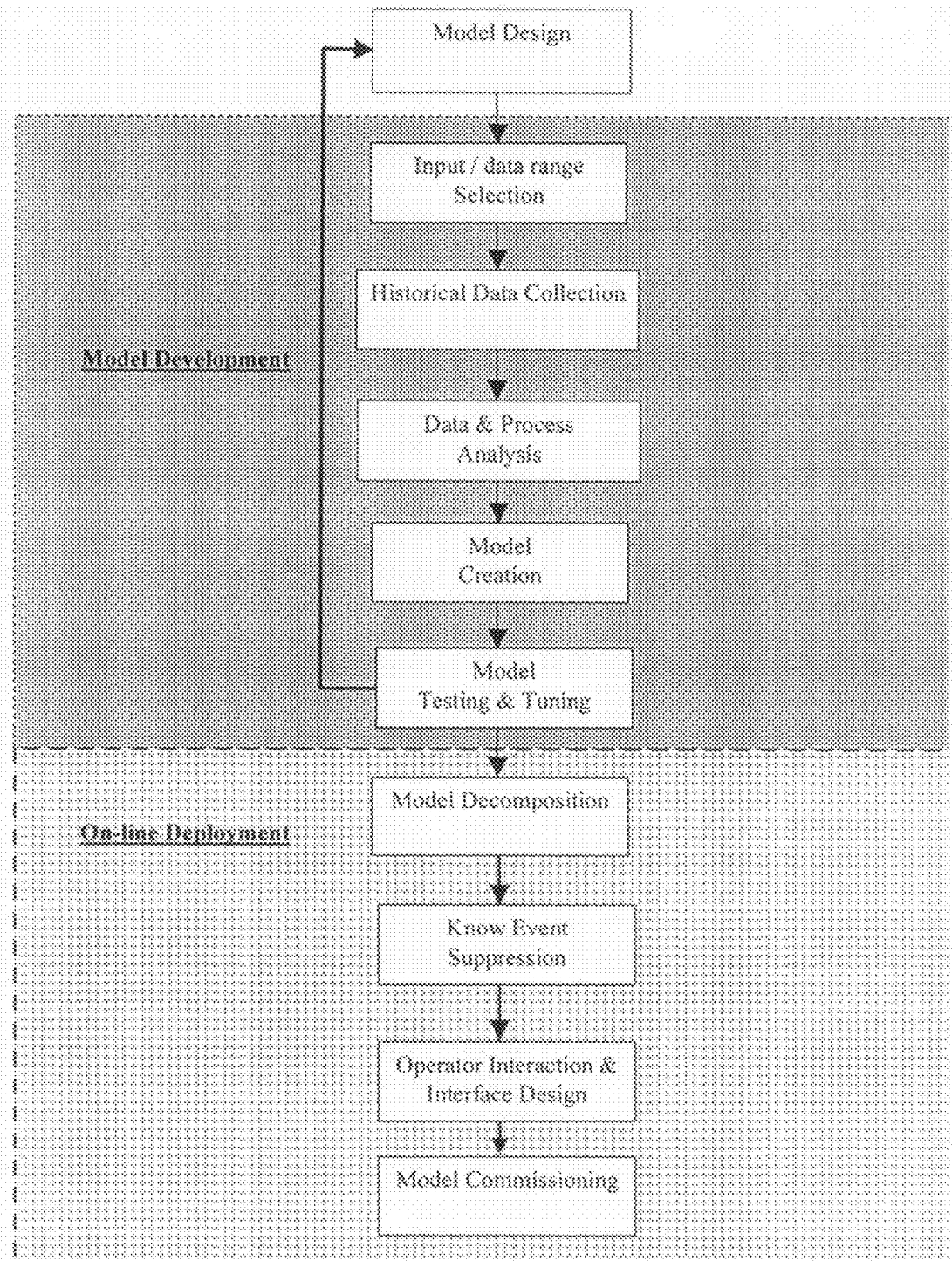
FIG. 5 shows a schematic diagram of the overall process for developing an abnormal event application.

The overall process for developing an abnormal event application is shown in FIG. 5. The basic development strategy is iterative where the developer starts with a rough model, then successively improves that model's capability based on observing how well the model represents the actual process operations during both normal operations and abnormal operations. The models are then restructured and retrained based on these observations.

Developing PCA Models for Abnormal Event Detection

I. Conceptual PCA Model Design

The overall design goals are to:

provide the console operator with a continuous status (normal vs. abnormal) of process operations for all of the process units under his operating authority
provide him with an early detection of a rapidly developing (minutes to hours) abnormal event within his operating authority
provide him with only the key process information needed to diagnose the root cause of the abnormal event.

Actual root cause diagnosis is outside the scope of this invention. The console operator is expected to diagnosis the process problem based on his process knowledge and training.

Having a broad process scope is important to the overall success of abnormal operation monitoring. For the operator to learn the system and maintain his skills, he needs to regularly use the system. Since specific abnormal events occur infrequently, abnormal operations monitoring of a small portion of the process would be infrequently used by the operator, likely leading the operator to disregard the system when it finally detects an abnormal event. This broad scope is in contrast to the published modeling goal which is to design the model based on detecting a specific process problem of significant economic interest (see, e.g., Kourti, *"Process Analysis and Abnormal Situation Detection: From Theory to Practice"*, IEEE Control Systems Magazine, October 2002, pp. 10-25.)

There are thousands of process measurements within the process units under a single console operator's operating authority. Continuous refining and chemical processes exhibit significant time dynamics among these measurements, which break the cross correlation among the data. This requires dividing the process equipment into separate PCA models where the cross correlation can be maintained.

Conceptual model design is composed of four major decisions:

Subdividing the process equipment into equipment groups with corresponding PCA models
Subdividing process operating time periods into process operating modes requiring different PCA models
Identifying which measurements within an equipment group should be designated as inputs to each PCA model
Identifying which measurements within an equipment group should act as flags for suppressing known events or other exception operations A. Process Unit Coverage The initial decision is to create groups of equipment that will be covered by a single PCA model. The specific process units included requires an understanding of the process integration/interaction. Similar to the design of a multivariable constraint controller, the boundary of the PCA model should encompass all significant process interactions and key upstream and downstream indications of process changes and disturbances.

The following rules are used to determined these equipment groups:

Equipment groups are defined by including all the major material and energy integrations and quick recycles in the same equipment group. If the process uses a multivariable constraint controller, the controller model will explicitly identify the interaction points among the process units. Otherwise the interactions need to be identified through an engineering analysis of the process.

Process groups should be divided at a point where there is a minimal interaction between the process equipment groups. The most obvious dividing point occurs when the only interaction comes through a single pipe containing the feed to the next downstream unit. In this case the temperature, pressure, flow, and composition of the feed are the primary influences on the downstream equipment group and the pressure in the immediate downstream unit is the primary influence on the upstream equipment group. These primary influence measurements should be included in both the upstream and downstream equipment group PCA models.

Include the influence of the process control applications between upstream and downstream equipment groups. The process control applications provide additional influence paths between upstream and downstream equipment groups. Both feedforward and feedback paths can exist. Where such paths exist the measurements which drive these paths need to be included in both equipment groups. Analysis of the process control applications will indicate the major interactions among the process units.

Divide equipment groups wherever there are significant time dynamics (e.g. storage tanks, long pipelines etc.). The PCA models primarily handle quick process changes (e.g. those which occur over a period of minutes to hours). Influences, which take several hours, days or even weeks to have their effect on the process, are not suitable for PCA models. Where these influences are important to the normal data patterns, measurements of these effects need to be dynamically compensated to get their effect time synchronized with the other process measurements (see the discussion of dynamic compensation).

B. Process Operating Modes

Process operating modes are defined as specific time periods where the process behavior is significantly different. Examples of these are production of different grades of product (e.g. polymer production), significant process transitions (e.g. startups, shutdowns, feedstock switches), processing of dramatically different feedstock (e.g. cracking naphtha rather than ethane in olefins production), or different configurations of the process equipment (different sets of process units running).

Where these significant operating modes exist, it is likely that separate PCA models will need to be developed for each major operating mode. The fewer models needed the better. The developer should assume that a specific PCA model could cover similar operating modes. This assumption must be tested by running new data from each operating mode through the model to see if it behaves correctly.

C. Historical Process Problems

In order for there to be organizational interest in developing an abnormal event detection system, there should be an historical process problem of significant economic impact. However, these significant problems must be analyzed to identify the best approach for attacking these problems. In particular, the developer should make the following checks before trying to build an abnormal event detection application:

1. Can the problem be permanently fixed? Often a problem exists because site personnel have not had sufficient time to investigate and permanently solve the problem. Once the attention of the organization is focused on the problem, a permanent solution is often found. This is the best approach.
2. Can the problem be directly measured? A more reliable way to detect a problem is to install sensors that can directly measure the problem in the process. This can also be used to prevent the problem through a process control application. This is the second best approach.
3. Can an inferential measurement be developed which will measure the approach to the abnormal operation? Inferential measurements are usually developed using partial least squares, PLS, models which are very close relatives to PCA abnormal event models. Other common alternatives for developing inferential measurements include Neural Nets and linear regression models. If the data exists which can be used to reliably measure the approach to the problem condition (e.g. tower flooding using delta pressure), this can then be used to not only detect when the condition exists but also as the base for a control application to prevent the condition from occurring. This is the third best approach.

Both direct measurements of problem conditions and inferential measurements of these conditions can be easily integrated into the overall network of abnormal detection models.

II. Input Data and Operating Range Selection

Within an equipment group, there will be thousands of process measurements. For the preliminary design:

Select all cascade secondary controller measurements, and especially ultimate secondary outputs (signals to field control valves) on these units Select key measurements used by the console operator to monitor the process (e.g. those which appear on his operating schematics)

Select any measurements used by the contact engineer to measure the performance of the process Select any upstream measurement of feedrate, feed temperature or feed quality Select measurements of downstream conditions which affect the process operating area, particularly pressures Select extra redundant measurements for measurements that are important Select measurements that may be needed to calculate non-linear transformations Select any external measurement of a disturbance (e.g. ambient temperature)

Select any other measurements, which the process experts regard as important measures of the process condition From this list only include measurements which have the following characteristics:

The measurement does not have a history of erratic or problem performance

The measurement has a satisfactory signal to noise ratio

The measurement is cross-correlated with other measurements in the data set

The measurement is not saturated for more than 10% of the time during normal operations.

The measurement is not tightly controlled to a fixed setpoint, which rarely changes (the ultimate primary of a control hierarchy).

The measurement does not have long stretches of "Bad Value" operation or saturated against transmitter limits.

The measurement does not go across a range of values, which is known to be highly non-linear The measurement is not a redundant calculation from the raw measurements The signals to field control valves are not saturated for more than 10% of the time A. Evaluations for Selecting Model Inputs There are two statistical criteria for prioritizing potential inputs into the PCA Abnormal Detection Model, Signal to Noise Ratio and Cross-Correlation.

1) Signal to Noise Test

The signal to noise ratio is a measure of the information content in the input signal.

The signal to noise ratio is calculated as follows:

1. The raw signal is filtered using an exponential filter with an approximate dynamic time constant equivalent to that of the process. For continuous refining and chemical processes this time constant is usually in the range of 30 minutes to 2 hours. Other low pass filters can be used as well. For the exponential filter the equations are:

$$Y_n = P*Y_{n-1} + (1-P)*X_n \text{ Exponential filter equation} \quad \text{Equation 1}$$

$$P = \text{Exp}(-T_s/T_f) \text{ Filter constant calculation} \quad \text{Equation 2}$$

where:
$Y_n$ the current filtered value
$Y_{n-1}$ the previous filtered value
$X_n$ the current raw value
P the exponential filter constant
$T_s$ the sample time of the measurement
$T_f$ the filter time constant 2. A residual signal is created by subtracting the filtered signal from the raw signal $$R_n = X_n - Y_n \quad \text{Equation 3}$$

3. The signal to noise ratio is the ratio of the standard deviation of the filtered signal divided by the standard deviation of the residual signal $$S/N = \sigma_Y/\sigma_R \quad \text{Equation 4}$$

It is preferable to have all inputs exhibit a S/N which is greater than a predetermined minimum, such as 4. Those inputs with S/N less than this minimum need individual examination to determine whether they should be included in the model.

The data set used to calculate the S/N should exclude any long periods of steady-state operation since that will cause the estimate for the noise content to be excessively large.

2) Cross Correlation Test

The cross correlation is a measure of the information redundancy the input data set. The cross correlation between any two signals is calculated as:

1. Calculate the co-variance, $S_{ik}$, between each input pair, i and k $$S_{ik} = \frac{N*\Sigma(X_i*X_k) - (\Sigma X_i)*(\Sigma X_k)}{N*(N-1)} \quad \text{Equation 5}$$

2. Calculate the correlation coefficient for each pair of inputs from the co-variance:

$$CC_{ik} = S_{ik}/(S_{ii}*S_{kk})^{1/2} \quad \text{Equation 6}$$

There are two circumstances, which flag that an input should not be included in the model. The first circumstance occurs when there is no significant correlation between a particular input and the rest of the input data set. For each input, there must be at least one other input in the data set with a significant correlation coefficient, such as 0.4.

The second circumstance occurs when the same input information has been (accidentally) included twice, often through some calculation, which has a different identifier. Any input pairs that exhibit correlation coefficients near one (for example above 0.95) need individual examination to determine whether both inputs should be included in the model. If the inputs are physically independent but logically redundant (i.e., two independent thermocouples are independently measuring the same process temperature) then both these inputs should be included in the model.

If two inputs are transformations of each other (i.e., temperature and pressure compensated temperature) the preference is to include the measurement is that the operator is familiar with, unless there is a significantly improved cross correlation between one of these measurements and the rest of the dataset. Then the one with the higher cross correlation should be included.

3) Identifying & Handling Saturated Variables

Refining and chemical processes often run against hard and soft constraints resulting in saturated values and "Bad Values" for the model inputs. Common constraints are: instrument transmitter high and low ranges, analyzer ranges, maximum and minimum control valve positions, and process control application output limits. Inputs can fall into several categories with regard to saturation which require special handling when pre-processing the inputs, both for model building and for the on-line use of these models.

Bad Values

For standard analog instruments (e.g., 4-20 milliamp electronic transmitters), bad values can occur because of two separate reasons:

The actual process condition is outside the range of the field transmitter

The connection with the field has been broken

When either of these conditions occur, the process control system could be configured on an individual measurement basis to either assign a special code to the value for that measurement to indicate that the measurement is a Bad Value, or to maintain the last good value of the measurement. These values will then propagate throughout any calculations performed on the process control system. When the "last good value" option has been configured, this can lead to erroneous calculations that are difficult to detect and exclude. Typically when the "Bad Value" code is propagated through the system, all calculations which depend on the bad measurement will be flagged bad as well.

Regardless of the option configured on the process control system, those time periods, which include Bad Values should not be included in training or test data sets. The developer needs to identify which option has been configured in the process control system and then configure data filters for excluding samples, which are Bad Values. For the on-line implementation, inputs must be pre-processed so that Bad Values are flagged as missing values, regardless of which option had been selected on the process control system.

Those inputs, which are normally Bad Value for extensive time periods should be excluded from the model.

Constrained Variables

Constrained variables are ones where the measurement is at some limit, and this measurement matches an actual process condition (as opposed to where the value has defaulted to the maximum or minimum limit of the transmitter range—covered in the Bad Value section). This process situation can occur for several reasons:

- Portions of the process are normally inactive except under special override conditions, for example pressure relief flow to the flare system. Time periods where these override conditions are active should be excluded from the training and validation data set by setting up data filters. For the on-line implementation these override events are trigger events for automatic suppression of selected model statistics
- The process control system is designed to drive the process against process operating limits, for example product spec limits. These constraints typically fall into two categories: —those, which are occasionally saturated and those, which are normally saturated. Those inputs, which are normally saturated, should be excluded from the model. Those inputs, which are only occasionally saturated (for example less than 10% of the time) can be included in the model however, they should be scaled based on the time periods when they are not saturated.

B. Input from Process Control Applications

Figure 6:
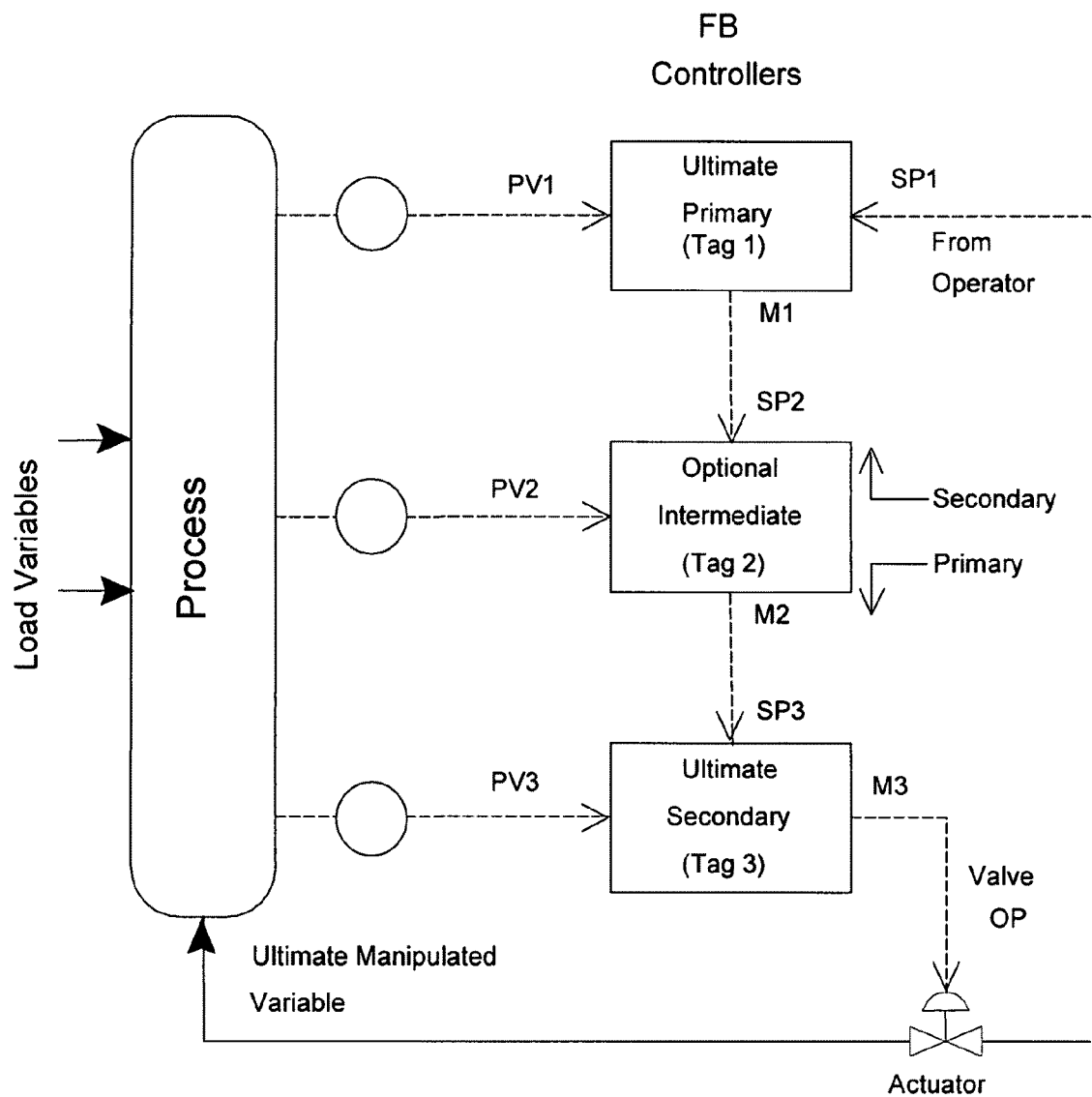
FIG. 6 shows a schematic diagram of the anatomy of a process control cascade.
Figure 7:
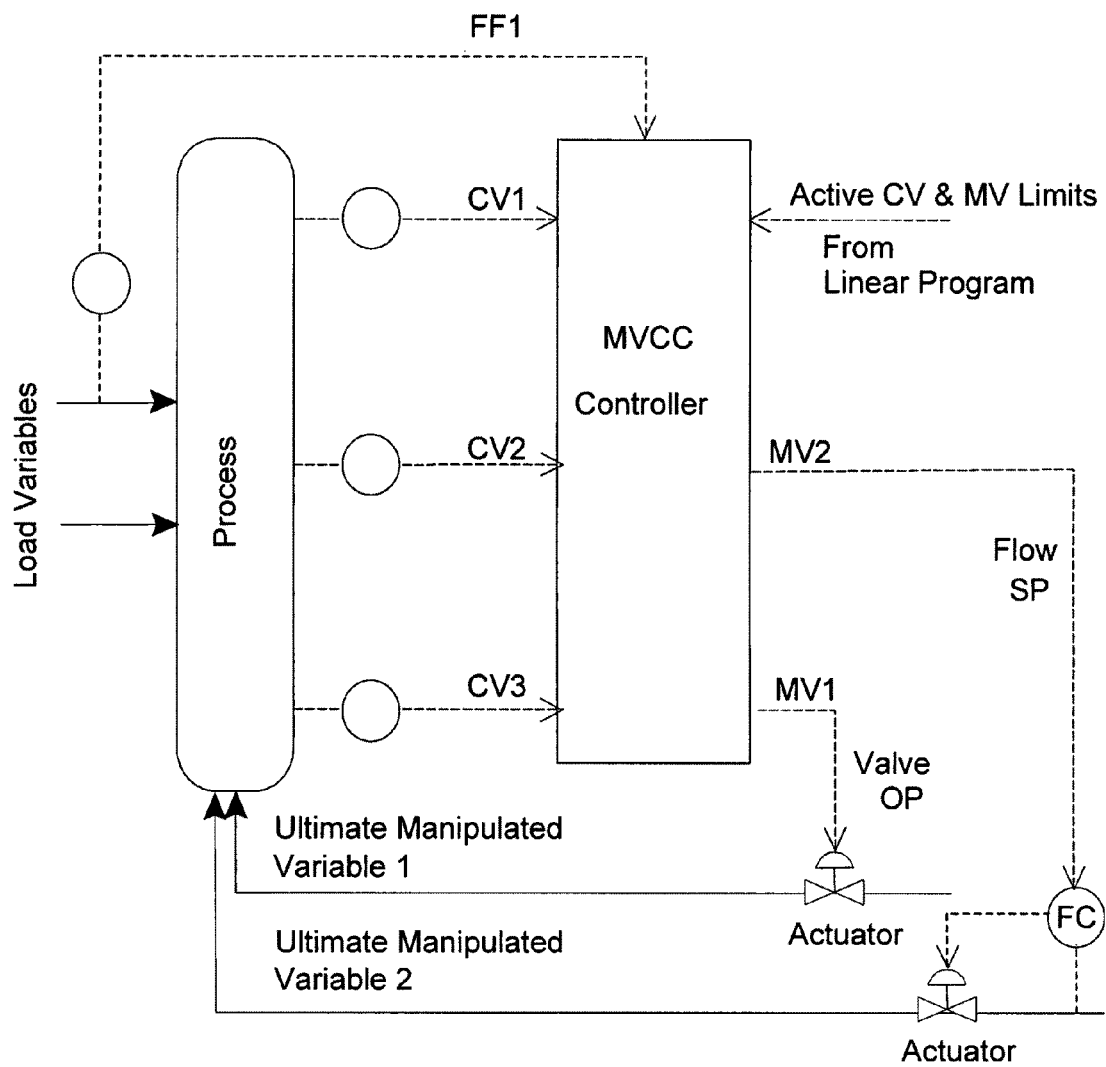
FIG. 7 shows a schematic diagram of the anatomy of a multivariable constraint controller, MVCC.

The process control applications have a very significant effect on the correlation structure of the process data. In particular:

- The variation of controlled variables is significantly reduced so that movement in the controlled variables is primarily noise except for those brief time periods when the process has been hit with a significant process disturbance or the operator has intentionally moved the operating point by changing key setpoints.
- The normal variation in the controlled variables is transferred by the control system to the manipulated variables (ultimately the signals sent to the control valves in the field).
- The normal operations of refinery and chemical processes are usually controlled by two different types of control structures: the classical control cascades (shown in FIG. 6) and the more recent multivariable constraint controllers, MVCC (shown in FIG. 7).

1) Selecting Model Inputs from Cascade Structures

FIG. 6 shows a typical "cascade" process control application, which is a very common control structure for refining and chemical processes. Although there are many potential model inputs from such an application, the only ones that are candidates for the model are the raw process measurements (the "PVs" in this figure) and the final output to the field valve.

Although it is a very important measurement, the PV of the ultimate primary of the cascade control structure is a poor candidate for inclusion in the model. This measurement usually has very limited movement since the objective of the control structure is to keep this measurement at the setpoint. There can be movement in the PV of the ultimate primary if its setpoint is changed but this usually is infrequent. The data patterns from occasional primary setpoint moves will usually not have sufficient power in the training dataset for the model to characterize the data pattern.

Because of this difficulty in characterizing the data pattern resulting from changes in the setpoint of the ultimate primary, when the operator makes this setpoint move, it is likely to cause a significant increase in the sum of squared prediction error, SPE, index of the model. Consequently, any change in the setpoint of the ultimate primary is a candidate trigger for a "known event suppression". Whenever the operator changes an ultimate primary setpoint, the "known event suppression" logic will automatically remove its effect from the SPE calculation.

Should the developer include the PV of the ultimate primary into the model, this measurement should be scaled based on those brief time periods is during which the operator has changed the setpoint and until the process has moved close to the vale of the new setpoint (for example within 95% of the new setpoint change thus if the setpoint change is from 10 to 11, when the PV reaches 10.95).

There may also be measurements that are very strongly correlated (for example greater than 0.95 correlation coefficient) with the PV of the Ultimate Primary, for example redundant thermocouples located near a temperature measurement used as a PV for an Ultimate Primary. These redundant measurements should be treated in the identical manner that is chosen for the PV of the Ultimate Primary.

Cascade structures can have setpoint limits on each secondary and can have output limits on the signal to the field control valve. It is important to check the status of these potentially constrained operations to see whether the measurement associated with a setpoint has been operated in a constrained manner or whether the signal to the field valve has been constrained. Date during these constrained operations should not be used.

2) Selecting/Calculating Model Inputs from Multivariable Constraint Controllers, MVCC FIG. 7 shows a typical MVCC process control application, which is a very common control structure for refining and chemical processes. An MVCC uses a dynamic mathematical model to predict how changes in manipulated variables, MVs, (usually valve positions or setpoints of regulatory control loops) will change control variables, CVs (the dependent temperatures, pressures, compositions and flows which measure the process state). An MVCC attempts to push the process operation against operating limits. These limits can be either MV limits or CV limits and are determined by an external optimizer. The number of limits that the process operates against will be equal to the number of MVs the controller is allowed to manipulate minus the number of material balances controlled. So if an MVCC has 12 MVs, 30 CVs and 2 levels then the process will be operated against 10 limits. An MVCC will also predict the effect of measured load disturbances on the process and compensate for these load disturbances (known as feedforward variables, FF).

Whether or not a raw MV or CV is a good candidate for inclusion in the PCA model depends on the percentage of time that MV or CV is held against its operating limit by the MVCC. As discussed in the Constrained Variables section, raw variables that are constrained more than 10% of the time are poor candidates for inclusion in the PCA model. Normally unconstrained variables should be handled per the Constrained Variables section discussion.

If an unconstrained MV is a setpoint to a regulatory control loop, the setpoint should not be included, instead the measurement of that regulatory control loop should be included. The signal to the field valve from that regulatory control loop should also be included.

If an unconstrained MV is a signal to a field valve position, then it should be included in the model.

C. Redundant Measurements

The process control system databases can have a significant redundancy among the candidate inputs into the PCA model. One type of redundancy is "physical redundancy", where there are multiple sensors (such as thermocouples) located in close physical proximity to each other within the process equipment. The other type of redundancy is "calculational redundancy", where raw sensors are mathematically combined into new variables (e.g. pressure compensated temperatures or mass flows calculated from volumetric flow measurements).

As a general rule, both the raw measurement and an input which is calculated from that measurement should not be included in the model. The general preference is to include the version of the measurement that the process operator is most familiar with. The exception to this rule is when the raw inputs must be mathematically transformed in order to improve the correlation structure of the data for the model. In that case the transformed variable should be included in the model but not the raw measurement.

Physical redundancy is very important for providing cross validation information in the model. As a general rule, raw measurements, which are physically redundant should be included in the model. When there are a large number of physically redundant measurements, these measurements must be specially scaled so as to prevent them from overwhelming the selection of principle components (see the section on variable scaling). A common process example occurs from the large number of thermocouples that are placed in reactors to catch reactor runaways.

When mining a very large database, the developer can identify the redundant measurements by doing a cross-correlation calculation among all of the candidate inputs. Those measurement pairs with a very high cross-correlation (for example above 0.95) should be individually examined to classify each pair as either physically redundant or calculationally redundant.

III. Historical Data Collection

A significant effort in the development lies in creating a good training data set, which is known to contain all modes of normal process operations. This data set should:

Span the normal operating range: Datasets, which span small parts of the operating range, are composed mostly of noise. The range of the data compared to the range of the data during steady state operations is a good indication of the quality of the information in the dataset.

Include all normal operating modes (including seasonal mode variations). Each operating mode may have different correlation structures. Unless the patterns, which characterize the operating mode, are captured by the model, these unmodeled operating modes will appear as abnormal operations.

Only include normal operating data: If strong abnormal operating data is included in the training data, the model will mistakenly model these abnormal operations as normal operations. Consequently, when the model is later compared to an abnormal operation, it may not detect the abnormality operations.

History should be as similar as possible to the data used in the on-line system: The online system will be providing spot values at a frequency fast enough to detect the abnormal event. For continuous refining and chemical operations this sampling frequency will be around one minute. Within the limitations of the data historian, the training data should be as equivalent to one-minute spot values as possible.

The strategy for data collection is to start with a long operating history (usually in the range of 9 months to 18 months), then try to remove those time periods with obvious or documented abnormal events. By using such a long time period, the smaller abnormal events will not appear with sufficient strength in the training data set to significantly influence the model parameters most operating modes should have occurred and will be represented in the data.

A. Historical Data Collection Issues

1) Data Compression

Many historical databases use data compression to minimize the storage requirements for the data. Unfortunately, this practice can disrupt the correlation structure of the data. At the beginning of the project the data compression of the database should be turned off and the spot values of the data historized. Final models should be built using uncompressed data whenever possible. Averaged values should not be used unless they are the only data available, and then with the shortest data average available.

2) Length of Data History

For the model to properly represent the normal process patterns, the training data set needs to have examples of all the normal operating modes, normal operating changes and changes and normal minor disturbances that the process experiences. This is accomplished by using data from over a long period of process operations (e.g. 9-18 months). In particular, the differences among seasonal operations (spring, summer, fall and winter) can be very significant with refinery and chemical processes.

Sometimes these long stretches of data are not yet available (e.g. after a turnaround or other significant reconfiguration of the process equipment). In these cases the model would start with a short initial set of training data (e.g. 6 weeks) then the training dataset is expanded as further data is collected and the model updated monthly until the models are stabilized (e.g. the model coefficients don't change with the addition of new data)

3) Ancillary Historical Data

The various operating journals for this time period should also be collected. This will be used to designate operating time periods as abnormal, or operating in some special mode that needs to be excluded from the training dataset. In particular, important historical abnormal events can be selected from these logs to act as test cases for the models.

4) Lack of Specific Measurement History

Often setpoints and controller outputs are not historized in the plant process data historian. Historization of these values should immediately begin at the start of the project.

5) Operating Modes

Old data that no longer properly represents the current process operations should be removed from the training data set. After a major process modification, the training data and PCA model may need to be rebuilt from scratch. If a particular type of operation is no longer being done, all data from that operation should be removed from the training data set.

Operating logs should be used to identify when the process was run under different operating modes. These different modes may require separate models. Where the model is intended to cover several operating modes, the number of samples in the training dataset from each operating model should be approximately equivalent.

6) Sampling Rate

The developer should gather several months of process data using the site's process historian, preferably getting one minute spot values. If this is not available, the highest resolution data, with the least amount of averaging should be used.

7) Infrequently Sampled Measurements

Quality measurements (analyzers and lab samples) have a much slower sample frequency than other process measurements, ranging from tens of minutes to daily. In order to include these measurements in the model a continuous estimate of these quality measurements needs to be constructed.

Figure 8:
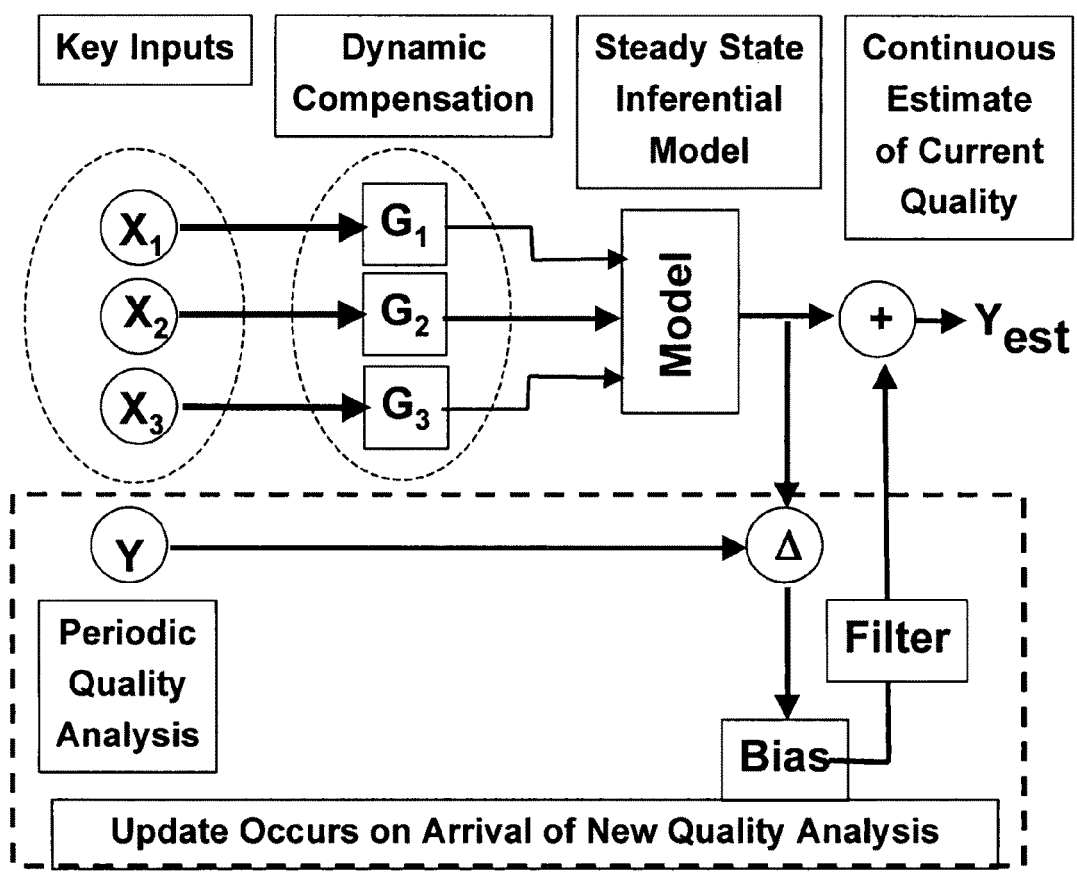
FIG. 8 shows a schematic diagram of the on-line inferential estimate of current quality.

FIG. 8 shows the online calculation of a continuous quality estimate. This same model structure should be created and applied to the historical data. This quality estimate then becomes the input into the PCA model.

8) Model Triggered Data Annotation

Except for very obvious abnormalities, the quality of historical data is difficult to determine. The inclusion of abnormal operating data can bias the model. The strategy of using large quantities of historical data will compensate to some degree the model bias caused by abnormal operating in the training data set. The model built from historical data that predates the start of the project must be regarded with suspicion as to its quality. The initial training dataset should be replaced with a dataset, which contains high quality annotations of the process conditions, which occur during the project life.

The model development strategy is to start with an initial "rough" model (the consequence of a questionable training data set) then use the model to trigger the gathering of a high quality training data set. As the model is used to monitor the process, annotations and data will be gathered on normal operations, special operations, and abnormal operations. Anytime the model flags an abnormal operation or an abnormal event is missed by the model, the cause and duration of the event is annotated. In this way feedback on the model's ability to monitor the process operation can be incorporated in the training data. This data is then used to improve the model, which is then used to continue to gather better quality training data. This process is repeated until the model is satisfactory.

IV. Data & Process Analysis

A. Initial Rough Data Analysis

Using the operating logs and examining the process key performance indicators, the historical data is divided into periods with known abnormal operations and periods with no identified abnormal operations. The data with no identified abnormal operations will be the training data set.

Now each measurement needs to be examined over its history to see whether it is a candidate for the training data set. Measurements which should be excluded are:

Those with many long periods of time as "Bad Value"

Those with many long periods of time pegged to their transmitter high or low limits Those, which show very little variability (except those, which are tightly controlled to their setpoints)

Those that continuously show very large variability relative to their operating range Those that show little or no cross correlation with any other measurements in the data set Those with poor signal to noise ratios While examining the data, those time periods where measurements are briefly indicating "Bad Value" or are briefly pegged to their transmitter high or low limits should also be excluded.

Once these exclusions have been made the first rough PCA model should be built. Since this is going to be a very rough model the exact number of principal components to be retained is not important. This will typically be around 5% of the number measurements included in the model. The number of PCs should ultimately match the number of degrees of freedom in the process, however this is not usually known since this includes all the different sources of process disturbances. There are several standard methods for determining how many principal components to include. Also at this stage the statistical approach to variable scaling should be used: scale all variables to unit variance.

$$X'=(X-X_{avg})/\sigma \qquad \text{Equation 7}$$

The training data set should now be run through this preliminary model to identify time periods where the data does not match the model. These time periods should be examined to see whether an abnormal event was occurring at the time. If this is judged to be the case, then these time periods should also be flagged as times with known abnormal events occurring. These time periods should be excluded from the training data set and the model rebuilt with the modified data.

B. Removing Outliers and Periods of Abnormal Operations

Eliminating obvious abnormal events will be done through the following:

Removing documented events. It is very rare to have a complete record of the abnormal event history at a site. However, significant operating problems should be documented in operating records such as operator logs, operator change journals, alarm journals, and instrument maintenance records. These are only providing a partial record of the abnormal event history.

Figure 9:
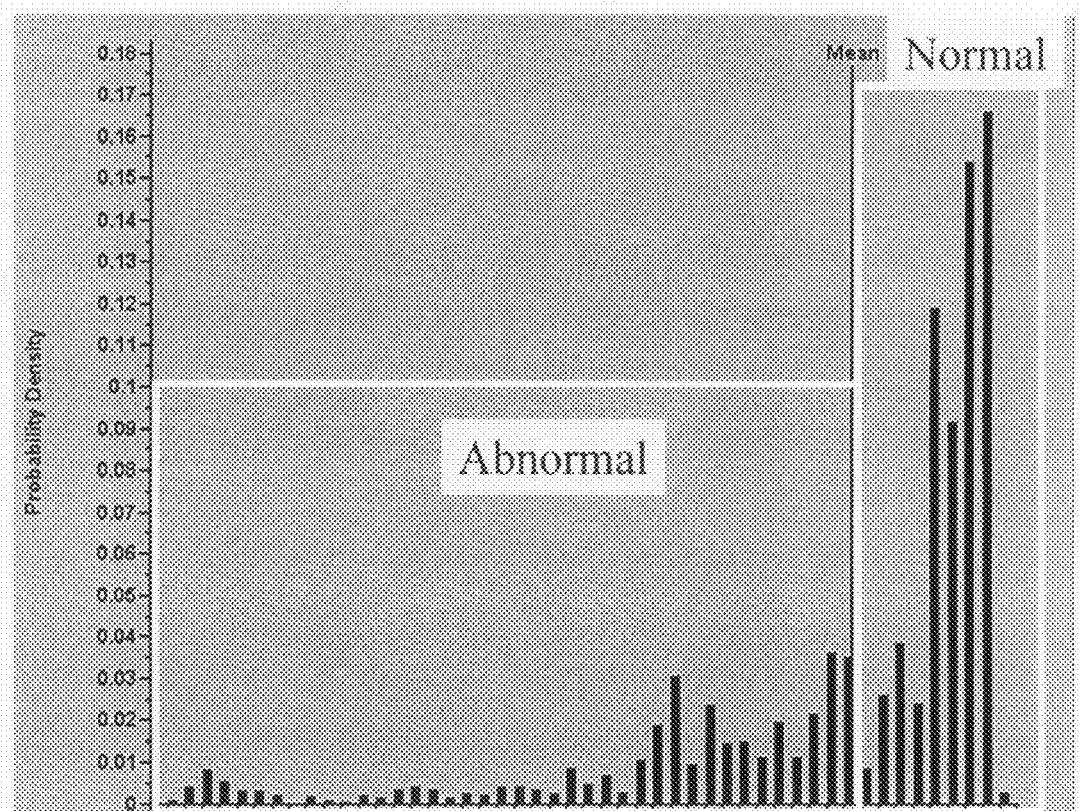
FIG. 9 shows the KPI analysis of historical data.

Removing time periods where key performance indicators, KPIs, are abnormal. Such measurements as feed rates, product rates, product quality are common key performance indicators. Each process operation may have additional KPIs that are specific to the unit. Careful examination of this limited set of measurements will usually give a clear indication of periods of abnormal operations. FIG. 9 shows a histogram of a KPI. Since the operating goal for this KPI is to maximize it, the operating periods where this KPI is low are likely abnormal operations. Process qualities are often the easiest KPIs to analyze since the optimum operation is against a specification limit and they are less sensitive to normal feed rate variations.

C. Compensating for Noise

By noise we are referring to the high frequency content of the measurement signal which does not contain useful information about the process. Noise can be caused by specific process conditions such as two-phase flow across an orifice plate or turbulence in the level. Noise can be caused by electrical inductance. However, significant process variability, perhaps caused by process disturbances is useful information and should not be filtered out.

There are two primary noise types encountered in refining and chemical process measurements: measurement spikes and exponentially correlated continuous noise. With measurement spikes, the signal jumps by an unreasonably large amount for a short number of samples before returning to a value near its previous value. Noise spikes are removed using a traditional spike rejection filter such as the Union filter.

Figure 10:
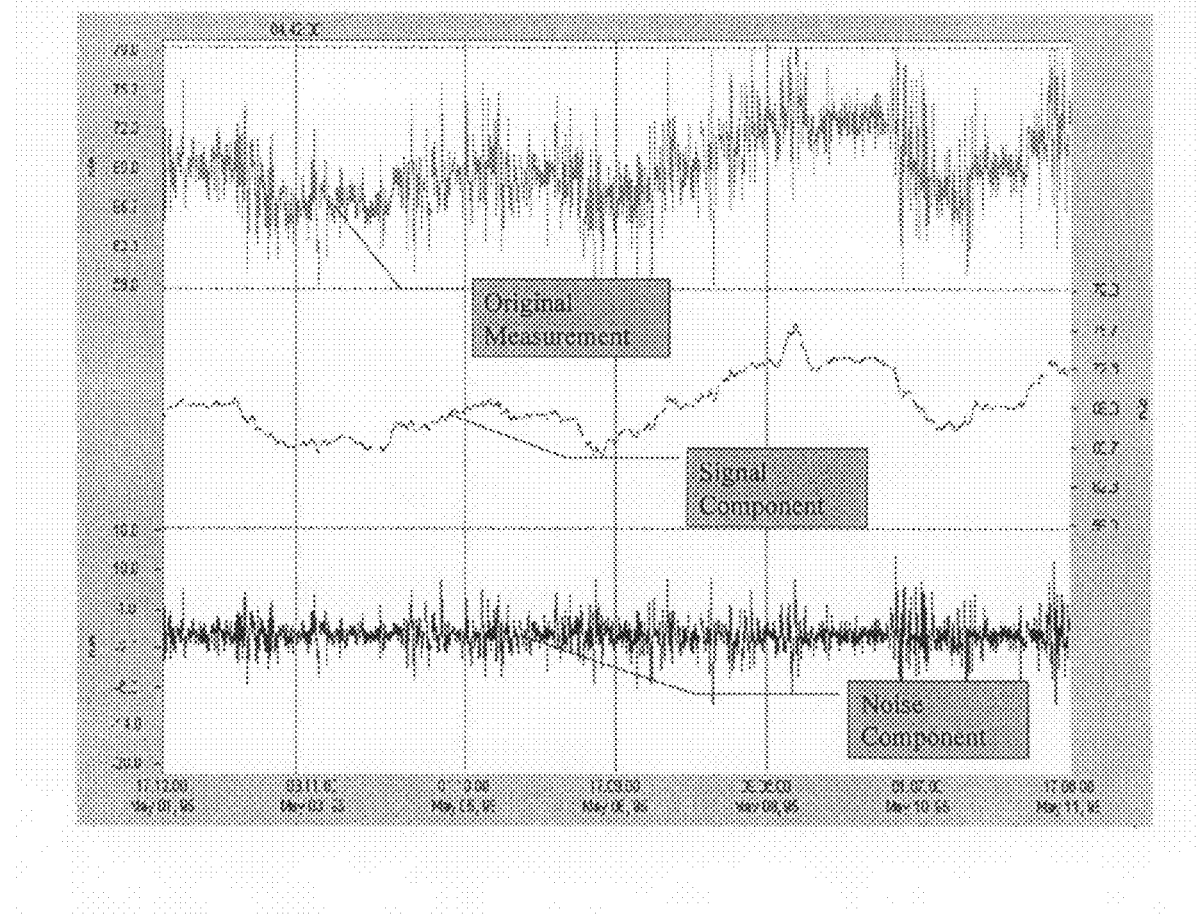
FIG. 10 shows a diagram of signal to noise ratio.

The amount of noise in the signal can be quantified by a measure known as the signal to noise ratio (see FIG. 10). This is defined as the ratio of the amount of signal variability due to process variation to the amount of signal variability due to high frequency noise. A value below four is a typical value for indicating that the signal has substantial noise, and can harm the model's effectiveness.

Whenever the developer encounters a signal with significant noise, he needs to make one of three choices. In order of preference, these are:

Fix the signal by removing the source of the noise (the best answer)

Remove/minimize the noise through filtering techniques

Exclude the signal from the model

Typically for signals with signal to noise ratios between 2 and 4, the exponentially correlated continuous noise can be removed with a traditional low pass filter such as an exponential filter. The equations for the exponential filter are:

$$Y^n = P*Y^{n-1} + (1-P)*X^n \text{ Exponential filter equation} \qquad \text{Equation 8}$$

$$P = \text{Exp}(-T_s/T_f) \text{ Filter constant calculation} \qquad \text{Equation 9}$$

$Y^n$ is the current filtered value
$Y^{n-1}$ is the previous filtered value
$X^n$ is the current raw value
P is the exponential filter constant
$T_s$ is the sample time of the measurement
$T_f$ is the filter time constant Signals with very poor signal to noise ratios (for example less than 2) may not be sufficiently improved by filtering techniques to be directly included in the model. If the input is regarded as important, the scaling of the variable should be set to de-sensitize the model by significantly increasing the size of the scaling factor (typically by a factor in the range of 2-10).

D. Transformed Variables

Transformed variables should be included in the model for two different reasons.

First, based on an engineering analysis of the specific equipment and process chemistry, known non-linearities in the process should be transformed and included in the model. Since one of the assumptions of PCA is that the variables in the model are linearly correlated, significant process or equipment non-linearities will break down this correlation structure and show up as a deviation from the model. This will affect the usable range of the model.

Examples of well known non-linear transforms are:
Reflux to feed ratio in distillation columns
Log of composition in high purity distillation
Pressure compensated temperature measurement
Sidestream yield
Flow to valve position (FIG. 2)
Reaction rate to exponential temperature change Second, the data from process problems, which have occurred historically, should also be examined to understand how these problems show up in the process measurements. For example, the relationship between tower delta pressure and feedrate is relatively linear until the flooding point is reached, when the delta pressure will increase exponentially. Since tower flooding is picked up by the break in this linear correlation, both delta pressure and feed rate should be included. As another example, catalyst flow problems can often be seen in the delta pressures in the transfer line. So instead of including the absolute pressure measurements in the model, the delta pressures should be calculated and included.

E. Dynamic Transformations

Figure 11:
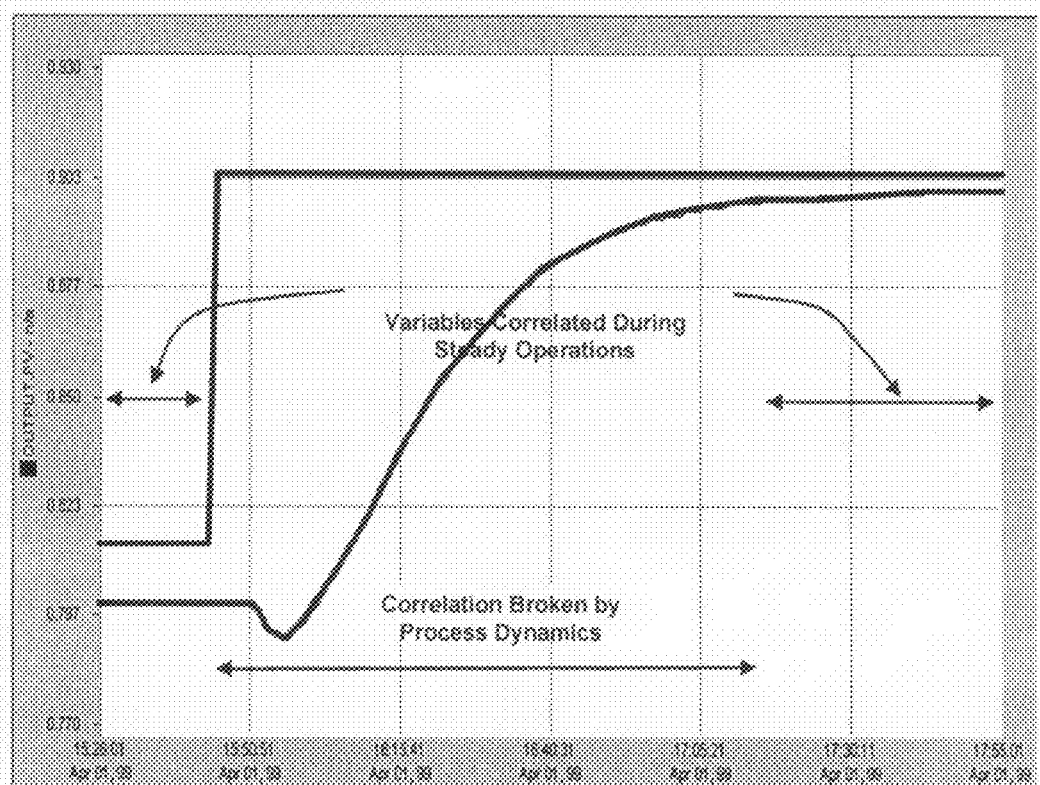
FIG. 11 shows how the process dynamics can disrupt the correlation between the current values of two measurements.

FIG. 11 shows how the process dynamics can disrupt the correlation between the current values of two measurements. During the transition time one value is constantly changing while the other is not, so there is no correlation between the current values during the transition. However these two measurements can be brought back into time synchronization by transforming the leading variable using a dynamic transfer function. Usually a first order with deadtime dynamic model (shown in Equation 9 in the Laplace transform format) is sufficient to time synchronize the data.

$$Y'(s) = \frac{e^{-\Theta s} Y(s)}{Ts + 1} \qquad \text{Equation 9}$$

Y—raw data
Y'—time synchronized data
T—time constant
Θ—deadtime
S—Laplace Transform parameter This technique is only needed when there is a significant dynamic separation between variables used in the model. Usually only 1-2% of the variables requires this treatment. This will be true for those independent variables such as setpoints which are often changed in large steps by the operator and for the measurements which are significantly upstream of the main process units being modeled.

F. Removing Average Operating Point

Continuous refining and chemical processes are constantly being moved from one operating point to another. These can be intentional, where the operator or an optimization program makes changes to a key setpoints, or they can be due to slow process changes such as heat exchanger fouling or catalyst deactivation. Consequently, the raw data is not stationary. These operating point changes need to be removed to create a stationary dataset. Otherwise these changes erroneously appear as abnormal events.

The process measurements are transformed to deviation variables: deviation from a moving average operating point. This transformation to remove the average operating point is required when creating PCA models for abnormal event detection. This is done by subtracting the exponentially filtered value (see Equations 8 and 9 for exponential filter equations) of a measurement from its raw value and using this difference in the model.

$$X' = X - X_{filtered} \qquad \text{Equation 10}$$

X'—measurement transformed to remove operating point changes
X—original raw measurement
$X_{filtered}$—exponentially filtered raw measurement The time constant for the exponential filter should be about the same size as the major time constant of the process. Often a time constant of around 40 minutes will be adequate. The consequence of this transformation is that the inputs to the PCA model are a measurement of the recent change of the process from the moving average operating point.

In order to accurately perform this transform, the data should be gathered at the sample frequency that matches the on-line system, often every minute or faster. This will result in collecting 525,600 samples for each measurement to cover one year of operating data. Once this transformation has been calculated, the dataset is resampled to get down to a more manageable number of samples, typically in the range of 30,000 to 50,000 samples.

V. Model Creation

Once the specific measurements have been selected and the training data set has been built, the model can be built quickly using standard tools.

A. Scaling Model Inputs

The performance of PCA models is dependent on the scaling of the inputs. The traditional approach to scaling is to divide each input by its standard deviation, σ, within the training data set.

$$X_i' = X_i/\sigma_i \qquad \text{Equation 11}$$

For input sets that contain a large number of nearly identical measurements (such as multiple temperature measurements of fixed catalyst reactor beds) this approach is modified to further divide the measurement by the square root of the number of nearly identical measurements.

For redundant data groups $$X_i' = X_i/(\sigma_i * \text{sqrt}(N))\quad\quad\text{Equation 12}$$

Where N=number of inputs in redundant data group

These traditional approaches can be inappropriate for measurements from continuous refining and chemical processes. Because the process is usually well controlled at specified operating points, the data distribution is a combination of data from steady state operations and data from "disturbed" and operating point change operations. These data will have overly small standard deviations from the preponderance of steady state operation data. The resulting PCA model will be excessively sensitive to small to moderate deviations in the process measurements.

For continuous refining and chemical processes, the scaling should be based on the degree of variability that occurs during normal process disturbances or during operating point changes not on the degree of variability that occurs during continuous steady state operations. For normally unconstrained variables, there are two different ways of determining the scaling factor:

First is to identify time periods where the process was not running at steady state, but was also not experiencing a significant abnormal event. A limited number of measurements act as the key indicators of steady state operations. These are typically the process key performance indicators and usually include the process feed rate, the product production rates and the product quality. These key measures are used to segment the operations into periods of normal steady state operations, normally disturbed operations, and abnormal operations. The standard deviation from the time periods of normally disturbed operations provides a good scaling factor for most of the measurements.

Figure 12:
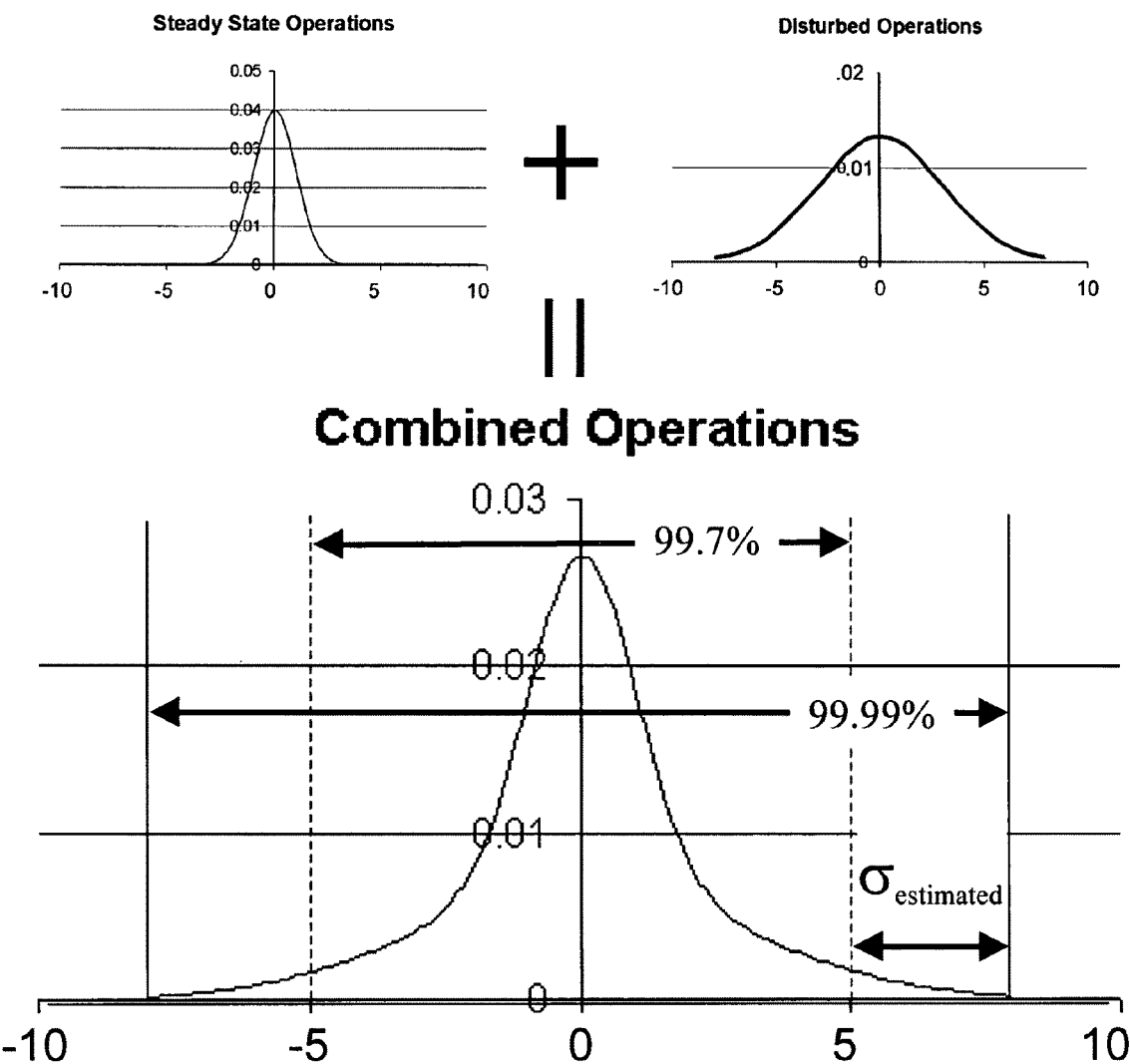
FIG. 12 shows the probability distribution of process data.

An alternative approach to explicitly calculating the scaling based on disturbed operations is to use the entire training data set as follows. The scaling factor can be approximated by looking at the data distribution outside of 3 standard deviations from the mean. For example, 99.7% of the data should lie, within 3 standard deviations of the mean and that 99.99% of the data should lie, within 4 standard deviations of the mean. The span of data values between 99.7% and 99.99% from the mean can act as an approximation for the standard deviation of the "disturbed" data in the data set. See FIG. 12.

Finally, if a measurement is often constrained (see the discussion on saturated variables) only those time periods where the variable is unconstrained should be used for calculating the standard deviation used as the scaling factor.

B. Selecting the Number of Principal Components

PCA transforms the actual process variables into a set of independent variables called Principal Components, PC, which are linear combinations of the original variables (Equation 13).

$$PC_i = A_{i,1} * X_1 + A_{i,2} * X_2 + A_{i,3} * X_3 + \quad\quad\text{Equation 13}$$

The process will have a number of degrees of freedom, which represent the specific independent effects that influence the process. These different independent effects show up in the process data as process variation. Process variation can be due to intentional changes, such as feed rate changes, or unintentional disturbances, such as ambient temperature variation.

Each principal component models a part of the process variability caused by these different independent influences on the process. The principal components are extracted in the direction of decreasing variation in the data set, with each subsequent principal component modeling less and less of the process variability. Significant principal components represent a significant source of process variation, for example the first principal component usually represents the effect of feed rate changes since this is usually the source of the largest process changes. At some point, the developer must decide when the process variation modeled by the principal components no longer represents an independent source of process variation.

The engineering approach to selecting the correct number of principal components is to stop when the groups of variables, which are the primary contributors to the principal component no longer make engineering sense. The primary cause of the process variation modeled by a PC is identified by looking at the coefficients, $A_{i,n}$, of the original variables (which are called loadings). Those coefficients, which are relatively large in magnitude, are the major contributors to a particular PC. Someone with a good understanding of the process should be able to look at the group of variables, which are the major contributors to a PC and assign a name (e.g. feed rate effect) to that PC. As more and more PCs are extracted from the data, the coefficients become more equal in size. At this point the variation being modeled by a particular PC is primarily noise.

Figure 13:
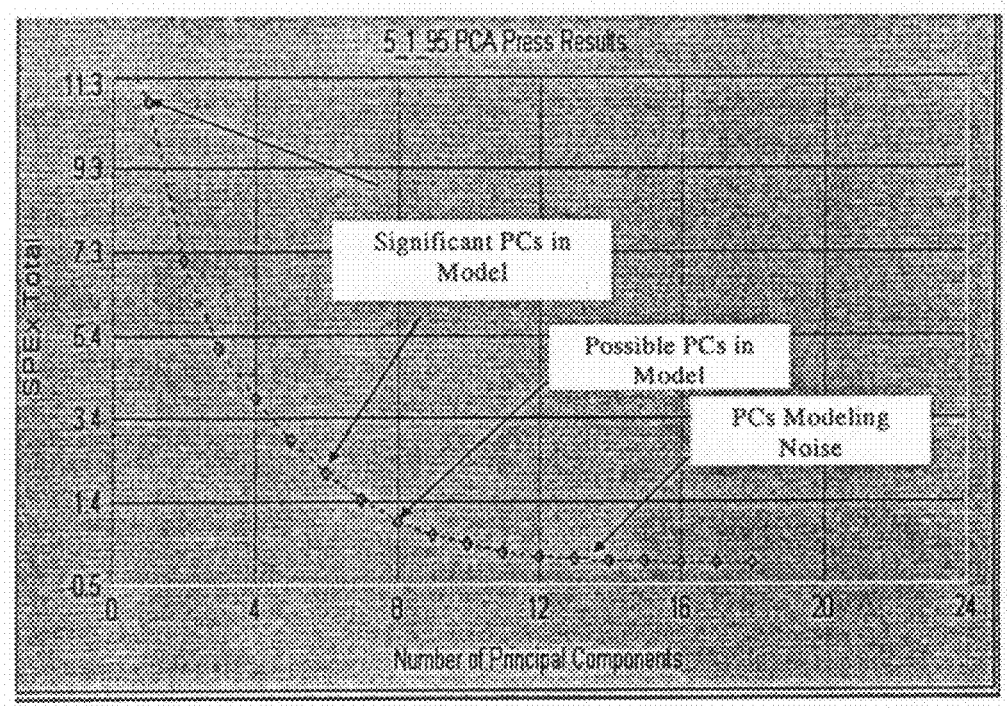
FIG. 13 shows illustration of the press statistic.

The traditional statistical method for determining when the PC is just modeling noise is to identify when the process variation being modeled with each new PC becomes constant. This is measured by the PRESS statistic, which plots the amount of variation modeled by each successive PC (FIG. 13). Unfortunately this test is often ambiguous for PCA models developed on refining and chemical processes.

VI. Model Testing & Tuning

The process data will not have a gaussian or normal distribution. Consequently, the standard statistical method of setting the trigger for detecting an abnormal event at 3 standard deviations of the error residual should not be used. Instead the trigger point needs to be set empirically based on experience with using the model.

Initially the trigger level should be set so that abnormal events would be signaled at a rate acceptable to the site engineer, typically 5 or 6 times each day. This can be determined by looking at the $SPE_x$ statistic for the training data set (this is also referred to as the Q statistic or the $DMOD_x$ statistic). This level is set so that real abnormal events will not get missed but false alarms will not overwhelm the site engineer.

A. Enhancing the Model

Once the initial model has been created, it needs to be enhanced by creating a new training data set. This is done by using the model to monitor the process. Once the model indicates a potential abnormal situation, the engineer should investigate and classify the process situation. The engineer will find three different situations, either some special process operation is occurring, an actual abnormal situation is occurring, or the process is normal and it is a false indication.

The new training data set is made up of data from special operations and normal operations. The same analyses as were done to create the initial model need to be performed on the data, and the model re-calculated. With this new model the trigger lever will still be set empirically, but now with better annotated data, this trigger point can be tuned so as to only give an indication when a true abnormal event has occurred.

Simple Engineering Models for Abnormal Event Detection

The physics, chemistry, and mechanical design of the process equipment as well as the insertion of multiple similar measurements creates a substantial amount of redundancy in the data from continuous refining and chemical processes. This redundancy is called physical redundancy when identical measurements are present, and calculational redundancy when the physical, chemical, or mechanical relationships are used to perform independent but equivalent estimates of a process condition. This class of model is called an engineering redundancy model.

I. Two Dimensional Engineering Redundancy Models

This is the simplest form of the model and it has the generic form:

$$F(y_i) = G(x_i) + \text{filtered bias}_i + \text{operator bias} + \text{error}_i \quad \text{Equation 14}$$

$$\text{raw bias}_i = F(y_i) - \{G(x_i) + \text{filtered bias}_i + \text{operator bias}\} = \text{error}_i \quad \text{Equation 15}$$

$$\text{filtered bias}_i = \text{filtered bias}_{i-1} + N^* \text{raw bias}_{i-1} \quad \text{Equation 16}$$

N—convergence factor (e.g. 0.0001)

Normal operating range: xmin<x<xmax

Normal model deviation: −(max_error)<error<(max_error)

The "operator bias" term is updated whenever the operator determines that there has been some field event (e.g. opening a bypass flow) which requires the model to be shifted. On the operator's command, the operator bias term is updated so that Equation 14 is exactly satisfied (error$_i$=0)

The "filtered bias" term updates continuously to account for persistent unmeasured process changes that bias the engineering redundancy model. The convergence factor, "N", is set to eliminate any persistent change after a user specified time period, usually on the time scale of days.

The "normal operating range" and the "normal model deviation" are determined from the historical data for the engineering redundancy model. In most cases the max_error value is a single value, however this can also be a vector of values that is dependent on the x axis location.

Figure 14:
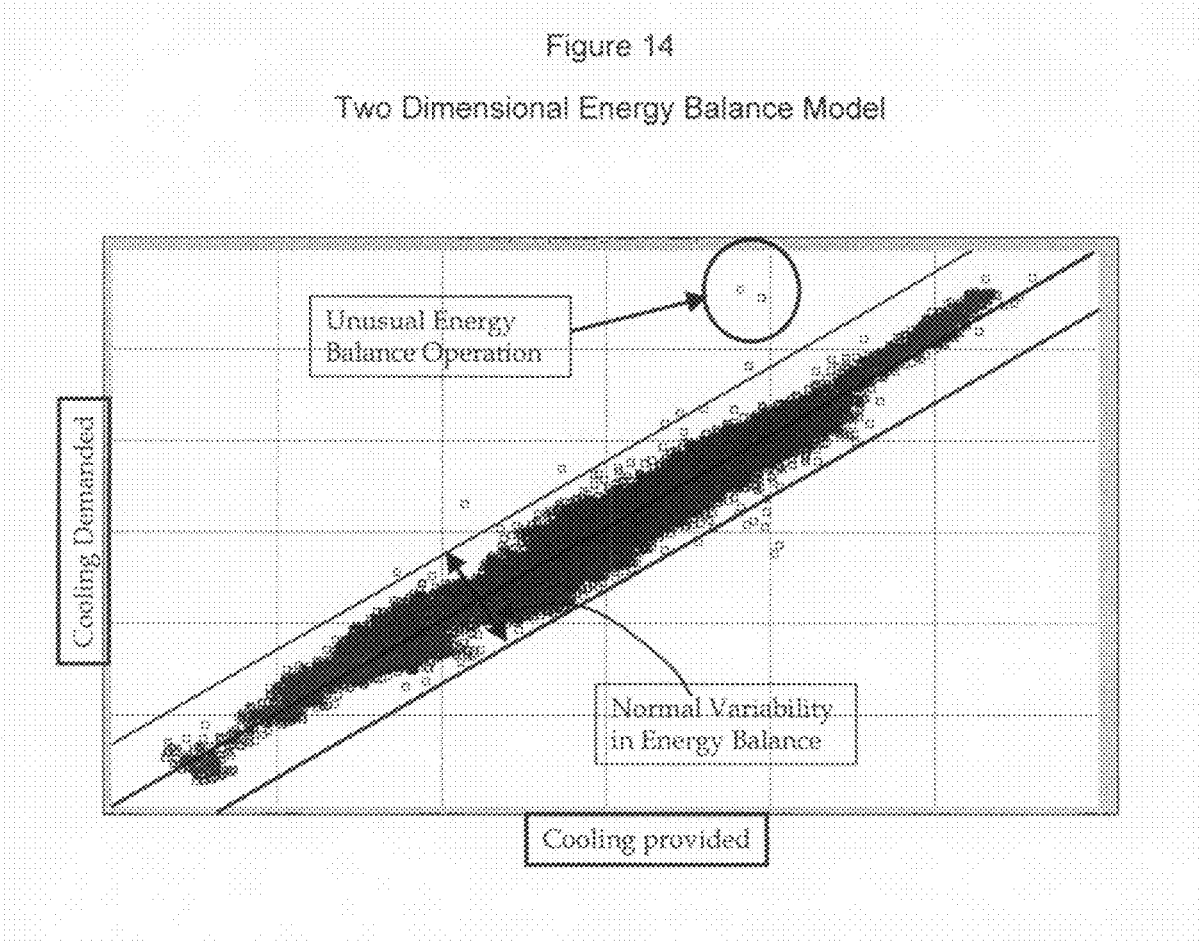
FIG. 14 shows the two dimensional energy balance model.

Any two dimensional equation can be represented in this manner. Material balances, energy balances, estimated analyzer readings versus actual analyzer readings, compressor curves, etc. FIG. 14 shows a two dimensional energy balance.

As a case in point the flow versus valve position model is explained in greater detail.

A. The Flow Versus Valve Position Model

A particularly valuable engineering redundancy model is the flow versus valve position model. This model is graphically shown in FIG. 2. The particular form of this model is:

$$\frac{\text{Flow}}{\left(\frac{\text{Delta\_Pressure}/}{\text{Delta\_Pressure}_{reference}}\right)^a} + \quad \text{Equation 17}$$

$$\text{filtered bias} + \text{operator bias} = C_v(VP)$$

where:

Flow: measured flow through a control valve

Delta_Pressure=closest measured upstream pressure−closest measured downstream pressure Delta_Pressure$_{reference}$: average Delta_Pressure during normal operation a: model parameter fitted to historical data Cv: valve characteristic curve determined empirically from historical data VP: signal to the control valve (not the actual control valve position)

The objectives of this model are to:

Detecting sticking/stuck control valves

Detecting frozen/failed flow measurements

Detecting control valve operation where the control system loses control of the flow This particular arrangement of the flow versus valve equation is chosen for human factors reasons: the x-y plot of the equation in this form is the one most easily understood by the operators. It is important for any of these models that they be arranged in the way which is most likely to be easily understood by the operators.

B. Developing the Flow Versus Valve Position Model

Figure 15:
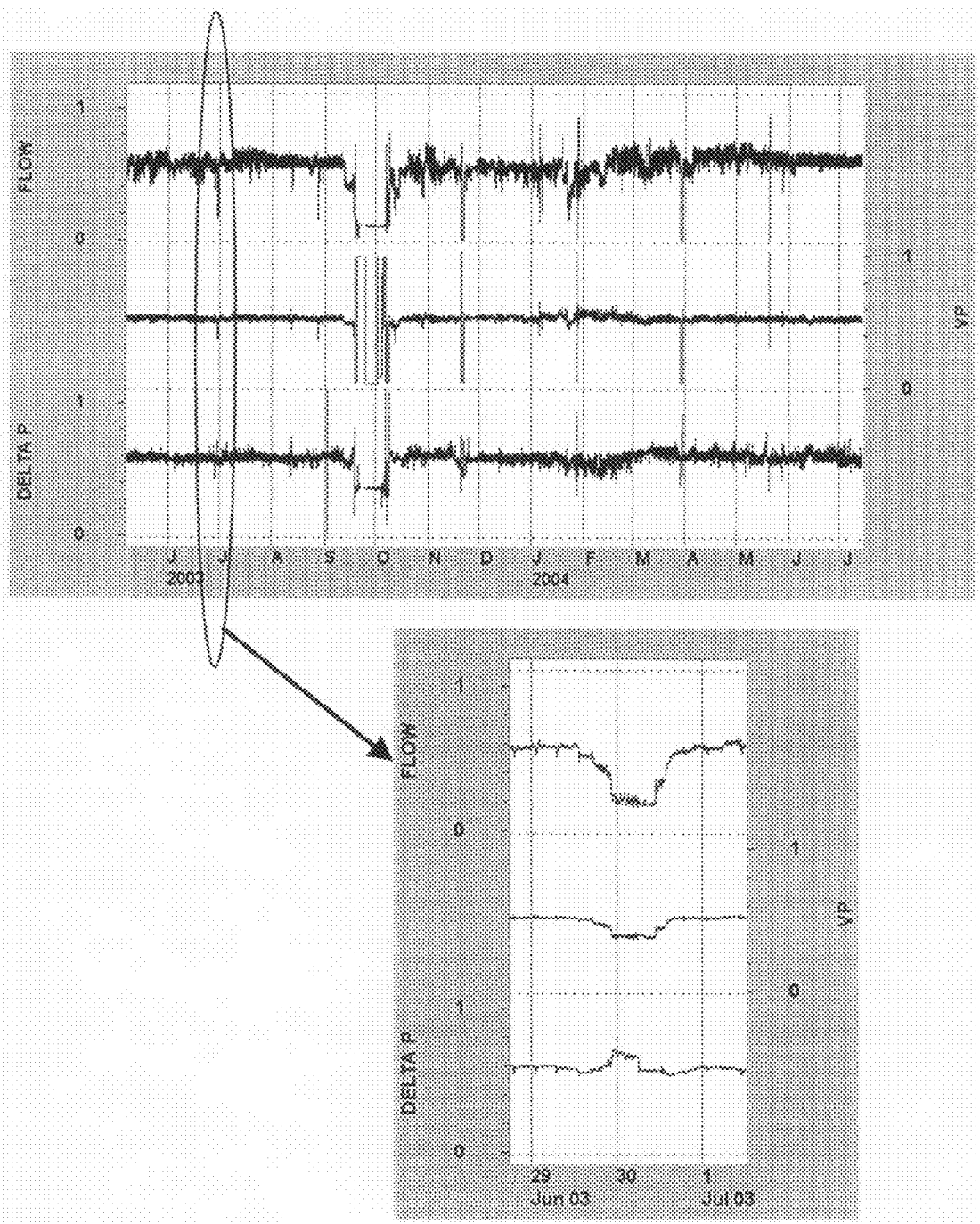
FIG. 15 shows a typical stretch of Flow, Valve Position, and Delta Pressure data with the long period of constant operation.

Because of the long periods of steady state operation experienced by continuous refining and chemical processes, a long historical record (1 to 2 years) may be required to get sufficient data to span the operation of the control valve. FIG. 15 shows a typical stretch of Flow, Valve Position, and Delta Pressure data with the long periods of constant operation. The first step is to isolate the brief time periods where there is some significant variation in the operation, as shown. This should be then mixed with periods of normal operation taken from various periods in history.

Often, either the Upstream_Pressure (often a pump discharge) or the Downstream_Pressure is not available. In those cases the missing measurement becomes a fixed model parameter in the model. If both pressures are missing then it is impossible to include the pressure effect in the model.

The valve characteristic curve can be either fit with a linear valve curve, with a quadratic valve curve or with a piecewise linear function. The piecewise linear function is the most flexible and will fit any form of valve characteristic curve.

The theoretical value for "a" is ½ if the measurements are taken directly across the valve. Rarely are the measurements positioned there. "a" becomes an empirically determined parameter to account for the actual positioning of the pressure measurements.

Often there will be very few periods of time with variations in the Delta_Pressure. The noise in the Delta_Pressure during the normal periods of operation can confuse the model-fitting program. To overcome this, the model is developed in two phases, first where a small dataset, which only contains periods of Delta_Pressure variation is used to fit the model. Then the pressure dependent parameters ("a" and perhaps the missing upstream or downstream pressure) are fixed at the values determined, and the model is re-developed with the larger dataset.

C. Fuzzy-Net Processing of Flow Versus Valve Abnormality Indications

As with any two-dimensional engineering redundancy model, there are two measures of abnormality, the "normal operating range" and the "normal model deviation". The "normal model deviation" is based on a normalized index: the error/max_error. This is fed into a type 4 fuzzy discriminator (FIG. 16). The developer can pick the transition from normal (value of zero) to abnormal (value of 1) in a standard way by using the normalized index.

The "normal operating range" index is the valve position distance from the normal region. It typically represents the operating region of the valve where a change in valve position will result in little or no change in the flow through the valve. Once again the developer can use the type 4 fuzzy discriminator to cover both the upper and lower ends of the normal operating range and the transition from normal to abnormal operation.

D. Grouping Multiple Flow/Valve Models

A common way of grouping Flow/Valve models which is favored by the operators is to put all of these models into a single fuzzy network so that the trend indicator will tell them that all of their critical flow controllers are working. In that case, the model indications into the fuzzy network (FIG. 4) will contain the "normal operating range" and the "normal model deviation" indication for each of the flow/valve models. The trend will contain the discriminator result from the worst model indication.

Figure 17:
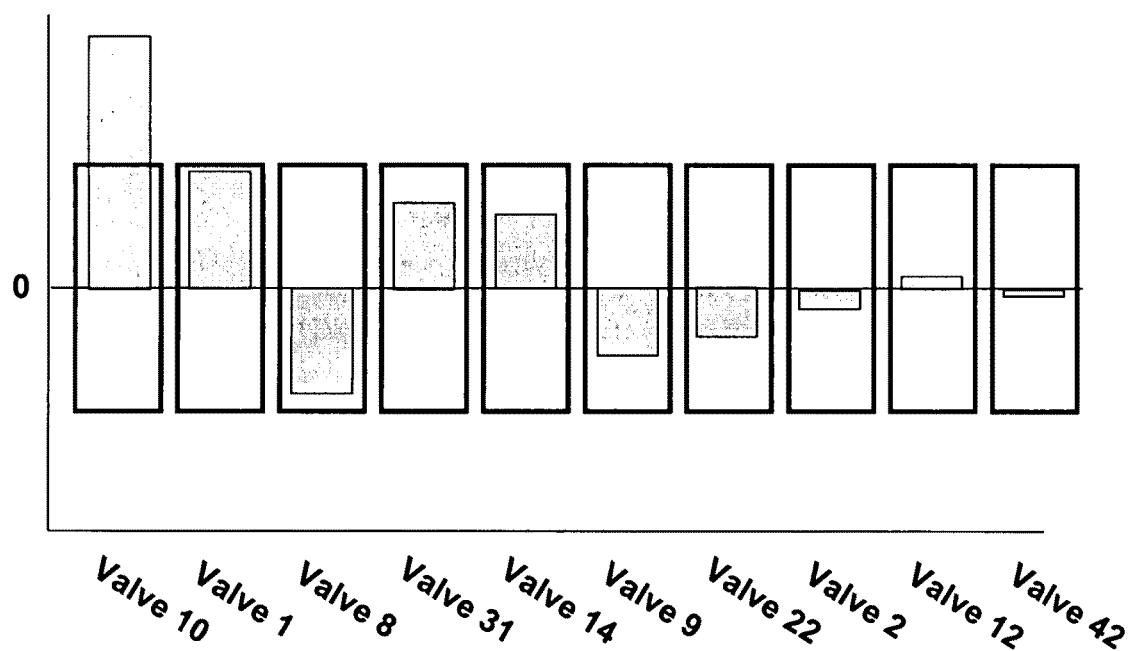
FIG. 17 shows a flow versus valve paraeto chart.

When a common equipment type is grouped together, another operator favored way to look at this group is through a Pareto chart of the flow/valves (FIG. 17). In this chart, the top 10 abnormal valves are dynamically arranged from the most abnormal on the left to the least abnormal on the right. Each Pareto bar also has a reference box indicating the degree of variation of the model abnormality indication that is within normal. The chart in FIG. 17 shows that "Valve 10" is substantially outside the normal box but that the others are all behaving normally. The operator would next investigate a plot for "Valve 10" similar to FIG. 2 to diagnose the problem with the flow control loop.

II. Multidimensional Engineering Redundancy Models

Once the dimensionality gets larger than 2, a single "PCA like" model is developed to handle a high dimension engineering redundancy check. Examples of multidimensional redundancy are:

pressure 1=pressure 2= . . . =pressure n material flow into process unit 1=material flow out of process unit 1= . . . =material flow into process unit 2

Because of measurement calibration errors, these equations will each require coefficients to compensate. Consequently, the model set that must be first developed is:

$$F_1(y_i) = a_1 G_1(x_i) + \text{filtered bias}_{1,i} + \text{operator bias}_1 + \text{error}_{1,i}$$

$$F_2(y_i) = a_n G_2(x_i) + \text{filtered bias}_{2,i} + \text{operator bias}_2 + \text{error}_{2,i}$$

$$F_n(y_i) = a_n G_n(x_i) + \text{filtered bias}_{n,i} + \text{operator bias}_n + \text{error}_{n,i} \quad \text{Equation 18}$$

These models are developed in the identical manner that the two dimensional engineering redundancy models were developed.

This set of multidimensional checks are now converted into "PCA like" models. This conversion relies on the interpretation of a principle component in a PCA model as a model of an independent effect on the process where the principle component coefficients (loadings) represent the proportional change in the measurements due to this independent effect. In FIG. 3, there are three independent and redundant measures, X1, X2, and X3. Whenever X3 changes by one, X1 changes by $a_1$ and X2 changes by $a_2$. This set of relationships is expressed as a single principle component model, P, with coefficients in unscaled engineering units as:

$$P = a_1 X1 + a_2 X2 + a_3 X3 \quad \text{Equation 19}$$

Where $a_3 = 1$

This engineering unit version of the model can be converted to a standard PCA model format as follows:

Drawing analogies to standard statistical concepts, the conversion factors for each dimension, X, can be based on the normal operating range. For example, using $3\sigma$ around the mean to define the normal operating range, the scaled variables are defined as:

$$X_{scale} = X_{normal\ operating\ range} / 6\sigma \quad \text{Equation 20}$$

(99.7% of normal operating data should fall within $3\sigma$ of the mean)

$$X_{mid} = X_{mid\ point\ of\ operating\ range} \quad \text{Equation 21}$$

(explicitly defining the "mean" as the mid point of the normal operating range)

$$X' = (X - X_{mid}) / X_{scale} \quad \text{Equation 22}$$

(standard PCA scaling once mean and $\sigma$ are determined)

Then the P' loadings for $X_i$ are:

$$b_i = (a_i / X_{i-scale}) / (\Sigma_{k=1}^{N} (a_k / X_{k-scale})^2)^{1/2} \quad \text{Equation 23}$$

(the requirement that the loading vector be normalized)

This transforms P to $$P' = b_1 * X1 + b_2 * X2 + \ldots + b_n * XN \quad \text{Equation 24}$$

$$P' \text{"standard deviation"} = b_1 + b_2 + \ldots + b_n \quad \text{Equation 25}$$

With this conversion, the multidimensional engineering redundancy model can now be handled using the standard PCA structure for calculation, exception handling, operator display and interaction.

Deploying PCA Models and Simple Engineering Models for Abnormal Event Detection

I. Operator and Known Event Suppression

Suppression logic is required for the following:

Provide a way to eliminate false indications from measurable unusual events

Provide a way to clear abnormal indications that the operator has investigated

Provide a way to temporarily disable models or measurements for maintenance

Provide a way to disable bad acting models until they can be retuned

Provide a way to permanently disable bad acting instruments.

Figure 18:
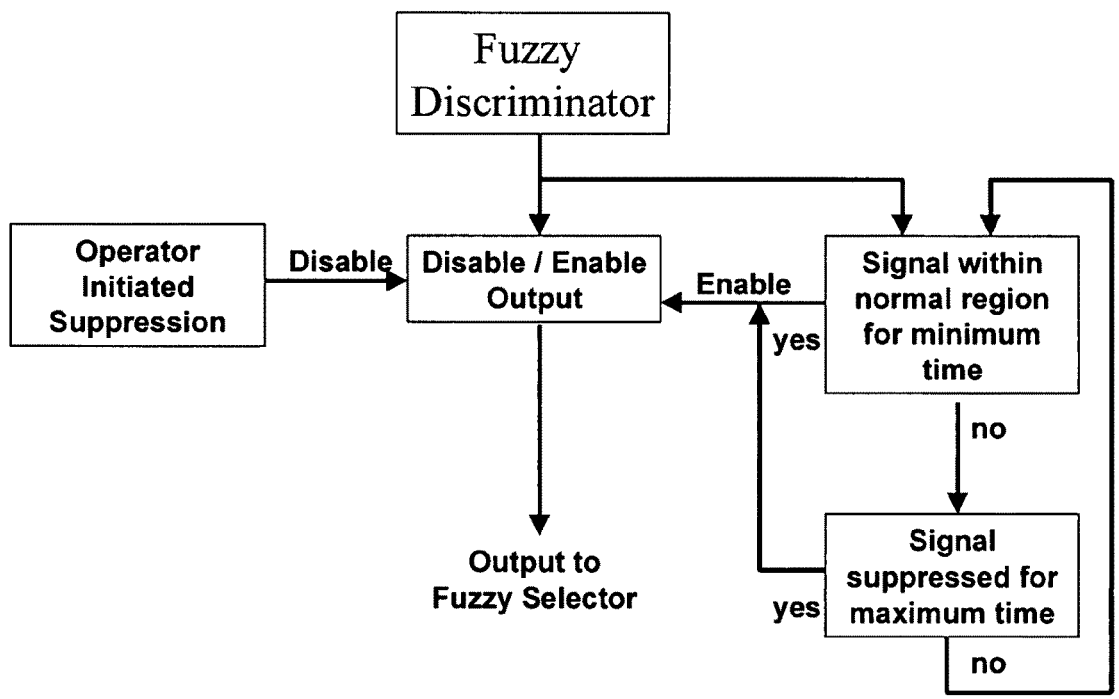
FIG. 18 shows a schematic diagram of operator suppression logic.
Figure 19:
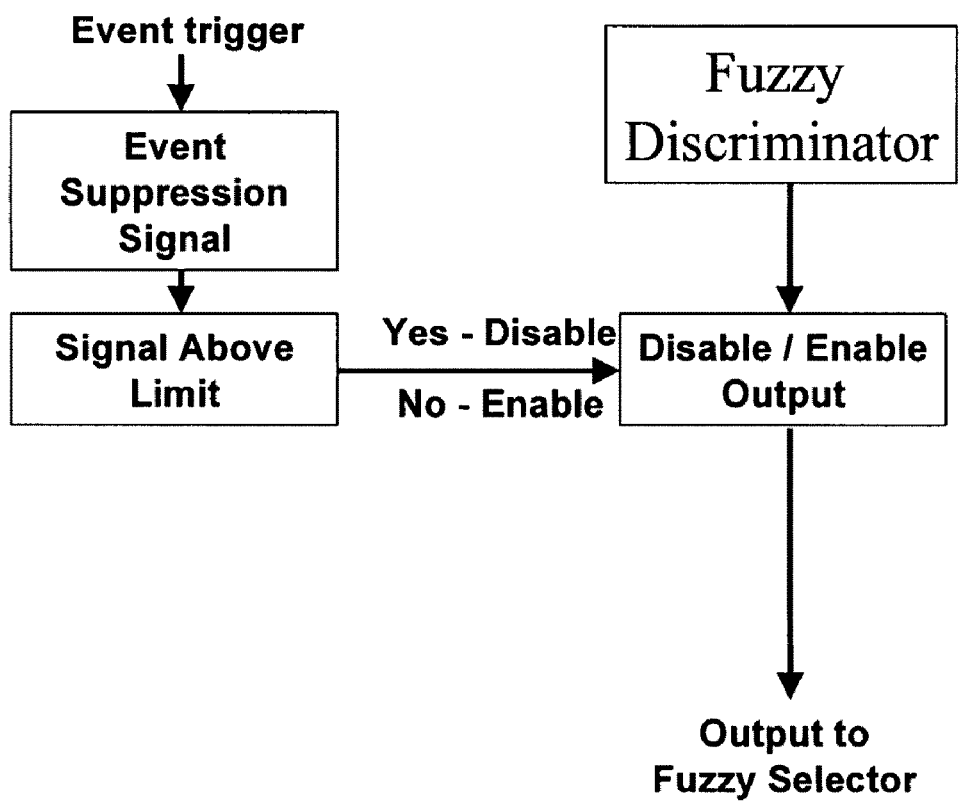
FIG. 19 shows a schematic diagram of event suppression logic.

There are two types of suppression. Suppression which is automatically triggered by an external, measurable event and suppression which is initiated by the operator. The logic behind these two types of suppression is shown in FIGS. 18 and 19. Although these diagrams show the suppression occurring on a fuzzified model index, suppression can occur on a particular measurement, on a particular model index, on an entire model, or on a combination of models within the process area.

For operator initiated suppression, there are two timers, which determine when the suppression is over. One timer verifies that the suppressed information has returned to and remains in the normal state. Typical values for this timer are from 15-30 minutes. The second timer will reactivate the abnormal event check, regardless of whether it has returned to the normal state. Typical values for this timer are either equivalent to the length of the operator's work shift (8 to 12 hours) or a very large time for semi-permanent suppression.

Figure 20:
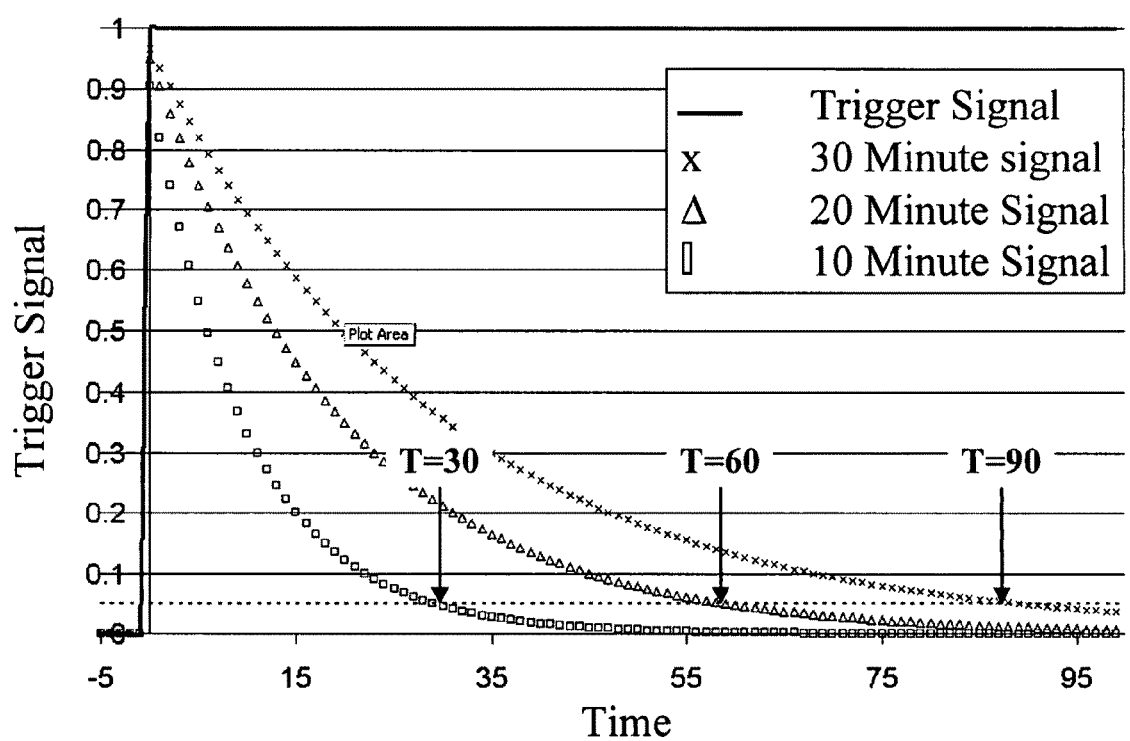
FIG. 20 shows the setting of the duration of event suppression.

For event based suppression, a measurable trigger is required. This can be an operator setpoint change, a sudden measurement change, or a digital signal. This signal is converted into a timing signal, shown in FIG. 20. This timing signal is created from the trigger signal using the following equations:

$$Y_n = P * Y_{n-1} + (1-P) * X_n \quad \text{Exponential filter equation} \quad \text{Equation 26}$$

$$P = \text{Exp}(-T_s / T_f) \quad \text{Filter constant calculation} \quad \text{Equation 27}$$

$$Z_n = X_n - Y_n \quad \text{Timing signal calculation} \quad \text{Equation 28}$$

where:

$Y_n$ the current filtered value of the trigger signal $Y_{n-1}$ the previous filtered value of the trigger signal $X_n$ the current value of the trigger signal $Z_n$ the timing signal shown in FIG. 20

P the exponential filter constant $T_s$ the sample time of the measurement $T_f$ the filter time constant As long as the timing signal is above a threshold (shown as 0.05 in FIG. 20), the event remains suppressed. The developer sets the length of the suppression by changing the filter time constant, $T_f$. Although a simple timer could also be used for this function, this timing signal will account for trigger signals of different sizes, creating longer suppressions for large changes and shorter suppressions for smaller changes.

Figure 21:
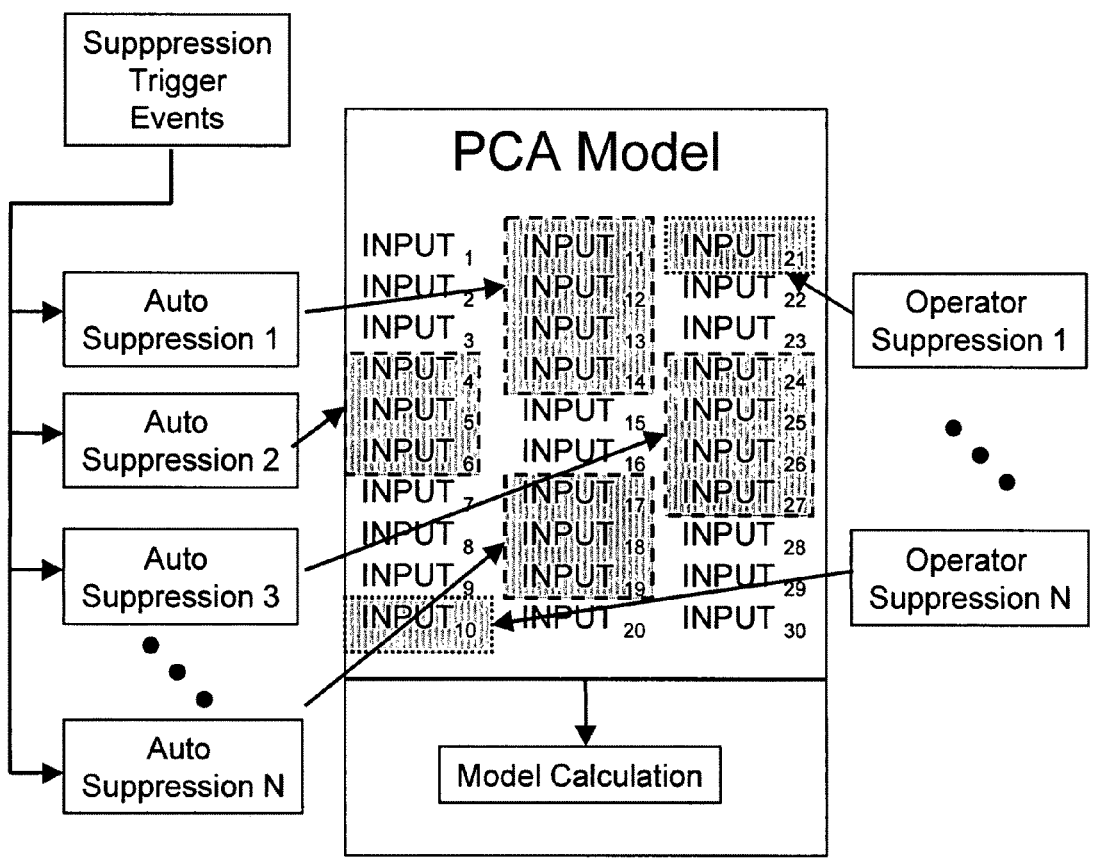
FIG. 21 shows the event suppression and the operator suppression disabling predefined sets of inputs in the PCA model.

FIG. 21 shows the event suppression and the operator suppression disabling predefined sets of inputs in the PCA model. The set of inputs to be automatically suppressed is determined from the on-line model performance. Whenever the PCA model gives an indication that the operator does not want to see, this indication can be traced to a small number of individual contributions to the Sum of Error Square index. To suppress these individual contributions, the calculation of this index is modified as follows:

$$E^2 = \sum_{i=1}^{n} w_i e_i^2 \qquad \text{Equation 29}$$

$w_i$—the contribution weight for input i (normally equal to 1)

$e_i$—the contribution to the sum of error squared from input i

When a trigger event occurs, the contribution weights are set to zero for each of the inputs that are to be suppressed. When these inputs are to be reactivated, the contribution weight is gradually returned to a value of 1.

II. PCA Model Decomposition

Although the PCA model is built using a broad process equipment scope, the model indices can be segregated into groupings that better match the operators' view of the process and can improve the sensitivity of the index to an abnormal event.

Referring again to Equation 29, we can create several Sum of Error Square groupings:

$$E_1^2 = \sum_{i=1}^{l} w_i e_i^2$$

$$E_2^2 = \sum_{i=l}^{k} w_i e_i^2$$

·

·

·

$$E_m^2 = \sum_{i=k}^{n} w_i e_i^2 \qquad \text{Equation 30}$$

Usually these groupings are based around smaller sub-units of equipment (e.g. reboiler section of a tower), or are sub-groupings, which are relevant to the function of the equipment (e.g. product quality).

Since each contributor, $e_i$, is always adding to the sum of error square based on process noise, the size of the index due to noise increases linearly with the number of inputs contributing to the index. With fewer contributors to the sum of error square calculation, the signal to noise ratio for the index is improved, making the index more responsive to abnormal events.

In a similar manner, each principle component can be subdivided to match the equipment groupings and an index analogous to the Hotelling $T^2$ index can be created for each subgroup.

$$P_{1,a} = \sum_{i=1}^{l} b_{1,i} x_i$$

$$P_{1,b} = \sum_{i=l}^{k} b_{1,i} x_i$$

$$P_{1,c} = \sum_{i=k}^{n} b_{1,i} x_i$$

$$P_{2,a} = \sum_{i=1}^{l} b_{2,i} x_i$$

$$P_{2,b} = \sum_{i=l}^{k} b_{2,i} x_i$$

$$P_{2,c} = \sum_{i=k}^{n} b_{2,i} x_i$$

$$T_a^2 = \sum_{i=1}^{m} P_{i,a}^2$$

$$T_b^2 = \sum_{i=1}^{m} P_{i,b}^2$$

$$T_c^2 = \sum_{i=1}^{m} P_{i,c}^2 \qquad \text{Equation 31}$$

The thresholds for these indices are calculated by running the testing data through the models and setting the sensitivity of the thresholds based on their performance on the test data.

These new indices are interpreted for the operator in the identical manner that a normal PCA model is handled. Pareto charts based on the original inputs are shown for the largest contributors to the sum of error square index, and the largest contributors to the largest P in the $T^2$ calculation.

III. Overlapping PCA Models

Inputs will appear in several PCA models so that all interactions affecting the model are encompassed within the model. This can cause multiple indications to the operator when these inputs are the major contributors to the sum of error squared index.

To avoid this issue, any input, which appears in multiple PCA models, is assigned one of those PCA models as its primary model. The contribution weight in Equation 29 for the primary PCA model will remain at one while for the non-primary PCA models, it is set to zero.

IV. Operator Interaction & Interface Design

Figure 22:
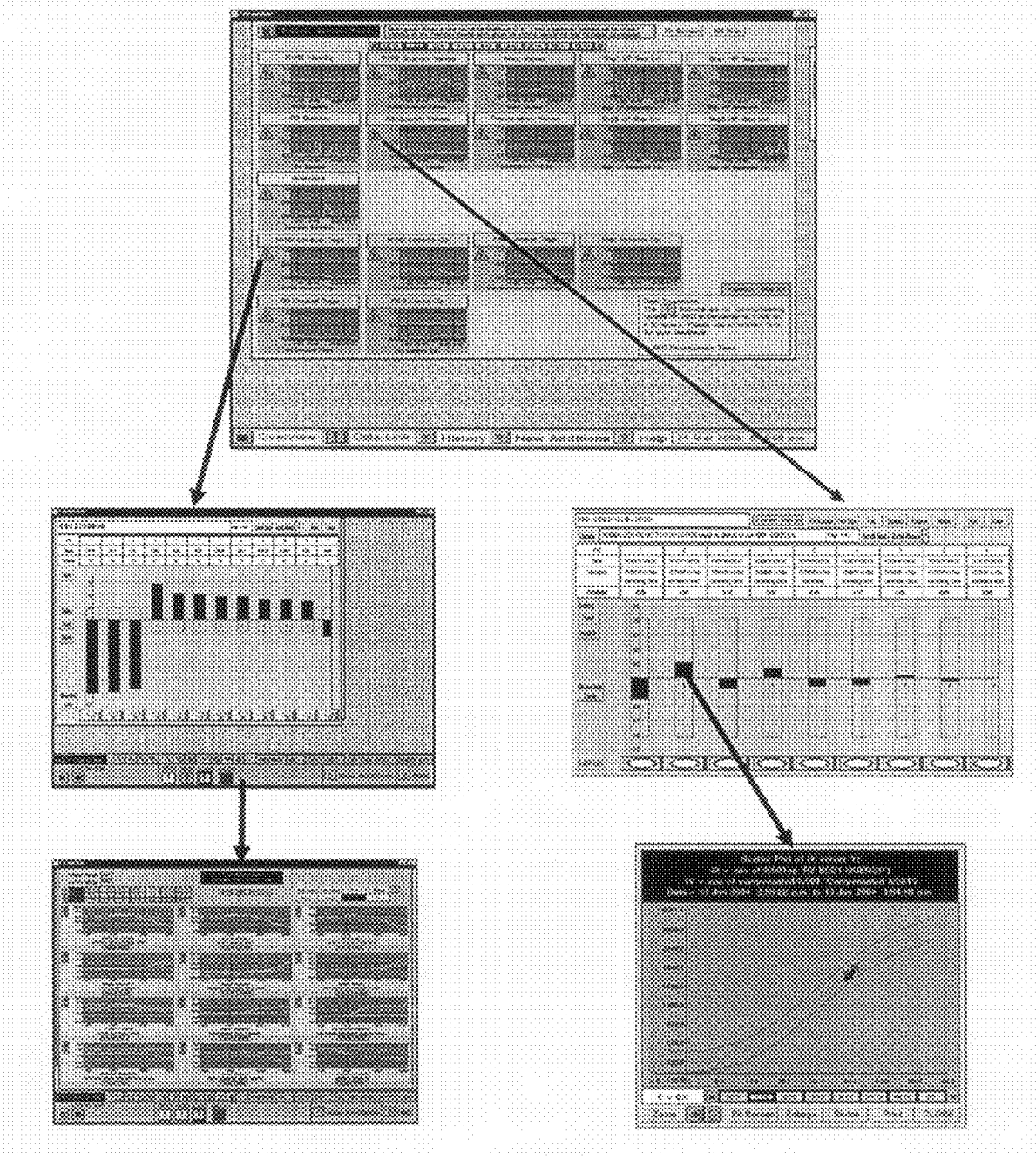
FIG. 22 shows how design objectives are expressed in the primary interfaces used by the operator.

The primary objectives of the operator interface are to:

Provide a continuous indication of the normality of the major process areas under the authority of the operator Provide rapid (1 or 2 mouse clicks) navigation to the underlying model information Provide the operator with control over which models are enabled. FIG. 22 shows how these design objectives are expressed in the primary interfaces used by the operator.

The final output from a fuzzy Petri net is a normality trend as is shown in FIG. 4. This trend represents the model index that indicates the greatest likelihood of abnormality as defined in the fuzzy discriminate function. The number of trends shown in the summary is flexible and decided in discussions with the operators. On this trend are two reference lines for the operator to help signal when they should take action, a yellow line typically set at a value of 0.6 and a red line typically set at a value of 0.9. These lines provide guidance to the operator as to when he is expected to take action. When the trend crosses the yellow line, the green triangle in FIG. 4 will turn yellow and when the trend crosses the red line, the green triangle will turn red. The triangle also has the function that it will take the operator to the display associated with the model giving the most abnormal indication.

If the model is a PCA model or it is part of an equipment group (e.g. all control valves), selecting the green triangle will create a Pareto chart. For a PCA model, of the dozen largest contributors to the model index, this will indicate the most abnormal (on the left) to the least abnormal (on the right) Usually the key abnormal event indicators will be among the first 2 or 3 measurements. The Pareto chart includes a red box around each bar to provide the operator with a reference as to how unusual the measurement can be before it is regarded as an indication of abnormality.

For PCA models, operators are provided with a trend Pareto, which matches the order in the bar chart Pareto. With the trend Pareto, each plot has two trends, the actual measurement (in cyan) and an estimate from the PCA model of what that measurements should have been if everything was normal (in tan).

For valve/flow models, the detail under the Pareto will be the two dimensional flow versus valve position model plot. From this plot the operator can apply the operator bias to the model.

If there is no equipment grouping, selecting the green triangle will take the operator right to the worst two-dimensional model under the summary trend.

Operator suppression is done at the Pareto chart level by selecting the on/off button beneath each bar.

| | Bibliography | |
|---|---|---|
| | I. U.S. Patent Documents | |
| 1 | 5,859,964 Jan. 12, 1999 | Wang, et al, "System and method for performing real time data acquisition, process modeling and fault detection of wafer fabrication processes" |
| 2 | 5,949,678 Sep. 7, 1999 | Wold, et al, "Method for Monitoring Multivariable Processes" |
| 3 | 6,522,978 Feb. 18, 2002 | Chen, et al, "Paper web breakage prediction using principal components analysis and classification and regression trees" |
| 4 | 6,368,975 Apr. 9, 2002 | Balasubramhanya, et al, "Method and apparatus for monitoring a process by employing principal component analysis" |
| 5 | 6,466,877 Oct. 15, 2002 | Chen, et al, "Paper web breakage prediction using principal components analysis and classification and regression trees" |
| 6 | 6,521,080 Feb. 18, 2003 | Balasubramhanya, et al, "Method and apparatus for monitoring a process by employing principal component analysis" |
| 7 | 6,564,119 May 13, 2003 | Vaculik, et al, "Multivariate Statistical Model Based System for Monitoring the Operation of a Continuous Caster and Detecting the Onset of Impending Breakouts" |
| 8 | 6,636,842 Oct. 21, 2003 | Zambrano, et al, "System and method for controlling an industrial process utilizing process trajectories" |
| | II. Literature | |
| 1. Cardoso, J. et al | "Fuzzy Petri Nets: An Overview", 13$^{th}$ Word Congress of IFAC, Vol. I: Identification II, Discrete Event Systems, San Francisco, CA, USA, June 30-Jul. 5, 1996, pp. 443-448. | |
| 2. Jackson, E. | "A User's Guide to Principal Component Analysis", John Wiley & Sons, 1991 | |
| 3. Kourti, T. | "Process Analysis and Abnormal Situation Detection: From Theory to Practice", IEEE Control Systems Magazine, October 2002, pp. 10-25 | |
| 4. Ku, W. | "Disturbance Detection and Isolation for Statistical Process Control in Chemical Processes", PhD Thesis, Lehigh University, Aug. 17, 1994 | |
| 5. Martens, H., & Naes, T., | "Multivariate Calibration", John Wiley & Sons, 1989 | |
| 6. Piovoso, M. J., et al. | "Process Data Chemometrics", IEEE Trans on Instrumentation and Measurement, Vol. 41, No. 2, April 1992, pp. 262-268 | |

TABLE 1

R1R2 Principal Components
With Sensor Title and Principal Component Loading

| Sensor Description | Loading |
|---|---|
| 1. Stage 1 Hydrogen Header Pressure | |
| 1ST STAGE RECYCLE COMPRESSOR DISCHARGE PRESSURE | 0.180 |
| ALT 1ST STAGE RECYCLE COMPRESSOR DISCHARGE PRESSURE | 0.178 |
| R2 REACTOR EFFLUENT TEMPERATURE | −0.176 |
| ALT 1ST STAGE RECYCLE COMPRESSOR SUCTION PRESSURE | 0.174 |
| 1ST STAGE RECYCLE COMPRESSOR SUCTION PRESSURE | 0.173 |
| 1ST STAGE HIGH PRESSURE SEPARATOR PRESSURE | 0.169 |
| R1 QUENCH SUPPLY/REACTOR PRESSURE DIFFERENTIAL | 0.169 |
| R1 HYDROGEN PREHEAT EXCHANGER EFFLUENT TEMPERATURE | −0.168 |
| HYDROGEN RECYCLE TO R1 INLET FLOW | 0.167 |
| R2 QUENCH SUPPLY/REACTOR PRESSURE DIFFERENTIAL | 0.165 |
| 2. R2 Reactor Hydrofining Conversion | |
| R2 REACTOR DIFFERENTIAL TEMPERATURE | −0.180 |
| PRESSURE CORRECTED R1 BED 3 QUENCH VALVE POSITION | 0.171 |
| R1 BED 3 QUENCH FLOW | 0.161 |
| R1 BED 2/BED 3 TEMPERATURE DIFFERENTIAL | 0.152 |
| R1 BED 4 BOTTOM TEMPERATURE AVERAGE | −0.152 |
| R1 BED 5 BOTTOM TEMPERATURE AVERAGE | −0.151 |
| TOTAL QUENCH HYDROGEN FLOW TO R1 | 0.146 |
| TOTAL RECYCLE HYDROGEN FLOW TO R1/R2 | 0.142 |
| R1 EAST FEED PREHEATER OUTLET TEMPERATURE | 0.140 |
| R1 BED 1 TOP TEMPERATURE AVERAGE | 0.138 |
| 3. Stage 1 Offgas Hydrogen | |
| 400# STEAM FLOW TO 1ST STAGE RECYCLE COMPRESSOR | 0.178 |
| COMBINED LOW PRESSURE SEPARATOR OFFGAS PRESSURE | 0.176 |
| COMBINED LOW PRESSURE SEPARATOR OFFGAS FLOW | 0.175 |
| PRESSURE CORRECTED R2 BED 5 QUENCH VALVE POSITION | 0.173 |
| 1ST STAGE LOW PRESSURE SEPARATOR BOTTOMS TEMPERATURE | 0.171 |

TABLE 1-continued

R1R2 Principal Components
With Sensor Title and Principal Component Loading

| Sensor Description | Loading |
|---|---|
| PRESSURE CORRECTED R2 BED 4 QUENCH VALVE POSITION | 0.169 |
| TOTAL HYDROGEN MAKE UP TO R1/R2 | 0.165 |
| 1ST STAGE HIGH PRESSURE SEPARATOR INLET TEMPERATURE | 0.164 |
| R1 INLET PRESSURE CONTROL VALVE POSITION | 0.164 |
| 1ST STAGE RECYCLE COMPRESSOR SUCTION TEMPERATURE | 0.161 |
| 4. Stage 1 PreHeat | |
| R1 WEST FEED PREHEATER OUTLET TEMPERATURE | −0.200 |
| ALT R1 WEST FEED PREHEATER OUTLET TEMPERATURE | −0.198 |
| R1 INLET TEMPERATURE | −0.185 |
| R1 EAST FEED PREHEATER OUTLET TEMPERATURE | −0.170 |
| R2 INLET TEMPERATURE | −0.169 |
| R1 EAST FEED PREHEATER OUTLET TEMPERATURE | −0.162 |
| R1 EAST FEED PREHEATER FUEL GAS FLOW | −0.159 |
| R1 EAST FEED PREHEATER FUEL GAS PRESSURE | −0.158 |
| R1 WEST FEED PREHEATER STACK TEMPERATURE | −0.158 |
| R1 EAST FEED PREHEATER FUEL GAS PRESSURE OUTPUT | −0.155 |
| 5. R1 Reactor Quench | |
| PRESSURE COMPENSATED R1 BED 4 QUENCH VALVE POSITION | 0.222 |
| R1 BED 4 QUENCH FLOW | 0.216 |
| R1 BED 3 BOTTOM TEMPERATURE AVERAGE | 0.183 |
| R1 BED 1/BED 2 TEMPERATURE DIFFERENTIAL | −0.167 |
| R1 BED 5 QUENCH FLOW | 0.164 |
| R1 BED 2 QUENCH FLOW | −0.161 |
| R1 BED 3 TOP TEMPERATURE AVERAGE | 0.160 |
| R1 BED 3/BED 4 TEMPERATURE DIFFERENTIAL | 0.159 |
| R1 BED 6 BOTTOM TEMPERATURE AVERAGE | −0.157 |
| PRESSURE COMPENSATED R1 BED 5 QUENCH VALVE POSITION | 0.155 |
| 6. Stage 1 Average Temperature | |
| R1 BED 4 TOP TEMPERATURE AVERAGE | −0.211 |
| R1 BED 4 BOTTOM TEMPERATURE AVERAGE | −0.195 |
| PRESSURE COMPENSATED R1 BED 5 QUENCH VALVE POSITION | −0.186 |
| R2 BED 4 TEMPERATURE DROP | 0.182 |
| R2 REACTOR EFFLUENT TEMPERATURE | 0.176 |
| R2 BED 4 BOTTOM TEMPERATURE AVERAGE | 0.166 |
| R2 BED 3 BOTTOM TEMPERATURE AVERAGE | 0.158 |
| R1 BED 4/BED 5 TEMPERATURE DIFFERENTIAL | −0.156 |
| R2 BED 3 TEMPERATURE DROP | 0.156 |
| R2 BED 5 BOTTOM TEMPERATURE AVERAGE | 0.153 |
| 7. Stage 1 Feed | |
| R1 TOTAL FEED FLOW | −0.260 |
| 1ST STAGE CHARGE PUMP MIN FLOW | −0.237 |
| ALT 1ST STAGE CHARGE PUMP MIN FLOW | −0.229 |
| 1ST STG CHARGE PUMP DISCHARGE PRESSURE | 0.224 |
| R1 WEST FEED PREHEATER FLOW | −0.223 |
| R1 EAST FEED PREHEATER FLOW | −0.216 |
| R1 WEST FEED PREHEATER FLOW OUTPUT | −0.206 |
| R1 EAST FEED PREHEATER FLOW OUTPUT | −0.176 |
| R1 HIGH PRESSURE MAKE-UP HYDROGEN FLOW | −0.173 |
| RECIPROCATING COMPRESSOR HIGH PRESSURE DISCHARGE FLOW | −0.169 |
| 8. Stage 1 Pressure Balance | |
| R2 REACTOR INLET PRESSURE | 0.273 |
| R1 REACTOR EFFLUENT OUTLET PRESSURE | 0.273 |
| R1 INLET PRESSURE | 0.270 |
| R2 INLET PRESSURE | 0.267 |
| R2 REACTOR OUTLET PRESSURE | 0.253 |
| 1ST STAGE RECYCLE COMPRESSOR SUCTION PRESSURE | 0.167 |
| ALT 1ST STAGE RECYCLE COMPRESSOR SUCTION PRESSURE | 0.166 |
| 1ST STAGE HIGH PRESSURE SEPARATOR PRESSURE | 0.164 |
| R1 BED 2 BOTTOM TEMPERATURE AVERAGE | 0.143 |
| R2 PRODUCT THRU STABILIZER EXCHANGER TEMPERATURE | 0.138 |
| 9. Stage 1 Make-Up Hydrogen | |
| R1 HIGH PRESSURE MAKE-UP HYDROGEN FLOW | −0.188 |
| RECIPROCATING COMPRESSOR HIGH PRESSURE DISCHARGE FLOW | −0.174 |
| HIGH PRESSURE HYROGEN MAKE-UP R1 EAST PREHEATER FLOW | −0.170 |
| R2 BED 4 BOTTOM TEMPERATURE AVERAGE | −0.168 |
| R2 RECYCLE HYDROGEN RATIO | −0.164 |
| HIGH PRESSURE HYDROGEN MAKE-UP R1 WEST PREHEATER FLOW | −0.161 |
| R1 EAST FEED PREHEATER STACK TEMPERATURE | −0.159 |
| R1 EAST FEED PREHEATER FIREBOX TEMPERATURE | −0.152 |

TABLE 1-continued

R1R2 Principal Components
With Sensor Title and Principal Component Loading

| Sensor Description | Loading |
|---|---|
| LP HYDROGEN TO HIGH PRESSURE KNOCKOUT DRUM INLET FLOW | −0.147 |
| R2 BED 5 QUENCH FLOW | −0.141 |
| 10. Recycle Compressor | |
| ALT 1ST STAGE RECYCLE COMPRESSOR SUCTION PRESSURE | 0.198 |
| 1ST STAGE LOW PRESSURE SEPARATOR BOTTOMS TEMPERATURE | 0.190 |
| 1ST STAGE HIGH PRESSURE SEPARATOR INLET TEMPERATURE | 0.179 |
| 400# STEAM FLOW TO 1ST STAGE RECYCLE COMPRESSOR | −0.178 |
| 1ST STAGE RECYCLE COMPRESSOR SUCTION TEMPERATURE | 0.166 |
| 1ST STAGE RECYCLE COMPRESSOR DIFFERENTIAL PRESSURE | −0.157 |
| HIGH PRESSURE HYDROGEN TO R1/R2 TEMPERATURE | 0.153 |
| R2 RECYCLE HYDROGEN RATIO | −0.145 |
| COMBINED LP SEPARATOR ABSORBER OFF GAS TEMPERATURE | 0.139 |
| R1 RECYCLE HYDROGEN RATIO | −0.131 |
| 11. Make-Up Hydrogen/PreHeat | |
| R1 HIGH PRESSURE MAKE-UP HYDROGEN FLOW | −0.224 |
| RECIPROCATING COMPRESSOR HIGH PRESSURE DISCHARGE FLOW | −0.218 |
| HIGH PRESSURE HYDROGEN MAKE-UP R1 WEST PREHEATER FLOW | −0.199 |
| HIGH PRESSURE MAKE-UP HYDROGEN TO EAST PREHEATER FLOW | −0.196 |
| LP HYDROGEN TO HIGH PRESSURE KNOCKOUT DRUM INLET FLOW | −0.186 |
| HIGH PRESSURE H2 KNOCKOUT DRUM INLET PRESSURE VALVE | −0.173 |
| RECIPROCATING COMPRESSOR LOW PRESSURE DISCHARGE PRESSURE | −0.173 |
| R1 EAST FEED PREHEATER INLET TEMPERATURE | 0.167 |
| R1 EAST FEED PREHEATER OUTLET TEMPERATURE | 0.164 |
| ALT R1 WEST FEED PREHEATER OUTLET TEMPERATURE | 0.155 |
| 12. Reciprocating Compressor | |
| HIGH PRESSURE H2 KNOCKOUT DRUM INLET PRESSURE VALVE | −0.219 |
| RECIP COMPRESSOR LOW PRESSURE DISCHARGE PRESSURE | −0.219 |
| LOW PRESSURE KNOCKOUT DRUM INLET PRESSURE | 0.185 |
| RECIP COMPRESSOR LOW PRESSURE SUCTION PRESSURE | 0.185 |
| 1ST STAGE RECYCLE COMPRESSOR DIFFERENTIAL TEMPERATURE | −0.169 |
| TOTAL HYDROGEN MAKE UP TO R1/R2 | −0.158 |
| R2 BED 1 QUENCH FLOW | 0.157 |
| LP HYDROGEN TO HIGH PRESSURE KNOCKOUT DRUM INLET FLOW | −0.154 |
| R1 HIGH PRESSURE MAKE-UP HYDROGEN FLOW | −0.145 |
| 1ST STAGE RECYCLE COMPRESSOR SUCTION TEMPERATURE | 0.145 |
| 13. Low Purity Separator | |
| 1ST STAGE LOW PRESSURE SEPARATOR BOTTOMS FLOW OUTPUT | 0.190 |
| 1ST STAGE LOW PRESSURE SEPARATOR PRESSURE | −0.174 |
| LOW PRESSURE SEPARATOR OFFGAS ABSORBER LEVEL OUTPUT | 0.166 |
| LOW PRESSURE SEPARATOR OFFGAS ABSORBER BOTTOMS FLOW | 0.161 |
| 1ST STAGE LOW PRESSURE SEPARATOR OFFGAS PRESSURE | −0.159 |
| R1 BED 6 QUENCH FLOW | 0.152 |
| R1 BED 6 TOP AVERAGE TEMPERATURE | −0.152 |
| R1/R2 DIFFERENTIAL TEMPERATURE | 0.150 |
| 1ST STAGE LOW PRESSURE SEPARATOR BOTTOMS FLOW | 0.149 |
| R1 BED 5/BED 6 TEMPERATURE DIFFERENTIAL | 0.148 |

TABLE 2

R3 Principal Components
With Sensor Title and Principal Component Loading

| Sensor Description | Loading |
|---|---|
| 1. Overall R3 Temperature | |
| R3 AVERAGE REACTOR TEMPERATURE | 2.86E−01 |
| R3 TOTAL DIFFERENTIAL TEMPERATURE | 2.48E−01 |
| R3 BED1 AVERAGE TEMPERATURE | 2.08E−01 |
| R3 BED4 DELTA T | 2.08E−01 |
| R3 BED1 DELTA T | 2.02E−01 |
| R3 FEED PREHEATER OUTLET TEMPERATURE | 1.87E−01 |
| R3 REACTOR FEED TEMPERATURE | 1.86E−01 |
| R3 BED2 AVERAGE TEMPERATURE | 1.86E−01 |
| R3 BED4 AVERAGE TEMPERATURE | 1.84E−01 |
| 2ND STAGE HP SEPARATOR PRESSURE VALVE POSITION | 1.78E−01 |

TABLE 2-continued

R3 Principal Components
With Sensor Title and Principal Component Loading

| Sensor Description | Loading |
|---|---|
| 2. Non-R3 Temperatures | |
| 2ND STAGE LOW PRESSURE SEPARATOR BOTTOMS TEMPERATURE | 2.67E-01 |
| 2ND STAGE RECYCLE COMPRESSOR DISCHARGE TEMPERATURE | 2.66E-01 |
| R3 EFFLUENT TEMPERATURE | 2.57E-01 |
| H2 TO R3 REACTOR TEMPERATURE | 2.53E-01 |
| R3 FEED TEMPERATURE | 2.45E-01 |
| 2ND STAGE HIGH PRESSURE SEPARATOR INLET TEMPERATURE | 2.45E-01 |
| R3 SURGE DRUM OUTLET TEMPERATURE | 2.44E-01 |
| 2ND STAGE LOW PRESSURE SEPARATOR BOTTOMS TEMPERATURE | 2.39E-01 |
| R3 BED 3 DIFFERENTIAL PRESSURE | 2.24E-01 |
| R3 SURGE DRUM INLET TEMPERATURE | 2.13E-01 |
| 3. HP Separator Pressure | |
| 2ND STAGE HIGH PRESSURE SEPARATOR PRESSURE | -2.95E-01 |
| 2ND STAGE RECYCLE COMPRESSOR DISCHARGE PRESSURE | -2.90E-01 |
| ALT 2ND STAGE RECYCLE COMPRESSOR SUCTION PRESSURE | -2.86E-01 |
| 2ND STAGE RECYCLE COMPRESSOR SUCTION PRESSURE | -2.59E-01 |
| R3 SURGE DRUM OUTLET TEMPERATURE | -2.04E-01 |
| R3 FEED TEMPERATURE | -2.03E-01 |
| R3 REACTOR FEED FLOW | -1.91E-01 |
| R3 BED 5 AVERAGE TEMPERATURE | -1.85E-01 |
| 2ND STAGE RECYCLE COMPRESSOR SUCTION PRESSURE OUTPUT | 1.83E-01 |
| R3 PRODUCT DISCHARGE TEMPERATURE | -1.78E-01 |
| 4. HP Separator Temperatures | |
| 2ND STAGE HIGH PRESSURE SEPARATOR INLET TEMPERATURE | -2.52E-01 |
| H2 TO R3 REACTOR TEMPERATURE | -2.50E-01 |
| 2ND STAGE RECYCLE COMPRESSOR DISCHARGE TEMPERATURE | -2.49E-01 |
| R3 SURGE DRUM OUTLET TEMPERATURE | 2.46E-01 |
| R3 FEED TEMPERATURE | 2.45E-01 |
| R3 SURGE DRUM INLET TEMPERATURE | 2.15E-01 |
| 2ND STAGE RECYCLE COMPRESSOR DISCHARGE PRESSURE | -2.11E-01 |
| R3 EFFLUENT TEMPERATURE | 2.11E-01 |
| 2ND STAGE RECYCLE COMPRESSOR DISCHARGE TEMPERATURE | -2.01E-01 |
| ALT 2ND STAGE RECYCLE COMPRESSOR SUCTION PRESSURE | -1.95E-01 |
| 5. Recycle Compressor | |
| 2ND STAGE RECYCLE COMPRESSOR DISCHARGE TEMPERATURE | -3.98E-01 |
| ALT 2ND STAGE RECYCLE COMPRESSOR SUCTION PRESSURE | -3.90E-01 |
| 2ND STAGE RECYCLE COMPRESSOR DIFFERENTIAL PRESSURE | -3.19E-01 |
| 2ND STAGE LOW PRESSURE SEPARATOR OFFGAS TEMPERATURE | 3.09E-01 |
| R3 BED 3 DIFFERENTIAL PRESSURE | 2.52E-01 |
| 2ND STAGE RECYCLE COMPRESSOR SPEED | -1.85E-01 |
| 2ND STAGE RECYCLE GAS PURITY | -1.64E-01 |
| 2ND STAGE LOW PRESSURE SEPARATOR BOTTOMS TEMPERATURE | 1.55E-01 |
| 2ND STAGE HIGH PRESSURE SEPARATOR FAN OUTLET TEMPERATURE | -1.51E-01 |
| 2ND STAGE RECYCLE COMPRESSOR SUCTION PRESSURE OUTPUT | -1.38E-01 |
| 6. R3 Bed 3 Operation | |
| R3 BED 3 AVERAGE TEMPERATURE | -3.34E-01 |
| R3 BED 3 DIFFERENTIAL TEMPERATURE | -3.23E-01 |
| R3 BED 3 INLET TEMPERATURE | -2.72E-01 |
| R3 BED1 AVERAGE TEMPERATURE | 2.58E-01 |
| R3 BED 4 QUENCH FLOW OUTPUT | -2.34E-01 |
| R3 REACTOR FEED TEMPERATURE | 2.29E-01 |
| R3 BED 4 QUENCH FLOW OUTPUT | -2.27E-01 |
| R3 FEED PREHEATER OUTLET TEMPERATURE | 2.23E-01 |
| R3 BED 2 QUENCH FLOW | 2.23E-01 |
| R3 BED 5 QUENCH FLOW | -1.98E-01 |
| 7. R3 Temperature Profile | |
| R3 BED 3 QUENCH FLOW | 3.20E-01 |
| R3 BED 2 DIFFERENTIAL TEMPERATURE | 3.05E-01 |
| R3 BED 3 QUENCH FLOW OUTPUT | 2.99E-01 |
| R3 BED 4 INLET TEMPERATURE | -2.74E-01 |
| R3 BED 5 INLET TEMPERATURE | -2.67E-01 |
| R3 BED 1 DIFFERENTIAL TEMPERATURE | 2.30E-01 |
| R3 REACTOR FEED TEMPERATURE | -2.16E-01 |
| R3 FEED PREHEATER OUTLET TEMPERATURE | -2.12E-01 |
| R3 TOTAL DIFFERENTIAL TEMPERATURE | 2.02E-01 |
| 2ND STAGE HIGH PRESSURE SEPARATOR PRESSURE | 1.86E-01 |

TABLE 2-continued

R3 Principal Components
With Sensor Title and Principal Component Loading

| Sensor Description | Loading |
|---|---|
| 8. Reactor Pressure | |
| R3 INLET PRESSURE | 3.38E−01 |
| R3 INLET PRESSURE OUTPUT | −2.86E−01 |
| R3 BED 5 AVERAGE TEMPERATURE | −2.53E−01 |
| R3 PRODUCT DISCHARGE TEMPERATURE | −2.37E−01 |
| R3 BED 3 INLET TEMPERATURE | 2.19E−01 |
| R3 FEED PREHEATER OUTLET TEMPERATURE | 2.08E−01 |
| R3 BED 2 INLET TEMPERATURE | 2.07E−01 |
| 2ND STAGE RECYCLE COMPRESSOR SUCTION PRESSURE OUTPUT | −1.99E−01 |
| R3 BED 5 DIFFERENTIAL TEMPERATURE | −1.95E−01 |
| R3 BED 5 INLET TEMPERATURE | −1.81E−01 |
| 9. Make-Up Hydrogen | |
| LOW PRESSURE HYDROGEN MAKE-UP TO R3 FLOW | −3.68E−01 |
| LOW PRESSURE HYDROGEN DISCHARGE PRESSURE OUTPUT | 3.47E−01 |
| R3 INLET PRESSURE OUTPUT | −3.35E−01 |
| LOW PRESSURE HYDROGEN DISCHARGE PRESSURE | 3.35E−01 |
| R3 INLET PRESSURE | 2.26E−01 |
| R3 BED 5 AVERAGE TEMPERATURE | 2.06E−01 |
| R3 BED 5 DIFFERENTIAL TEMPERATURE | 1.94E−01 |
| RECIPROCATING COMPRESSOR LP DISCHARGE PRESSURE | 1.86E−01 |
| 2ND STAGE RECYCLE COMPRESSOR SUCTION PRESSURE OUTPUT | −1.67E−01 |
| RECYCLE HYDROGEN TO R3 FEED FLOW | −1.63E−01 |
| 10. Pressure Profile | |
| R3 BED 4 DIFFERENTIAL PRESSURE | 3.51E−01 |
| R3 BED2 AVERAGE TEMPERATURE | 3.21E−01 |
| R3 BED 2 INLET TEMPERATURE | 3.19E−01 |
| R3 BED 5 DIFFERENTIAL PRESSURE | −3.00E−01 |
| R3 BED 5 QUENCH FLOW | −2.78E−01 |
| R3 BED 2 DIFFERENTIAL PRESSURE | −2.56E−01 |
| R3 BED 4 AVERAGE TEMPERATURE | −2.37E−01 |
| R3 BED 4 DIFFERENTIAL TEMPERATURE | −2.27E−01 |
| R3 BED 2 QUENCH FLOW | −2.11E−01 |
| R3 BED 3 QUENCH FLOW | 2.07E−01 |
| 11. Quench DP Profile | |
| R3 BED 4 DIFFERENTIAL PRESSURE | −3.86E−01 |
| R3 BED 2 DIFFERENTIAL PRESSURE | −3.47E−01 |
| R3 BED 4 INLET TEMPERATURE | 3.24E−01 |
| R3 BED 2 QUENCH FLOW | −2.68E−01 |
| R3 BED 4 QUENCH FLOW OUTPUT | −2.56E−01 |
| R3 BED 4 AVERAGE TEMPERATURE | 2.31E−01 |
| R3 BED 5 DIFFERENTIAL PRESSURE | 2.23E−01 |
| R3 BED 3 QUENCH FLOW | 2.19E−01 |
| R3 BED2 AVERAGE TEMPERATURE | 1.93E−01 |
| R3 BED 5 QUENCH FLOW | 1.89E−01 |
| 12. Make-up H2 Pressure | |
| LOW PRESSURE HYDROGEN DISCHARGE PRESSURE OUTPUT | 4.95E−01 |
| LOW PRESSURE HYDROGEN DISCHARGE PRESSURE | 4.37E−01 |
| R3 INLET PRESSURE | −3.02E−01 |
| R3 INLET PRESSURE OUTPUT | 2.88E−01 |
| 2ND STAGE RECYCLE COMPRESSOR SUCTION PRESSURE | 2.22E−01 |
| ALT 2ND STAGE RECYCLE COMPRESSOR SUCTION PRESSURE | 2.21E−01 |
| RECYCLE HYDROGEN TO R3 FEED FLOW | 2.09E−01 |
| R3 TOTAL DIFFERENTIAL PRESSURE | −1.58E−01 |
| 1ST STAGE HIGH PRESSURE SEPARATOR OVERHEAD FLOW | −1.42E−01 |
| LOW PRESSURE HYDROGEN MAKE-UP TO R3 TEMPERATURE | −1.34E−01 |
| 13. Bed 2 Quench/Dp | |
| R3 BED 2 DIFFERENTIAL PRESSURE | 4.27E−01 |
| R3 BED 2 QUENCH FLOW | 3.56E−01 |
| R3 BED 2 QUENCH FLOW OUTPUT | −3.19E−01 |
| R3 FEED PREHEATER OUTLET TEMPERATURE VALVE POSITION | −2.69E−01 |
| RECYCLE HYDROGEN TO R3 FEED FLOW | −2.50E−01 |
| R3 BED 5 DIFFERENTIAL TEMPERATURE | −2.47E−01 |
| R3 BED 5 INLET TEMPERATURE | 1.96E−01 |
| 1ST STAGE COMPRESSOR SPILLBACK FLOW | 1.83E−01 |
| R3 BED 2 DIFFERENTIAL TEMPERATURE | 1.81E−01 |
| R3 BED 4 INLET TEMPERATURE | 1.81E−01 |

TABLE 3

Fractionation Principal Components
With Sensor Title and Principal Component Loading

| Sensor Description | Loading |
|---|---|
| 1. Heat Input to Splitter Tower | |
| STABILIZER TOWER BOTTOMS TEMPERATURE | 2.44E−01 |
| SPLITTER TOWER FEED ZONE TEMPERATURE | 2.35E−01 |
| PRESSURE COMPENSATED SPLITTER TOWER TRAY 10 TEMPERATURE | 2.22E−01 |
| SPLITTER TOWER LIQUID FEED TEMPERATURE | 2.19E−01 |
| PRESSURE COMPENSATED STABILIZER TOWER TRAY 25 TEMPERATURE | 2.12E−01 |
| PRESSURE COMPENSATED STABILIZER TOWER TRAY 33 TEMPERATURE | 2.12E−01 |
| PRESSURE COMPENSATED SPLITTER TOWER TRAY 18 TEMPERATURE | 2.04E−01 |
| PRESSURE COMPENSATED STABILIZER TOWER TRAY 15 TEMPERATURE | 2.03E−01 |
| PRESSURE COMPENSATED SPLITTER TOWER TRAY 22 TEMPERATURE | 1.99E−01 |
| PRESSURE COMPENSATED SPLITTER TOWER TRAY 2 TEMPERATURE | 1.95E−01 |
| 2. Splitter Bottoms Draw Effect | |
| SPLITTER BOTTOMS FLOW TO FEED FLOW RATIO | −2.40E−01 |
| HEAVY NAPTHA STRIPPER BOTTOMS TEMPERATURE | 2.30E−01 |
| PRESSURE COMPENSATED SPLITTER TOWER TRAY 22 TEMPERATURE | 2.30E−01 |
| PRESSURE COMPENSATED SPLITTER TOWER TRAY 20 TEMPERATURE | 2.29E−01 |
| HOT HEAVY NAPTHA TO REFORMER TEMPERATURE | 2.09E−01 |
| PRESSURE COMPENSATED SPLITTER TOWER TRAY 28 TEMPERATURE | 2.06E−01 |
| PRESSURE COMPENSATED SPLITTER TOWER TRAY 18 TEMPERATURE | 2.01E−01 |
| STABILIZER BOTTOMS FLOW TO TOTAL PRODUCT FLOW RATIO | 1.96E−01 |
| PRESSURE COMPENSATED SPLITTER TOWER TRAY 38 TEMPERATURE | 1.91E−01 |
| SPLITTER OVERHEAD CONDENSOR TEMPERATURE | 1.88E−01 |
| 3. Ambient Temperature on Condensation | |
| SPLITTER ACCUMULATOR INLET TEMPERATURE | 3.90E−01 |
| SPLITTER OVERHEAD CONDENSOR INLET TEMPERATURE | 3.76E−01 |
| AMBIENT TEMPERATURE | 3.47E−01 |
| STABILIZER OVERHEAD ACCUMULATOR LIQUID TEMPERATURE | 3.44E−01 |
| ALTERNATE AMBIENT AIR TEMPERATURE MEASUREMENT | 3.38E−01 |
| STABILIZER TOWER OVERHEAD TEMPERATURE | 1.98E−01 |
| FIRST STAGE SURGE DRUM OUTLET TEMPERATURE | 1.79E−01 |
| SPLITTER REFLUX FLOW TO FEED FLOW RATIO | 1.79E−01 |
| LOG STABILIZER PERCENT IC5 IN OVERHEAD ANALYZER | 1.69E−01 |
| PRESSURE COMPENSATED STABILIZER TOWER TRAY 40 TEMPERATURE | 1.45E−01 |
| 4. Stabilizer Material Allocation | |
| BUTANE DRAW RATE TO TOTAL STABILIZER PRODUCT FLOW RATIO | 3.39E−01 |
| STABILIZER BOTTOMS FLOW TO STABILIZER PRODUCT FLOW RATIO | −2.91E−01 |
| 1ST STAGE LPS BOTTOMS FLOW TO TOTAL FEED RATIO | −2.74E−01 |
| STABILIZER TOWER INLET TEMPERATURE | −2.40E−01 |
| STABILIZER DISTILLATE RATIO (REFLUX TO OVERHEAD PROD FLOW) | −2.25E−01 |
| LOG STABILIZER PERCENT IC5 IN OVERHEAD ANALYZER | 2.13E−01 |
| PRESSURE COMPENSATED STABILZER TOWER TRAY 15 TEMPERATURE | −1.94E−01 |
| GASOLINE STRIPPER REBOILER OUTLET TEMPERATURE | 1.78E−01 |
| PRESSURE COMPENSATED SPLITTER TOWER FEED TRAY TEMPERATURE | −1.68E−01 |
| AMBIENT TEMPERATURE | −1.67E−01 |
| 5. Change in Oil Conversion | |
| GASOLINE STRIPPER REBOILER OUTLET TEMPERATURE | −2.93E−01 |
| SPLITTER TOWER LEVEL | −2.62E−01 |
| PRESSURE COMPENSATED STABILIZER TOWER TRAY 33 TEMPERATURE | −2.46E−01 |
| PRESSURE COMPENSATED STABILIZER TOWER TRAY 25 TEMPERATURE | −2.38E−01 |
| SPLITTER TOWER BOTTOMS TEMPERATURE | 2.13E−01 |
| PRESSURE COMPENSATED STABILIZER TOWER TRAY 2 TEMPERATURE | 2.12E−01 |
| PRESSURE COMPENSATED STABILIZER TOWER TRAY 8 TEMPERATURE | 2.12E−01 |
| GASOLINE STRIPPER LEVEL | −2.11E−01 |
| LIGHT NAPTHA DRAW TO SPLITTER FEED FLOW RATIO | 2.00E−01 |
| STABILZER SIDE DRAW TO TOTAL BOTTOMS FLOW RATIO | 1.91E−01 |
| 6. Splitter Product Draws | |
| GASOLINE DRAW TO TOTAL PRODUCT FLOW RATIO | −3.31E−01 |
| PRESSURE COMPENSATED STABILIZER TOWER TRAY 8 TEMPERATURE | 2.78E−01 |
| KERO/HEAVY NAPTHA DRAW TO SPLITTER FEED FLOW RATIO | −2.75E−01 |
| LIGHT NAPTHA DRAW TO SPLITTER FEED FLOW RATIO | −2.74E−01 |
| PRESSURE COMPENSATED STABILIZER TOWER TRAY 2 TEMPERATURE | 2.69E−01 |
| STABILIZER TOWER OVERHEAD PRESSURE | −2.50E−01 |
| PRESSURE COMPENSATED STABILIZER TOWER TRAY 15 TEMPERATURE | 2.47E−01 |
| STABILIZER SIDE DRAW TO BOTTOMS FLOW RATIO | −2.46E−01 |
| STABILIZER TOWER INLET TEMPERATURE | 2.37E−01 |
| SPLITTER BOTTOMS TO TOTAL FEED FLOW RATIO | −2.25E−01 |

TABLE 3-continued

Fractionation Principal Components
With Sensor Title and Principal Component Loading

| Sensor Description | Loading |
|---|---|
| 7. Stabilizer Feed Quality | |
| STABILIZER REBOILER CALCULATED HEAT INPUT TO FEED FLOW RATIO | 3.87E−01 |
| 2ND STAGE LPS BOTTOMS FLOW TO TOTAL PRODUCT FLOW RATIO | −3.43E−01 |
| STABILIZER DISTILLATE RATIO (REFLUX TO OVERHEAD PROD FLOW) | −2.93E−01 |
| STABILIZER BOTTOMS FLOW TO TOTAL PRODUCT FLOW RATIO | −2.93E−01 |
| 1ST STAGE LPS BOTTOMS FLOW TO TOTAL FEED FLOW RATIO | −2.69E−01 |
| BUTANE DRAW TO TOTAL PRODUCT FLOW RATIO | 2.62E−01 |
| PRESSURE COMPENSATED STABILIZER TOWER TRAY 40 TEMPERATURE | −2.30E−01 |
| 1ST STAGE LPS BOTTOMS TO TOTAL FEED FLOW RATIO | −2.19E−01 |
| GASOLINE STRIPPER FLASH VAPOR TEMPERATURE | −1.67E−01 |
| STABILIZER TOWER OVERHEAD TEMPERATURE | −1.66E−01 |
| 8. Stabilizer Butane Effects | |
| STABILIZER REBOILER CALCULATED HEAT INPUT TO FEED FLOW RATIO | 5.22E−01 |
| 2ND STAGE LPS BOTTOMS TO TOTAL PRODUCT FLOW RATIO | −4.70E−01 |
| STABILIZER BOTTOMS TO TOTAL PRODUCT FLOW RATIO | 2.33E−01 |
| LOG NC4 IN GASOLINE ANALYZER | −2.17E−01 |
| GASOLINE DRAW TO TOTAL PRODUCT FLOW RATIO | −1.98E−01 |
| PRESSURE COMPENSATED STABILIZER TOWER TRAY 40 TEMPERATURE | 1.89E−01 |
| STABILIZER DISTILLATE RATIO (REFLUX TO OVERHEAD PROD FLOW) | 1.80E−01 |
| BUTANE DRAW TO TOTAL PRODUCT FLOW RATIO | −1.65E−01 |
| GASOLINE STRIPPER FLASH VAPOR TEMPERATURE | 1.58E−01 |
| SPLITTER OVERHEAD ACCUMULATOR LEVEL | −1.52E−01 |
| 9. Stabilizer Pressure Balance | |
| 2ND STAGE LPS BOTTOMS TO TOTAL PRODUCT FLOW RATIO | 3.18E−01 |
| STABILIZER TOWER OVERHEAD PRESSURE | 3.06E−01 |
| LIGHT NAPTHA DRAW TO TOTAL SPLITTER FEED FLOW RATIO | −2.67E−01 |
| SPLITTER TOWER OVERHEAD TEMPERATURE | −2.54E−01 |
| STABILIZER REBOILER CALCULATED HEAT INPUT TO FEED FLOW RATIO | −2.39E−01 |
| STABILIZER SIDE DRAW TO TOTAL BOTTOMS FLOW RATIO | 2.19E−01 |
| PRESSURE COMPENSATED SPLITTER TOWER TRAY 10 TEMPERATURE | 2.05E−01 |
| SPLITTER REBOILER CALCULATED HEAT INPUT TO FEED FLOW RATIO | 1.96E−01 |
| PRESSURE COMPENSATED SPLITTER TOWER TRAY 38 TEMPERATURE | −1.89E−01 |
| SPLITTER OVERHEAD ACCUMULATOR LEVEL | −1.83E−01 |
| 10. Total Energy Inputs | |
| SPLITTER REBOILER FIRED DUTY | 5.83E−01 |
| STABILIZER REBOILER FIRED DUTY | 5.47E−01 |
| SPLITTER PUMPAROUND HEATER COOLER TO SPLITTER FEED RATIO | −1.77E−01 |
| GASOLINE STRIPPER OUTLET TEMPERATURE | −1.60E−01 |
| SPLITTER BOTTOMS TO TOTAL FEED RATIO FLOW RATIO | −1.46E−01 |
| STABILIZER TOWER INLET TEMPERATURE | −1.45E−01 |
| STABILIZER SIDE DRAW TO BOTTOMS FLOW RATIO | 1.40E−01 |
| STABILIZER TOWER LEVEL | 1.28E−01 |
| SPLITTER TOWER LEVEL | 1.23E−01 |
| 1ST STAGE LPS BOTTOMS TO TOTAL FEED FLOW RATIO | −1.18E−01 |
| 11. Splitter Fractionation Change | |
| SPLITTER REFLUX TO TOTAL FEED FLOW RATIO | −3.47E−01 |
| SPLITTER REBOILER FIRED DUTY | −3.12E−01 |
| STABILIZER SIDE DRAW TO BOTTOMS FLOW RATIO | 3.08E−01 |
| GASOLINE DRAW TO TOTAL PRODUCT FLOW RATIO | 2.81E−01 |
| PRESSURE COMPENSATED SPLITTER TOWER FEED TRAY TEMPERATURE | −2.45E−01 |
| STABILIZER REBOILER FIRED DUTY | −2.44E−01 |
| GASOLINE STRIPPER OUTLET TEMPERATURE | −2.26E−01 |
| SPLITTER TOWER OVERHEAD TEMPERATURE | 2.20E−01 |
| LOG STABILIZER PERCENT IC5 IN OVERHEAD | −2.08E−01 |
| STABILIZER TOWER LEVEL | 1.86E−01 |
| 12. Butane | |
| SPLITTER REFLUX TO TOTAL FEED FLOW RATIO | −4.00E−01 |
| LOG NC4 IN GASOLINE ANALYZER | −2.82E−01 |
| SPLITTER TOWER LEVEL | 2.51E−01 |
| SPLITTER TOWER OVERHEAD TEMPERATURE | 2.48E−01 |
| STABILIZER TOWER OVERHEAD PRESSURE | 2.47E−01 |
| SPLITTER TOWER BOTTOMS TEMPERATURE | −2.23E−01 |
| STABILIZER TOWER INLET TEMPERATURE | 2.22E−01 |
| GASOLINE STRIPPER OUTLET TEMPERATURE | 2.07E−01 |
| GASOLINE STRIPPER LEVEL | −1.96E−01 |
| PRESSURE COMPENSATED SPLITTER TOWER FEED TRAY TEMPERATURE | 1.80E−01 |

TABLE 3-continued

Fractionation Principal Components
With Sensor Title and Principal Component Loading

| Sensor Description | Loading |
|---|---|
| 13. Tower Inventory | |
| SPLITTER TOWER OVERHEAD PRESSURE | 4.30E−01 |
| STABILIZER TOWER OVERHEAD PRESSURE | 4.04E−01 |
| SPLITTER TOWER LEVEL | −3.38E−01 |
| SPLITTER OVERHEAD ACCUMULATOR LEVEL | −2.31E−01 |
| GASOLINE STRIPPER LEVEL | 2.30E−01 |
| SPLITTER TOWER BOTTOMS TEMPERATURE | 2.06E−01 |
| LOG NC4 IN GASOLINE ANALYZER | 1.94E−01 |
| STABILIZER TOWER INLET TEMPERATURE | 1.91E−01 |
| 1ST STAGE SURGE DRUM OUTLET TEMPERATURE | 1.69E−01 |
| PRESSURE COMPENSATED STABILZER TOWER TRAY 40 TEMPERATURE | −1.56E−01 |
| 14. Feed Quality/Overhead | |
| DYNAMIC COMPENSATED FEED API ANALYZER | 4.54E−01 |
| HEAVY NAPHTHA 90% BP ANALYZER | 3.04E−01 |
| STABILIZER TOWER OVERHEAD PRESSURE | −2.79E−01 |
| LOG NC4 IN GASOLINE ANALYZER | −2.52E−01 |
| STABILIZER TOWER LEVEL | −2.49E−01 |
| SPLITTER TOWER LEVEL | −2.39E−01 |
| 1ST STAGE SURGE DRUM OUTLET TEMPERATURE | 1.99E−01 |
| GASOLINE STRIP FLASH VAPOR TEMERATURE | −1.84E−01 |
| SPLITTER OVERHEAD ACCUMULATOR LEVEL | −1.77E−01 |
| GASOLINE STRIPPER OUTLET TEMPERATURE | 1.72E−01 |
| 15. Feed Quality/Gasoline | |
| HEAVY NAPHTHA 90% BP ANALYZER | 6.15E−01 |
| DYNAMIC COMPENSATED FEED API ANALYZER | −4.00E−01 |
| GASOLINE STRIPPER LEVEL | −3.74E−01 |
| SPLITTER REFLUX FLOW TO FEED FLOW RATIO | 1.86E−01 |
| STABILIZER TOWER LEVEL | −1.76E−01 |
| SPLITTER PUMPAROUND HEATER COOLER TO SPLITTER FEED RATIO | −1.74E−01 |
| SPLITTER TOWER OVERHEAD PRESSURE | 1.35E−01 |
| HEAVY NAPTHA STRIPPER FLASH VAPOR TEMPERATURE | 1.26E−01 |
| HEAVY NAPTHA STRIPPER BOTTOMS TEMPERATURE | 1.26E−01 |
| LIGHT NAPTHA DRAW TO SPLITTER FEED FLOW RATIO | −1.21E−01 |

TABLE 4

R1R2 Reactor Stability Monitor

| Measurement | Category | Amplitude Size | Amplitude Increasing | Range |
|---|---|---|---|---|
| R1 Total Quench Flow | R1 Temp/Total Quench Cycling | X | X | |
| R2 Total Quench Flow | R2 Temp/Total Quench Cycling | X | X | |
| R1 Total Differential Temperature | R1 Temp/Total Quench Cycling | X | X | |
| R1 Bed 6 Differential Temperature | R1 Temp/Total Quench Cycling | X | X | |
| R1 Bed 6 Inlet Temperature | R1 Temp/Total Quench Cycling | X | X | |
| R2 Total Differential Temperature | R2 Temp/Total Quench Cycling | X | X | |
| R2 Bed 1 Differential Temperature | R2 Temp/Total Quench Cycling | X | X | |
| R2 Bed 2 Inlet Temperature | R2 Temp/Total Quench Cycling | X | X | |
| R2 Bed 3 Inlet Temperature | R2 Temp/Total Quench Cycling | X | X | |
| R2 Bed 4 Inlet Temperature | R2 Temp/Total Quench Cycling | X | X | |
| R2 Bed 5 Inlet Temperature | R2 Temp/Total Quench Cycling | X | X | |
| R1R2 Offgas Component | R1R2 Offgas Measurement Variability | X | X | X |

TABLE 5

R3 Reactor Stability Monitor

| Measurement | Category | Amplitude Size | Amplitude Increasing | Range |
|---|---|---|---|---|
| R3 Bed 2 Inlet Temperature | R3 Temperature Cycling | X | X | |
| R3 Bed 2 Quench Flow | R3 Quench Flow Cycling | X | X | |
| R3 Bed 3 Inlet Temperature | R3 Temperature Cycling | X | X | |
| R3 Bed 3 Quench Flow | R3 Quench Flow Cycling | X | X | |
| R3 Bed 4 Inlet Temperature | R3 Temperature Cycling | X | X | |

TABLE 5-continued

R3 Reactor Stability Monitor

| Measurement | Category | Amplitude Size | Amplitude Increasing | Range |
|---|---|---|---|---|
| R3 Bed 4 Quench Flow | R3 Quench Flow Cycling | X | X | |
| R3 Bed 5 Inlet Temperature | R3 Temperature Cycling | X | X | |
| R3 Bed 5 Quench Flow | R3 Quench Flow Cycling | X | X | |
| R3 Offgas Component | R3 Offgas Measurement Variability | X | X | X |

TABLE 6

Separator Level Engineering Model Characteristics

| Process Area | Measurement | Frozen | Cycling | Range | Cross-Validation |
|---|---|---|---|---|---|
| 1st Stg LP Separator | Primary Level Measurement | X | X | X | X |
| | Secondary Level Measurement | X | X | X | X |
| 1st Stg HP Separator | Primary Level Measurement | X | X | X | X |
| | Secondary Level Measurement | X | X | X | X |
| 2nd Stg LP Separator | Primary Level Measurement | X | X | X | X |
| | Secondary Level Measurement | X | X | X | X |
| 2nd Stg HP Separator | Primary Level Measurement | X | X | X | |
| | Secondary Level Measurement | X | X | X | |
| | Tertiary Level Measurement | X | X | X | |

What is claimed is:

1. A method for abnormal event detection (AED) absent before specification of the abnormal event for a set of process units of a hydrocracker (HDC) unit of a petroleum refinery comprised of:
 (a) determining online measurements of an array of sensors corresponding to said process units of said hydrocracker,
 (b) substituting said online measurements from said array of sensors of said hydrocracker in a set of principal component analysis models wherein said set of principal component analysis models includes at least two principal component analysis models,
 (c) comparing said set of principal component analysis models to a set of models for normal operation of the corresponding process units, wherein said process units of said hydrocracker are divided into at least two equipment groups with minimal interaction between groups, wherein each principal component analysis model corresponds to an equipment group, wherein the principal components of each principal component analysis model correspond to the sensors in said array of sensors, and wherein said equipment groups are defined by including all major material and energy interactions and quick recycles in the same equipment group and said online measurements are cross-correlated with each other,
 (d) determining if the current operation differs from expected normal operations so as to indicate the presence of an abnormal condition in a process unit, and
 (e) determining the underlying cause of an abnormal condition in the HDC process unit.

2. The method of claim 1 wherein said set of principal component analysis models correspond to equipment groups and operating modes, one model for each group which may include one or more operating modes.

3. The method of claim 2 wherein determining each principal component analysis model begins with obtaining an initial principal component analysis model based upon questionable data, using said initial principal component analysis model to refine the data and improve the principal component analysis model, and iteratively repeating using said initial principal component analysis model to refine the data and improve the principal component analysis model.

4. The method of claim 1 wherein said set of principal component analysis models correspond to equipment groups and process operating modes, one model for each group and each mode.

5. The method of 1 wherein said set of models of normal operations further includes engineering models.

6. The method of claim 1 wherein said set of models of normal operation for each process unit is either a principal components analysis model or an engineering model.

7. The method of claim 6 wherein a hydrocracker process unit is partitioned into functional sections with a principal component analysis model for each section.

8. The method of claim 7 where there are three functional sections of the hydrocracker process unit.

9. The method of claim 8 wherein the three functional sections of the hydrocracking process unit include: 1st stage hydrotreating reactor (R1), 2nd stage hydrocracking reactor (R2), 3rd stage hydrocracking reactor (R3), 1st & 2nd stage low pressure/high pressure (LP/HP) separators, stabilizer tower, splitter tower, and the reciprocal compressor.

10. The method of claim 7 further comprising a training data set wherein said training data set includes historical data of the processing unit for model development.

11. The method of claim 7 wherein said principal component analysis models includes transformed variables.

12. The method of claim 11 wherein said transformed variables include reflux to total product flow in distillation columns, log of composition and overhead pressure in distillation columns, pressure compensated temperature measurements, flow to valve position and bed differential temperature and pressure.

13. The method of claim 7 wherein some measurement pairs are time synchronized to one of the variables using a dynamic filter.

14. The method of claim 13 wherein the measurements are scaled by the expected normal range of that variable.

15. The method of claim 7 wherein the process measurement variables affected by operating point changes in the process operations are converted to deviation variables.

16. The method of claim 7 wherein the measurements of a variable are scaled prior to principal component analysis model identification.

17. The method of claim 7 wherein the number of principal components for each principal component analysis model is selected by the magnitude of total process variation represented by successive components.

18. The method of claim 1 wherein said principal component analysis models include process variables provided by online measurements.

19. The method of claim 1 further comprising additional models to determine the consistency between selected control valves and flow meters, process analyzers and secondary measurements, and the onset of temperature and pressures oscillations in the reactor beds.

20. The method of claim 1 wherein at least one of said principal component an models of said set of principal component analysis models further comprises suppressing model calculations to eliminate operator induced notifications and false positives.

21. The method of claim 1 wherein: deriving a principal component analysis model begins with obtaining an initial principal component analysis model based upon questionable data, using said initial principal component analysis model to refine the data and improve the principal component analysis model, and iteratively repeating using said initial principal component analysis model to refine the data and improve the principal component analysis model.

22. A system for abnormal event detection (AED) absent before specification of the abnormal event for a set of the process units of a hydrocracker (HDC) unit of a petroleum refinery comprising:
(a) an array of sensors for determining online measurements of said process units,
(b) a set of principal component analysis models including at least two principal component analysis models wherein said online measurements are substituted in said set of principal component analysis models for comparing said set of principal component analysis models to the set of models for normal operation of the corresponding process unit, wherein said process units of said hydrocracker unit are divided into at least two equipment groups having minimal interaction between groups, wherein each principal components analysis model corresponds to an equipment group, wherein the principal components of each principal component analysis model correspond to the sensors in said array of sensors, and wherein said equipment groups are defined by including all major material and energy interactions and quick recycles in the same equipment group and said online measurements are cross-correlated with each other,
(c) a display which indicates if the current operation differs from the expected normal operation so as to indicate the presence of an abnormal condition in the process unit, and
(d) a display which indicates the underlying cause of an abnormal condition in the HDC process unit.

23. The system of claim 22 wherein a hydrocracker unit is partitioned into three operational sections with a principal component analysis model for each section.

24. The system of claim 23 wherein said principal component analysis models include process variables provided by online measurements.

25. The system of claim 23 wherein the three operational sections of the hydrocracking process unit include: 1st stage hydrotreating reactor (R1), 2nd stage hydrocracking reactor (R2), 3rd stage hydrocracking reactor (R3), 1st and 2nd stage low pressure/high pressure (LP/HP) separators, stabilizer tower, splitter tower, and the reciprocal compressor.

26. The system of claim 25 wherein additional models determine the consistency between selected control valves and flow meters, process analyzers and secondary measurements, and the onset of temperature and pressures oscillations in the reactor beds.

27. The system of claim 23 wherein at least one of said principal component analysis models of said set of principal component analysis models further comprises suppressing model calculations to eliminate operator induced notifications and false positives.

28. The system of claim 22 further comprising a training data set wherein said training data set includes historical data of the processing unit for model development.

29. The system of claim 28 wherein said principal component analysis models includes transformed variables.

30. The system of claim 29 wherein said transformed variables include reflux to total product flow in distillation columns, log of composition and overhead pressure in distillation columns, pressure compensated temperature measurements, flow to valve position and bed differential temperature and pressure.

31. The system of claim 28 wherein online measurement pairs are time synchronized to one of the variables using a dynamic filter.

32. The system of claim 28 wherein process measurement variables affected by operating point changes in the process operations are converted to deviation variables.

33. The system of claim 28 wherein measurements of a variable are scaled prior to principal component analysis model identification.

34. The system of claim 33 wherein the measurements are scaled by the expected normal range of that variable.

35. The system of claim 28 wherein a number of principal components is selected by a magnitude of total process variation represented by successive components.

36. The system of claim 22 wherein said set of principal component analysis models further includes engineering models.

* * * * *